US012560413B2

(12) United States Patent
Factor et al.

(10) Patent No.: US 12,560,413 B2
(45) Date of Patent: Feb. 24, 2026

(54) DEVICE, SYSTEM, AND METHOD OF AIRCRAFT PROTECTION AND COUNTERMEASURES AGAINST MISSILES

(71) Applicant: BIRD AEROSYSTEMS LTD., Herzelia (IL)

(72) Inventors: Ronen Factor, Ramat Gan (IL); David Dragucki, Be'erotayim (IL); Ariye Yehuda Caplan, Haifa (IL); Semion Zelikman, Rishon LeZion (IL); Shay Beer, Rishon LeZion (IL); Asael Adler, Petach Tikva (IL); Tomer Yoselevich, Ramat HaSharon (IL)

(73) Assignee: BIRD AEROSYSTEMS LTD., Herzelia (IL)

( * ) Notice: Subject to any disclaimer, the term of this patent is extended or adjusted under 35 U.S.C. 154(b) by 965 days.

(21) Appl. No.: 17/705,330

(22) Filed: Mar. 27, 2022

(65) Prior Publication Data
US 2023/0033690 A1 Feb. 2, 2023

(30) Foreign Application Priority Data
Aug. 1, 2021 (IL) .......................................... 285271

(51) Int. Cl.
*F41H 11/02* (2006.01)
*F41H 13/00* (2006.01)
*G01S 17/66* (2006.01)

(52) U.S. Cl.
CPC ......... *F41H 11/02* (2013.01); *F41H 13/0056* (2013.01); *G01S 17/66* (2013.01)

(58) Field of Classification Search
None
See application file for complete search history.

(56) References Cited

U.S. PATENT DOCUMENTS 3,981,010 A 9/1976 Michelsen
4,172,409 A 10/1979 Looss
(Continued)

FOREIGN PATENT DOCUMENTS

CN 211206942 U 8/2020
DE 4402855 A1 * 8/1995 ......... F41H 13/0056
(Continued)

OTHER PUBLICATIONS

First office action in Israel Patent Application No. 285271, dated Feb. 4, 2025.
(Continued)

*Primary Examiner* — Andrew Smyth
(74) *Attorney, Agent, or Firm* — AlphaPatent Associates Ltd.; Daniel J. Swirsky

(57) ABSTRACT

A device (800) for protecting an aircraft against missiles, includes a Short-Wave InfraRed based (SWIR-based) Missile Tracking Unit, having a SWIR-based optical imager that associated with an optical SWIR band filter. The device (800) further includes a SWIR signals processor; it analyzes the captured SWIR optical signals; and it performs a SWIR-based missile acquisition process, which is also based on raw angular position data of a missile as received from a Missile Approach Warning System (MAWS); and it performs a SWIR-based missile tracking process, which continuously and dynamically determines a precise angular position of the missile based on the captured SWIR optical signals. The device (800) includes a laser-based missile-jamming unit, having an internal laser emitter; and optionally also being operably associated with an external high-power laser emitter; to disrupt the missile, or to disrupt a guiding station of the missile.

23 Claims, 9 Drawing Sheets

(56) References Cited

U.S. PATENT DOCUMENTS

| | | | |
|---|---|---|---|
| 4,409,468 A | 10/1983 | Mayer | |
| 4,780,719 A | 10/1988 | Frei | |
| 5,122,801 A | 6/1992 | Hughes | |
| 5,136,295 A | 8/1992 | Bull | |
| 5,204,489 A | 4/1993 | Pellarin | |
| 5,268,680 A | 12/1993 | Zantos | |
| 5,431,084 A | 7/1995 | Fowler | |
| 5,574,458 A | 11/1996 | Tran | |
| 5,662,291 A | 9/1997 | Sepp | |
| 6,055,909 A | 5/2000 | Sweeny | |
| 6,145,428 A | 11/2000 | Gold | |
| 6,231,002 B1 | 5/2001 | Hibma | |
| 6,369,885 B1 | 4/2002 | Brown | |
| 6,410,897 B1 | 6/2002 | O'Neill | |
| 6,674,520 B2 | 1/2004 | Hicks | |
| 6,707,052 B1 | 3/2004 | Wild | |
| 6,738,012 B1 | 5/2004 | Kirkpatrick | |
| 6,771,205 B1 | 8/2004 | Barton | |
| 6,920,827 B2 | 7/2005 | Llyod | |
| 6,980,151 B1 | 12/2005 | Mohan | |
| 6,980,152 B2 | 12/2005 | Steadman | |
| 7,046,187 B2 | 5/2006 | Fullerton | |
| 7,104,496 B2 | 9/2006 | Chang | |
| 7,378,626 B2 * | 5/2008 | Fetterly | G01S 7/495 |
| | | | 342/13 |
| 7,425,916 B2 | 9/2008 | Stevens | |
| 7,446,315 B1 | 11/2008 | Tidwell | |
| 7,492,308 B2 | 2/2009 | Benayahu | |
| 7,495,198 B2 | 2/2009 | Ari | |
| 7,551,121 B1 | 6/2009 | O'Connell | |
| 7,688,247 B2 | 3/2010 | Anschel | |
| 7,709,772 B1 | 5/2010 | Patel | |
| 8,076,624 B1 | 12/2011 | Barchers | |
| 8,082,832 B1 | 12/2011 | Tidwell | |
| 8,212,709 B2 | 7/2012 | Bradley | |
| 8,258,998 B2 | 9/2012 | Factor | |
| 8,672,223 B2 | 3/2014 | Factor | |
| 8,743,347 B1 | 6/2014 | Corella | |
| 8,885,152 B1 | 11/2014 | Wright | |
| 9,074,854 B2 | 7/2015 | Krupkin | |
| 9,093,822 B1 | 7/2015 | Chann | |
| 9,109,862 B2 | 8/2015 | Factor | |
| 9,170,069 B1 | 10/2015 | Smith | |
| 9,321,128 B2 | 4/2016 | Bradley | |
| 9,620,933 B2 | 4/2017 | Huang | |
| 9,865,985 B1 | 1/2018 | Chann | |
| 11,248,879 B1 | 2/2022 | Barfoot | |
| 2005/0062638 A1 | 3/2005 | Zeineh | |
| 2005/0275582 A1 | 12/2005 | Mohan | |
| 2006/0028373 A1 | 2/2006 | Fullerton | |
| 2006/0060691 A1 | 3/2006 | Burns | |
| 2006/0065774 A1 | 3/2006 | Roques | |
| 2006/0097102 A1 | 5/2006 | Chang | |
| 2006/0103569 A1 | 5/2006 | Pappert | |
| 2007/0052806 A1 | 3/2007 | Bnayahu | |
| 2007/0075182 A1 | 4/2007 | Fetterly | |
| 2007/0201015 A1 | 8/2007 | Gidseg | |
| 2007/0205366 A1 | 9/2007 | Gidseg | |
| 2007/0255672 A1 | 11/2007 | Olsson | |
| 2008/0017752 A1 | 1/2008 | Shukrun | |
| 2008/0018520 A1 | 1/2008 | Moreau | |
| 2008/0111728 A1 | 5/2008 | Stevens | |
| 2009/0224958 A1 | 9/2009 | Aphek | |
| 2010/0126335 A1 | 5/2010 | Saban | |

| | | | |
|---|---|---|---|
| 2010/0253567 A1 | 10/2010 | Factor | |
| 2010/0283655 A1 | 11/2010 | Dunn | |
| 2010/0288877 A1 | 11/2010 | Strabala | |
| 2011/0069145 A1 | 3/2011 | Weber | |
| 2011/0080311 A1 | 4/2011 | Pushkarsky | |
| 2011/0084195 A1 | 4/2011 | Schaub | |
| 2011/0113949 A1 | 5/2011 | Bradley | |
| 2011/0127328 A1 | 6/2011 | Warren | |
| 2012/0033697 A1 | 2/2012 | Goyal | |
| 2012/0068874 A1 | 3/2012 | Corella | |
| 2012/0101658 A1 | 4/2012 | Bradley | |
| 2012/0120972 A1 | 5/2012 | Belenky | |
| 2012/0213513 A1 | 8/2012 | Chao | |
| 2012/0298748 A1 | 11/2012 | Factor | |
| 2013/0082183 A1 | 4/2013 | Mudge | |
| 2013/0140283 A1 | 6/2013 | Bradley | |
| 2014/0027708 A1 | 1/2014 | Goyal | |
| 2014/0102288 A1 | 4/2014 | Yeshurun | |
| 2014/0147116 A1 | 5/2014 | Krupkin | |
| 2014/0209678 A1 | 7/2014 | Factor | |
| 2014/0251123 A1 | 9/2014 | Venema | |
| 2014/0266851 A1 | 9/2014 | Fink | |
| 2014/0368814 A1 | 12/2014 | Krupkin | |
| 2016/0048129 A1 | 2/2016 | Kolanek | |
| 2016/0245907 A1 | 8/2016 | Parker | |
| 2017/0192089 A1 | 7/2017 | Parker | |
| 2017/0300047 A1 | 10/2017 | Kolanek | |
| 2017/0356721 A1 | 12/2017 | Smith | |
| 2018/0267299 A1 | 9/2018 | Sitter, Jr. | |
| 2020/0072582 A1 | 3/2020 | Factor | |

FOREIGN PATENT DOCUMENTS

| | | | | |
|---|---|---|---|---|
| DE | 4402855 C2 | 2/1996 | | |
| EP | 1298408 A2 | 4/2003 | | |
| EP | 1811315 A2 | 7/2007 | | |
| EP | 2083243 A2 | 7/2009 | | |
| EP | 2239595 B1 | 10/2010 | | |
| EP | 2527865 B1 | 11/2012 | | |
| EP | 2811315 A1 | 12/2014 | | |
| EP | 2811315 B1 | 12/2014 | | |
| EP | 2074444 B1 | 8/2017 | | |
| EP | 3798565 A1 | 3/2021 | | |
| EP | 3799009 A1 | 3/2021 | | |
| FR | 2932896 A1 | 12/2009 | | |
| GB | 2342983 A | 4/2000 | | |
| IL | 178525 | 11/2012 | | |
| KR | 10-1057303 B1 | 8/2011 | | |
| WO | 94/11750 A1 | 5/1994 | | |
| WO | 99/62246 A1 | 12/1999 | | |
| WO | WO-2007116403 A2 * | 10/2007 | | F41G 7/224 |
| WO | 2012/052914 A2 | 4/2012 | | |

OTHER PUBLICATIONS

Notice of Allowance ("intention to grant a European patent") in European patent application No. EP 22165611.9, dated Feb. 25, 2025.

Communication from the European Patent Office in patent application EP 22165611.9, dated Jan. 31, 2023.

Communication from the European Patent Office in patent application EP 22165611.9, dated Oct. 5, 2022.

Bernhard Molocher et al., "DIRCM Flash Flight Tests", Emerging Electro-Optic Phenomenology and Technology, Oct. 2005.

* cited by examiner

μDIRCM 101

Dome 111

Beam Steering Optics 110

SIGNALS

Optical Unit 109

SWIR Detector 105

Close Loop IR 108

Laser Emitters 106

Laser Drivers 107

Gimbal 104

COMM

DISCRETES

COMM

Electronic Cards 103

COMM

DISCRETES

POWER

Aircraft 102

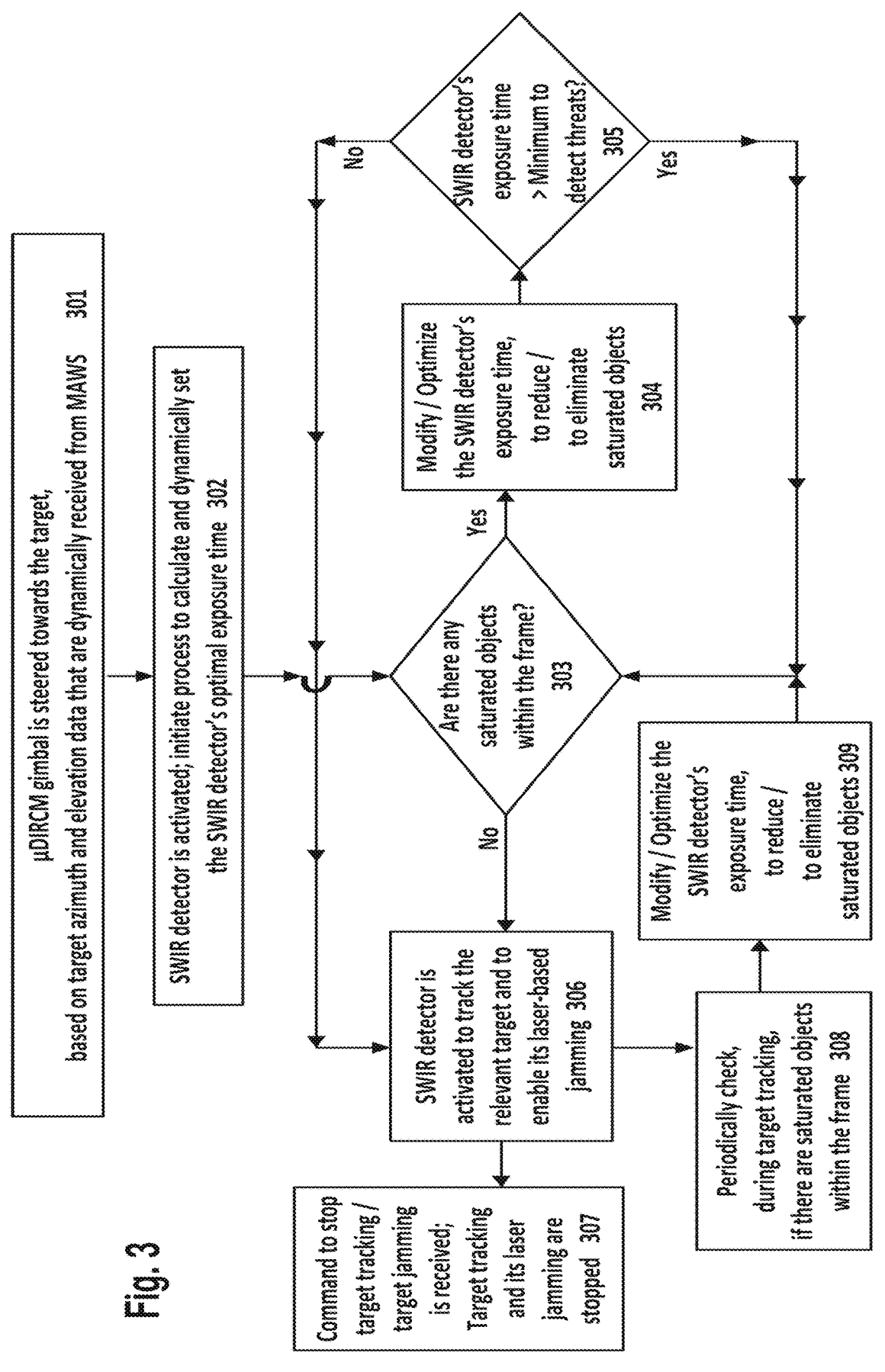

μDIRCM gimbal is steered towards the target, based on target azimuth and elevation data that are dynamically received from MAWS    301

SWIR detector is activated; initiate process to calculate and dynamically set the SWIR detector's optimal exposure time    302

Are there any saturated objects within the frame?    303

Modify / Optimize the SWIR detector's exposure time, to reduce / to eliminate saturated objects    304

SWIR detector's exposure time > Minimum to detect threats?    305

SWIR detector is activated to track the relevant target and to enable its laser-based jamming    306

Command to stop target tracking / target jamming is received; Target tracking and its laser jamming are stopped    307

Periodically check, during target tracking, if there are saturated objects within the frame    308

Modify / Optimize the SWIR detector's exposure time, to reduce / to eliminate saturated objects    309

No

Yes

Yes

No

600

DEVICE, SYSTEM, AND METHOD OF AIRCRAFT PROTECTION AND COUNTERMEASURES AGAINST MISSILES

CROSS-REFERENCE TO RELATED APPLICATIONS

This patent application claims priority from Israeli patent application number 285271, filed at the Israel Patent Office on Aug. 1, 2021, which is hereby incorporated by reference in its entirety.

FIELD

Some embodiments relate to the field of aircraft protection.

BACKGROUND

An aircraft is a machine that is able to fly, for example, by gaining support from the air. An aircraft counters the force of gravity by using static lift, or by using the dynamic lift of an airfoil, or by using downward thrust from jet engines. Common types of aircraft may include, for example, a fixed-wing aircraft such as an airplane, a rotary-wing aircraft or rotorcraft such as a helicopter, an Unmanned Aerial Vehicle (UAV) or a drone, or the like.

Civil aircraft and military aircraft may be exposed to threats from terrorists, military forces, or hostile entities. For example, an enemy soldier or a terrorist may attack an aircraft by launching towards the aircraft a shoulder-launched surface-to-air missile (SLSAM), by using other type of man-portable air-defense system (MANPADS or MPADS), or by using various types of Anti-Tank Guided Missile (ATGM).

SUMMARY

Some embodiments include devices, systems, and methods of infrared countermeasures (IRCM) and direct infrared countermeasures (DIRCM), particularly for protecting aircrafts against MANPADS and ATGM types of incoming threats as well as other types of incoming threats. Some embodiments provide a miniature DIRCM unit, or a mini-DIRCM unit, or a micro-DIRCM unit, or a reduced-size DIRCM unit, or a compact-size DIRCM unit, or a small-form-factor DIRCM unit, which may be referred to as "uDIRCM" or "μDIRCM". The mini-DIRCM unit may include one or more passive optical components and one or more active optical components, in a unified small-size packaging or encapsulation or housing, able to operate even in high temperature environments or extreme thermal conditions.

Some embodiments provide devices, systems, and methods of aircraft protection and countermeasures against missiles and other threats. For example, a system for protecting an aircraft against a missile or a threat, may comprise: a Short-Wave Infrared (SWIR) optical detector or optical sensor or imager; and additional Infrared (IR) detector or sensor or imager; and a directed high-power laser transmitter or laser generator or laser emitter (e.g., that includes one or more laser sources); implemented using built-in or integrated In-Flight Boresight (IFBS) architecture or structure that is based on (or that includes) one or more additional detectors and/or sensors and/or laser emitters to constantly and/or continuously calibrate the directed high-power laser transmitter(s) relative to the SWIR optical detector, optionally utilizing a dual-axis miniature gimbal or small-size gimbal or other dual-axis gimbaling mechanism or gimbaling unit.

In some embodiments, the micro-DIRCM unit may include one or more of several various configurations, wherein these configurations may share some or all of the same electronics components, gimbaling elements, SWIR detector or sensor or imager, and other optical detectors (optionally equipped with one or more optical filters), while also being equipped with one or more types of directed high-power laser transmitter(s) in order to provide a countermeasure capability against MANPADs and/or against ATGMs and/or against other types of missiles or rockets or ground-to-air missiles or air-to-air missiles or other threats.

Some embodiments may provide other and/or additional benefits or advantages.

BRIEF DESCRIPTION OF THE DRAWINGS

FIG. 3 is a flow-chart of a method of optimizing an exposure time of a SWIR-based optical imager or a SWIR-based missile tracking unit, in accordance with some demonstrative embodiments.

DETAILED DESCRIPTION OF SOME DEMONSTRATIVE EMBODIMENTS

Figure 1:
FIG. 1 is a schematic illustration of a system, in accordance with some demonstrative embodiments.

The term "aircraft" as used herein includes, for example, a machine or apparatus able to fly; an airborne platform or object or vehicle; a vehicle or object which is able to fly through the air or through an atmosphere of a planet; a vehicle or object which is able to sustain itself above the ground; a flying machine operated on-board or controlled on-board, by an on-board human pilot or by an on-board human operator; a remote-controlled or remotely-controlled flying machine, operated or controlled remotely by a human operator and/or via another (e.g., flying or non-flying) machine or via a robot or a computer or a control station; an autonomous flying machine, or a self-operated flying machine; an airplane; a helicopter; a manned aircraft; an unmanned aircraft; a Remotely Piloted Vehicle (RPV); an Unmanned Aerial Vehicle (UAV); a fixed-wing aircraft; a rotorcraft or rotary-wing aircraft; an auto-gyro or gyroplane; a powered aircraft; an unpowered aircraft (e.g., a glider, a paraglider, a balloon, a kite); an aircraft having one or more propellers; a jet propulsion aircraft; a military aircraft (e.g., a fighter, a bomber, a fighter-bomber, a ground-attack aircraft, an attack helicopter); a civilian aircraft (e.g., commercial, executive, cargo); a rocket; a missile; a rocket-powered aircraft; a spaceship; a space shuttle; a satellite; a manned or unmanned space vehicle or aircraft or ship; a drone; an autonomous flying device or machine; or the like.

The terms "aircraft" or "protected aircraft" as used herein may relate to an aircraft which is being protected or is intended to be protected against threats and/or against incoming threats and/or against missiles; or an aircraft on which a self-protective unit or system is installed or mounted, or is intended to be installed or mounted; or an aircraft on which the micro-DIRCM unit is installed or mounted, or is intended to be installed or mounted.

The terms "incoming threat", "airborne threat", or "threat", as used herein include, for example, a missile, a rocket, a bomb, a self-propelled projectile, an airborne missile, an airborne object directed towards a protected aircraft, a missile having an engine and/or a warhead, a cruise missile, a guided missile, an air-to-air missile, a surface-to-air missile, a ground-to-air missile, a sea-to-air missile, or the like. In some embodiments, optionally, the term "threat" may relate to (or may include) a verified threat, a non-verified threat, a not-yet-verified threat, a confirmed threat, an unconfirmed threat, a not-yet-confirmed threat, a possible threat, an estimated threat, or other types of threats.

The terms "platform" or "protected platform" or "protected entity", as used herein, may include an aircraft, a vessel, a marine vessel, a boat, a ship, a yacht, a vehicle, a military vehicle, a tank, a construction machine; or other machine that may be protected against missiles or projectiles or threats. In some embodiments, the protected platform may be a non-mobile platform or a stationary platform; for example, a floating oil rig, a marine oil rig, a land oil rig, a tower, or the like.

Some embodiments comprise devices, systems, and methods of infrared countermeasures (IRCM) and direct infrared countermeasures (DIRCM), particularly for protecting aircrafts against various types of missiles. For example, a DIRCM system in accordance with some embodiments may comprise passive optical components and active optical components, in a unified packaging or encapsulation or housing, able to operate even in high temperature environments.

In accordance with some embodiments, an aircraft (or a protected platform) may be equipped with missile protection system, and particularly a man-portable air-defense (MANPAD) protection system implemented as a micro DIRCM device. Such protection system may comprise, for example, one or more imagers or imaging sensors (e.g., Ultra-Violet (UV) or Infra-Red (IR) electro-optic sensors or detectors or imagers) and/or other Missile Warning Sensors (MWS) or Missile Approach Warning (MAW) units (e.g., a pulse-Doppler radar MWS or MAW unit, or a combined imaging and pulse-Doppler radar MWS or MAW unit), in order to sense, detect, confirm, verify and/or track an incoming missile or threat.

In accordance with some embodiments, an aircraft (or a protected platform) may be equipped with one or more types of IRCM or DIRCM devices or systems, to prevent a MANPAD missiles and/or ATGM missiles from hitting the aircraft (or the protected platform). Such IRCM system may comprise one or more types of flares, and/or a Direct Infra-Red Counter Measure (DIRCM) unit, which may generate and emit electromagnetic waves or electromagnetic radiation or electromagnetic beams, at one or more (e.g., particular) optical wavelengths or at a particular band of optical wavelengths and/or at particular segment(s) of the spectrum; including, but not limited to, laser beams laser rays or directed laser radiation or high-power laser radiation.

In accordance with some embodiments, a DIRCM unit may comprise one or more high-power laser transmitters or laser emitters or laser generators or laser units, or other suitable devices (e.g., a lamp or bulb or other optical signal emitter or transmitter or generator), that emit or transmit or generate or produce or output one or more laser beams or laser rays. The emitted laser beams may have one or more particular wavelengths or band(s)-of-wavelengths; such as, but not limited to, visible wavelength, Short-Wave Infra-Red (SWIR) wavelength, Medium-Wave Infra-Red (MWIR) wavelength, Long-Wave Infra-Red (LWIR) wavelength, or any other suitable wavelength value(s) or band(s).

In accordance with some embodiments, a DIRCM unit may generate and emit high-power optical signals, while also maintaining a small form-factor and/or small footprint and/or small physical size and/or a light-weight implementation, in order to allow the mounting and integration of such DIRCM unit on aircrafts (or other protected platforms) with little or minimal adverse impact on the weight and/or size and/or form-factor and/or the aerodynamic properties of such aircraft.

The Applicants have realized that a heavy, large-footprint, large form-factor, large-size, and/or cumbersome anti-missile system, which may be suitable for utilization as a non-flying Surface-to-Air (SAM) ground-based missile defense system, cannot simply be mounted on an aircraft; as such system would have negative and/or determinantal impact on the weight and/or size and/or form-factor and/or the aerodynamic properties of an aircraft and/or the operational properties or constraints of an aircraft. Thus, a custom designed Surface-to-Air (SAM) airborne based missile defense system is disclosed in accordance with some embodiments, and is structured and implemented to protect an aircraft against Surface-to-Air (SAM) missiles threats and/or Man Portable Air Defense Missiles (MANPADs) and/or Anti-Tank Guided Missiles (ATGMs).

The system and units of the present invention are, in some embodiments, light-weight and/or having a small form-factor and/or having a small footprint and/or having an aerodynamic contour and/or are compatible with (and suitable for) mounting on or under an aircraft; in contrast with a heavy, bulky, cumbersome, large form-factor anti-SAM missile-defense system which is not suitable for simply "connecting" to an aircraft, as it would make the aircraft too heavy and/or too large and/or non-aerodynamic and/or less agile and/or less responsive to aerial maneuvers and/or less efficient (e.g., the aircraft's fuel consumption would increase due to the heavy weight, and its flying range would significantly decrease) and/or may cause other operational disadvantages to the aircraft.

In accordance with some embodiments, a laser unit or laser generator which may be part of a DIRCM unit, may comprise or may be based on, for example, Quantum Cascade Laser (QCL) component(s) or QCL technology, laser diode technology, and/or other laser-based technology or components that are capable of performing a successful countermeasure to an incoming threat (e.g., a MANPAD or ATGM). In some embodiments, a hybrid solution may be used; such that a micro DIRCM device includes at least one laser emitter that is QCL based and at least one laser emitter that is based on laser diode, in order to provide versatility and robustness to the micro DIRCM device in countering various missiles and threats.

The Applicants have also realized that the active components of a DIRCM laser unit may have a narrow or very narrow divergence, in order to provide maximum laser power density; since larger DIRCM output power density increases the probability of preventing the incoming threat (e.g., the MANPAD missile) from hitting the aircraft. Accordingly, to support such narrow divergence, in some embodiments an additional tracking sensor may be installed and included as part of the micro-DIRCM architecture and as an integral part of the micro-DIRCM device; since a typical MWS (or MAW unit) by itself may not provide the sufficient accuracy that is required for the optimum or efficient or successful operation of the micro-DIRCM unit. The additional tracking sensor may be, for example, a UV sensor or imager, an IR sensor or imager, a radar-based sensor, a combination of multiple such sensors, a hybrid UV and IV sensor, a hybrid unit of UV sensor and IR sensor, a hybrid unit of radar sensor and UV sensor, a hybrid unit of radar sensor and IR sensor, a triple hybrid unit of UV sensor and IR sensor and radar sensor, or the like. The tracking sensor(s) and/or its individual components may be cooled, for example, using Thermo-Electric Cooling (TEC) units and/or cryogenic coolers. Such tracking sensor(s) may be mounted or installed tightly or in adjacent proximity or in immediate proximity to (or, may be bordering or neighboring to, and co-located with) the DIRCM device and its laser unit(s), to ensure minimum angular error (or angular difference, or optical error or optical difference) between the direction of the tracking sensor(s) and the direction of the DIRCM device's laser unit(s) during actual system operation; to ensure that what the tracking sensor(s) "sense" or "detect", is indeed what the nearby or co-located laser unit(s) "hit" or "disrupt".

Accordingly, the installation or mounting of the DIRCM device and its laser units and the tracking sensor(s), co-located and in proximity to each other and/or adjacent to each other and/or within the same laser-based module that is mounted on the same gimbal or the same gimbaling unit or the same common gimbaling mechanism, further decreases the system's dimensions and/or form-factor and/or footprint and/or weight, yet it also decreases the system's thermal dissipation and the optical error or the angular error or the angular difference or the optical difference between the DIRCM laser unit(s) and the tracking sensor.

Some embodiments provide a micro DIRCM device that is significantly smaller and lighter than a conventional MWS unit or a conventional MWA unit; and also allows installation of multiple, conformal or co-located micro DIRCM units on the same aircraft of host platform.

The Applicants have realized that some conventional DIRCM systems attempt to utilize the same optical detector, that is sed for missile tracking, also for calibration of a laser emitter. However, the Applicants have realized in such conventional system, the optical detector needs to operate within the same range-of-wavelengths as the Middle Infra-Red (MWIR) Band IV laser source; and as a result, the optical detector requires cryogenic cooling in order to be sufficiently sensitive for the applicable missile; and in turn, cryogenically cooled optical detector leads to lower Mean Time Between Failures (MTBF), higher initialization time, larger dimensions, larger complexity, and higher cost. Furthermore, realized the Applicants, such conventional system needs to match the power level of the MWIR Band IV laser source with the receiving dynamic range of the optical detector, to achieve efficient detection and to prevent damage to the optical detector; and such power matching may negatively affect the main functionality of the optical detector, namely its ability to accurately track a missile. Additionally, realized the Applicants, such conventional system may require to place additional reflective elements outside the enclosure that hosts the cryogenically-cooled optical detector and the laser source, such that the emitted laser signal would be reflected back to the cryogenically-cooled optical detector; which in turn significantly complicates and burdens the physical and optical structure of the DIRCM system, and/or significantly limits or constrains its Field of View (FOV), and/or increases the size and weight and foot-print and form-factor of the DIRCM system. Furthermore, realized the Applicants, in some conventional DIRCM systems, the optical detector is capable of operating only in MWIR Band IV range-of-wavelengths, and it cannot be used at all for calibrating other laser emitters that operate in wavelength(s) other than MWIR Band IV range-of-wavelengths.

In contrast, some embodiments of the present invention provide and utilize different optical detectors: a first optical detector that performs missile tracking or target tracking or threat tracking; and a second, separate, optical detector that performs real-time calibration of one or more laser emitters (e.g., of a laser-based jamming unit which operates to jam or disrupt or confuse a missile in flight).

In some embodiments, the first optical detector is a Short-Wave Infra-Red (SWIR) optical detector, and performs target tracking or threat tracking or missile tracking. The usage of such SWIR detector has advantages over the conventional utilization of a MWIR Band IV cryogenically-cooled optical detector; for example, higher MTBF, smaller dimensions, smaller weight, smaller form-factor, smaller footprint, reduced or almost no limitations on heat dissipation, shorter initialization time, and better and more accurate and more reliable performance (e.g., particularly in situations that include fog, rain, snow, dust storm, or other weather-based constraints or obstacles). The first optical detector is utilized exclusively for missile tracking or threat tracking or target tracking; and is not utilized for calibration or real-time calibration of any neighboring or co-located laser emitter(s).

In some embodiments, the second optical detector may include a thermopile IR imaging array, with one or more suitable entry windows or entrance windows for receiving IR optical signals. The second optical detector is utilized exclusively for calibration or real-time calibration of one or more neighboring or co-located laser emitter(s); and is not utilized for missile tracking or threat tracking or target tracking.

For example, the IR imaging array of the second optical detector uses a portion of the optical signal, that is already transported and/or reflected along an existing internal optical path of the DIRCM device. Such signal-portion is reflected or diverted via one or more prisms and/or dichroic mirrors and/or dichroic filters, or other suitable optical elements; thereby eliminating the need to add or to place any additional optical element within the DIRCM device yet not within the internal optical path of the DIRCM device; and also eliminating the need to add or to place any additional optical element outside or externally to the DIRCM device, or outside or externally to its protective dome or radome, or outside or externally to its encapsulation or housing or optical enclosure. Additionally, the IR imaging array may be used to calibrate multiple laser emitters of the DIRCM device, each laser emitter having or generating its own, possibly different, wavelength of laser beam, ranging from UV to LWIR; and without degrading the effective performance of the DIRCM device. Furthermore, the IR imaging array operates in parallel to (and separately from) the SWIR-based optical detector or the SWIR missile tracking unit, and thus does not interrupt and does not negatively affect the missile tracking functionality of the DIRCM device.

In accordance with some embodiments, SWIR-based missile detection and/or SWIR-based missile tracking may be performed based on (or, by detecting and taking into account) the various stages of the motor of the missile.

In accordance with some embodiments, SWIR-based missile detection and/or SWIR-based missile tracking may utilize a method for real-time Automatic Gain Control (AGC) and a method for automatic adjustment and dynamic modification of the Exposure Time or the Integration Time of the SWIR-based detector. The Applicants have realized that in some conventional DIRCM systems, narrow divergence tracking is performed by using an MWIR optical detector that detects missiles based on their engines plume emissions; and such conventional MWIR-based missile tracker is typically based on detection of $CO_2$ gas emissions that are a major part of the plume emission and are detected in the MWIR range-of-wavelengths; however, realized the Applicants, such MWIR-based detection of $CO_2$ gas in plume emissions is often dependent on (or, is adversely affected by) background reflection and/or atmospheric attenuation and/or weather conditions. The Applicants have realized that the adverse effect of atmospheric attenuation on MWIR-based detection is significant, particularly in case of weather conditions such as fog, rain, snow, sand storm, dust storm, and/or other non-calm weather conditions; thereby significantly reducing the effective performance of the missile tracking functionality of the MWIR-based missile tracker, and/or thereby reducing the effective range for missile detection, and/or thereby reducing the accuracy of detection and even causing false negative errors (e.g., failure to detect a missile where a missile is actually approaching; failure to correctly track or detect the angular position of the approaching missile). Additionally, realized the Applicants, although MWIR background reflections may sometimes be small, and thus typically do not require real time AGC, the lack of such real-time AGC algorithm for the optical detector (and particularly for a SWIR-based optical detector) may expose the missile tracking optical detector to strong point reflections leading to saturations and other effects that reduce its effective performance. Further, realized the Applicants, a conventional MWIR-based missile tracker typically needs to have long exposure time, in order to enable it to detect a momentary $CO_2$ gas plume of a missile; and this contradicts the goal of reducing background reflections, since longer exposure times contribute to a greater adverse effect of background reflections.

Conversely, some embodiments, provide a DIRCM device having a SWIR-based optical detector for missile tracking or target tracking or threat tracking. The SWIR-based optical detector utilizes time AGC and real time optimization or modification of exposure time or integration time. Additionally, SWIR-based optical tracking of missiles and threats is less susceptible to adverse weather conditions (relative to MWIR-based tracking), and has a better and longer tracking range (relative to MWIR-based tracking; and particularly in adverse weather conditions); thereby providing a higher probability for successful countermeasure of the missile.

Furthermore, SWIR-based missile tracking and threat tracking is based (exclusively, or mainly) on black body radiation effect due to the high temperature of the plume of the missile (which is often more than 1,000 degrees Kelvin). Such high plume temperature may leads to high intensity values, that can be efficiently and accurately detected by the SWIR-based optical detector, thereby allowing to reduce its exposure time or integration time, by implementing the AGC algorithms, down to the range of 50 to 100 microseconds per exposure time; in contrast with at least 1 millisecond of exposure time that is typically required by conventional MWIR-based missile trackers.

In some situations, daytime background reflections for a SWIR-based optical missile tracker may be higher than those of an MWIR-based optical missile tracker; and, twilight and night-time background reflections for a SWIR-based optical missile tracker may be lower than those of an MWIR-based optical missile tracker. Accordingly, a real-time AGC algorithm or exposure time modification algorithm may be used as part of a SWIR-based missile tracker. The algorithm is firstly applied once the SWIR-based missile tracker is activated and turned (oriented, steered, rotated) towards the missile. Subsequently, the algorithm is applied again, at pre-defined time intervals (e.g., every Exposure Time period-of-time), in order to keep the background reflections below a pre-defined level. Accordingly, a significant dynamic range may be achieved by the SWIR-based optical missile tracker; which in turn reduces or minimizes strong background reflections, particularly during daytime, and/or also increases or maximizes the efficiency and accuracy of the performance of SWIR-based optical missile tracker during twilight and nighttime (e.g., when little or no SWIR-affecting background reflections are typically expected), and thereby providing an improved accuracy and efficiency to a SWIR-based optical missile tracker relative to an MWIR-based optical missile tracker.

Some embodiments may utilize closed-loop IR optical signal processing, for improved missile tracking and/or missile classification, which in turn leads to improved efficiency of countermeasures deployed against such missile or threat. The Applicants have realized that conventional DIRCM systems do not attempt to implement any closed-loop IR optical signal processing for estimating or measuring properties of the tracked missile; and particularly, for attempting to estimate the roll-rate or the self-roll frequency of the missile and/or its turn rate. The Applicants have realized that it may be beneficial to estimate these missile properties, and particularly via a closed-loop IR optical signal receiver and processing unit, in order to obtain additional identifying information or classification information with regard to the approaching missile, which in turn may be used in order to generate and emit towards it a particular type of laser beam, having a particular wavelength or a particular sequence of laser pulses that are pre-defined as effective against this particular type of missile. The Applicants have realized that some conventional DIRCM system have attempted, at most, to utilize the same MWIR-based optical missile tracking unit, for also attempting to estimate the above-mentioned missile properties; however, realized the Applicants, an MWIR-based optical missile tracking unit has and utilizes a high-resolution imager for missile tracking, which in turn has a limited sensitivity per pixel and/or a limited sampling rate (e.g., up to 300 or 400 Hertz); which in turn significantly limits the possibility to implement a closed-loop missile properties estimation capability, and/or may limit the supported range for such estimation, and/or may limit the range of missile frequencies that can be remotely estimated (particularly for MANPADs). Furthermore, realized the Applicants, due to the limited sampling rate of an MWIR-based optical missile tracker, it is difficult or problematic and sometimes impossible to perform accurate, reliable, coherent and/or non-coherent signal processing to improve the sensitivity of the received MWIR signal (e.g., for the purpose of attempting to increase the operational range of a closed-loop algorithm for an MWIR-based optical missile tracker).

The Applicants have also realized that since it is not possible to utilize a conventional MWIR-based optical missile tracker, concurrently, for both missile tracking (which requires an MWIR high-resolution optical imager) and for closed-loop estimation purposes; and therefore, some conventional systems may attempt to use such MWIR-based optical missile tracker by allocating alternating time-slots (e.g., a time-slot in which only missile tracking is performed, and a time-slot in which only closed-loop estimations are performed); but such time-division schemes decrease the reliability or efficiency of the DIRCM system, and/or reduce the probability of successfully countering and jamming the incoming missile, since the missile tracking (in such implementation, if attempted) does not provide continuous missile tracking and always-updated missile tracking.

Conversely, in some embodiments, missile tracking is performed by a dedicated SWIR-based optical detector or by a dedicated SWIR-based optical missile tracker; and separately, a closed-loop IR receiver and signal processing unit performs reception and processing of IR optical signals (e.g., using a single-pixel optical detector or imager; or using a quadrant broadband optical detector or imager; which are more sensitive than a conventional MWIR-based high-resolution optical detector or imager); thereby allowing (in some embodiments) the closed-loop IR receiver and signal processing unit to achieve an effective bandwidth of up to 10 MHz.

Additionally, the first optical detector (for SWIR-based missile tracking) and the second optical detector (for closed-loop IR-based estimation of missile properties), as well as the third optical detector (for real-time calibration of the laser emitters that emit the missile-jamming laser beams) share the same, unified, optical bench or optical rail or optical arrangement, with proper optical filtering in order to minimize the number of optical elements and/or to optimize their optical performance.

Furthermore, by dividing the missile tracking functionality and the closed-loop missile properties estimating functionality, to two separate optical detectors, some embodiments may activate and operate both of these functionalities in parallel or concurrently or simultaneously, without the need to utilize a time-division scheme, without the need to allocate time-slots for exclusive operation of only one functionality; and may thus increase the efficiency and reliability of the DIRCM device, as well as the probability for successful countermeasure of the missile.

Additionally, by using a broadband optical detector having a bandwidth of up to 10 MHz, some embodiments may implement one or more radar signal processing algorithms, such as coherent integration algorithms and/or non-coherent integration algorithms, as well as other radar related algorithms, to improve the sensitivity of the received signal and thus increase the efficiency of the close-loop functionality as well as its maximum operational range.

Some embodiments provide a micro DIRCM device that combines transmission of optical signals and reception of optical signals in the same, unified, combined optical path.

In some embodiments, missile range (namely, the current distance between (i) the missile in flight, and (ii) the micro DIRCM device or the protected aircraft or the protected platform) and missile velocity (namely, the missile flight speed, or the speed of missile flight relative to the ground) may be extracted or estimated, based on QCL and MWIR single pixel receiver, or quadrant receiver capability (LIDAR)

The Applicants have realized that a conventional DIRCM system is equipped with a high-resolution MWIR-based optical imager, which performs missile tracking but is incapable of estimating or measuring or extracting missile range (the current distance of the missile from the protected aircraft) and/or missile velocity. Such estimations are performed, in some conventional systems, by a separate and dedicated hardware unit that is not part of a conventional DIRCM system, due to the constraints and limitations of a DIRCM system as described. The Applicants have realized that adding the internal capability to an autonomous DIRCM device, to not only track the angular position of the missile, but to also estimate the missile velocity and the missile range, may increase the effectiveness and the reliability of the entire DIRCM device, may improve the missile tracking itself, may increase the probability for successful tracking, may reduce the probability for false alarms or false positive errors, and/or may increase the probability of the DIRCM device effectively countering the missile.

The Applicants have realized that a conventional system may attempt to estimate missile range or missile velocity, typically externally from the DIRCM system itself, based on a tracking radar. However, realized the Applicants, a tracking radar unit has various disadvantages, for example, limited angular accuracy (e.g., worse than the accuracy obtained from an optical detector), larger physical dimensions and weight (e.g., due to antenna size), and electromagnetic emissions that may be jammed or disrupted by hostile electronic-warfare systems.

The Applicants have also realized that a conventional DIRCM system, that is equipped with an MWIR-based high-resolution optical imager, cannot perform missile range estimation and/or missile velocity estimation (at all, or sufficiently accurately, or sufficiently reliably); due to its limited sampling rate (e.g., up to 300 or 400 Hertz) which is too low for correctly and reliably measuring the missile's range and/or velocity. The Applicants have realized that a resolution of not more than 20 or 30 meters, and up to 10 meters per second, would be required for providing reliable missile range estimation and/or missile velocity estimation for the purpose of efficiently and rapidly countering the missile in flight.

The Applicants have further realized that a conventional DIRCM system, that is equipped with an MWIR-based high-resolution optical imager, cannot perform missile range estimation and/or missile velocity estimation together with (or, concurrently with, or in parallel to) MWIR-based tracking of the missile itself; due to reasons similar to the reasons explained above with regard to the inability of a conventional MWIR-based high-resolution optical imager to perform, in parallel, both MWIR-based missile tracking and also closed-loop IR-based real-time calibration.

Conversely, some embodiments provide a micro DIRCM device having a SWIR-based missile tracking unit, which is capable to estimate or measure missile range and/or missile velocity together with (or concurrently with, or simultaneously with, or in parallel with) SWIR-based tracking of the missile itself, using a closed-loop functionality utilizing a single pixel detector or a quadrant broadband detector.

For example, in some embodiments, missile range and/or missile velocity may be estimated or measured by the micro DIRCM device by using a QCL modulated pulses that are transmitted towards the missile for its countermeasure and are backscattered from it, and/or by using QCL modulated pulses that are of a dedicated sequence (not countermeasure pulses sequence) that are emitted towards the missile for the purpose of being backscattered from the missile; and then analyzing the backscattered signals to extract from them, or to estimate based on their analysis, the missile range and/or missile velocity; and these extracted parameters may then be used, dynamically and by the micro DIRCM device itself, for one or more real time purposes or improvements, for example, false alarms filtering or error filtering, declaring a false positive error or alarm, classification of a threat or a missile into type(s); and these parameters may further be used in order to select the suitable laser-based jamming or disrupting beam that would be emitted towards the missile, and/or to evaluate the success of countermeasure operations or of laser-based jamming operations.

Some embodiments provide micro DIRCM device, which include: a miniature gimbal mechanism which utilizes mirrors and other optical elements; a SWIR-based missile tracking unit to track the angular position of the missile, and to also extract or estimate missile range and/or missile velocity in real time and in parallel and concurrently (e.g., without using a time-division scheme or allocated time-slots for each purpose); an operable connection to an external directed high-power laser emitter, which may be activated instead of (or, in addition to) one or more DIRCM-internal laser emitter(s) of the micro DIRMC device, and dynamically providing fresh missile tracking data from the micro DIRCM device to such operably-connected external high-power laser emitter; a dynamically tunable piezoelectric lens, capable of dynamically modifying its focal length, which precedes the optical entry window of the SWIR-based missile tracking unit, and which ma thus provide or accommodate various working points for tracking and then countering various different types of missiles or threats (e.g., MANPAD, or ATGM, or other missile).

The Applicants have realized that in a conventional DIRCM system, the optical detector has a fixed non-changing Field of View (FOV); and there is no possibility to tune or to modify the properties and/or the position of the optical elements that are associated with a conventional MWIR-based missile tracking unit and its MWIR-based imager.

The Applicants have realized that adding the capability to tune and to dynamically modify the FOV of the optical detector, and particularly the FOV of the SWIR-based missile tracking unit and its imager, may improve the performance of the DIRCM device; for example, by narrowing the FOV during missile tracking and thus improving the angular resolution and decreasing the probability for false alarms or false positive errors; while also allowing the SWIR-based optical detector to increase its FOV during the target acquisition process (missile acquisition process) in order to improve the probability for success of such initial missile acquisition (e.g., particularly if the initial angular position of the threat, as received from a MWS or MAW unit, is not sufficiently accurate).

The Applicants have realized that there are is no conventional DIRCM device that is equipped with an MWIR-based missile tracking unit that utilizes (or that includes) a tunable piezoelectric lens; and that this may result from various reasons, including since a tunable piezoelectric lens is typically not readily suitable to effectively operate with MWIR range-of-wavelengths. Furthermore, realized the Applicants, in a conventional DIRCM system, the missile acquisition process and its probability for success are degraded in case the missile data (as provided to the DIRCM by the MWS or MAW unit) is not sufficiently precise, and can even lead to target loss by the DIRCM device and its MWIR-based missile tracking unit. Additionally, realized the Applicants, an attempt to increase the FOV of an MWIR-based missile tracking unit, at the initial missile acquisition stage (upon the hand-over from the MWS or MAW unit to the DIRCM system) may degrade the angular accuracy of the optical imager of the MWIR-based missile tracking unit, which in turn may cause failure or degradation of the missile acquisition or the missile tracking by the MWIR-based missile tracking unit.

Conversely, some embodiments provide a micro DIRCM device having a SWIR-based missile tracking unit, which is associated with (or, is optically preceded by) a dynamically tunable or dynamically modifiable piezoelectric lens which is installed inside the micro DIRCM device (and within the protective dome or radome or protective encapsulation or housing of the DIRCM device); and the optical characteristics of the piezoelectric lens are controlled and modified by applying to it a particular electric voltage or electric current (e.g., as controlled by the DIRCM device's electronic cards or processing units).

In some embodiments, the tunable piezoelectric lens initially has a default position and a default FOV that are configured as part of the initial micro DIRCM device configuration properties. Subsequently, the characteristics of the tunable piezoelectric lens of the SWIR-based missile tracking unit is dynamically modified, between the missile acquisition process by the DIRCM device and the missile tracking process by the DIRCM device.

For example, the tunable piezoelectric lens of the SWIR-based missile tracking unit is dynamically configured in real time, firstly to improve the probability of successful missile acquisition by the DIRCM device, and then improve the missile tracking accuracy by the DIRCM device.

For example, the FOV of the SWIR-based tracking unit may be narrowed down to a level that still allows High Power Laser (HPL) narrow-band laser(s) operation, where such laser's common divergence value is in the range of 50 to 200 micro-radians. This value is smaller by approximately 10 to 20 times relative to typical divergence that is designed for laser emitters used for MANPAD countermeasure purposes.

In some embodiments, the tunable piezoelectric lens of the SWIR-based missile tracking unit may further be used for stabilization of HPL beam(s) on the target (on the missile, on the threat); as such HPL emitter may operate in wavelengths that are covered by the SWIR-based optical imager of the SWIR-based missile tracking unit with its associated tunable piezoelectric lens.

Some embodiments provide a micro DIRCM device having a dedicated configuration for jamming or disrupting or confusing or countering Anti-Tank (AT) missiles, while also using the SWIR-based missile tracking unit for laser beaming detection purposes and for detecting a laser-guidance beam that the AT missile may "ride on" or may follow in its flight.

The Applicants have realized that a conventional DIRCM system is typically incapable of effectively countering or jamming or disrupting an Anti-Tank (AT) missile or an Anti-Tank Guided Missile (ATGM). The Applicants have also realized that in order to achieve effective countering or jamming or disrupting of an AT missile or an ATGM, a different type of laser emitter should be used, rather than laser emitter(s) that may be used to counter MANPADs or non-AT missiles. The Applicants have further realized that an MWIR-based missile tracking unit is virtually useless or non-effective for the purpose of tracking and/or countering and/or laser-based jamming of an AT missile or an ATGM. The Applicants have also realized that a conventional DIRCM system having a conventional MWIR-based missile tracking unit cannot effectively provide a hybrid functionality of laser-based jamming of both MANPADs and AT missiles; and that merely performing small design adjustments to a conventional DIRCM system having a conventional MWIR-based missile tracking unit would not yield a DIRCM system that is effectively capable to perform laser-based jamming of AT missiles and/or ATGMs. For example, realized the Applicants, an MWIR-based optical imager of a conventional DIRCM system is not beneficial for laser-based jamming of AT missiles; but rather, realized the Applicants, it may be beneficial to detect a laser guidance beam that is generated and emitted by a launcher station or a control station of an AT missile or an ATGM which is a laser beam riding missile, and that such laser emissions of a laser guidance beam have non-MWIR wavelength (and thus an MWIR-based optical detector is not useful at all to detect them), and they typically have a SWIR wavelength which can be detected by a SWIR-based optical detector of the DIRCM device of some embodiments.

The Applicants have also realized that conventional systems that are used for AT missile jamming are bulky and cumbersome, have large dimensions and sizes, are heavy and weight hundreds or tens of kilograms; and are thus not suitable for simply mounting onboard an aircraft or an airborne platform, particularly if such AT missile jamming system needs to be mounted in addition to an entirely separate system which performs countering and jamming of MANPADs.

Conversely, some embodiments provide a micro DIRCM device which is re-usable and re-configurable for jamming and disrupting AT missiles and/or ATGMs. For example, a first micro DIRCM device may be installed on an aircraft (or on a protected platform, such as vessel or vehicle) and may be pre-configured to perform jamming of non-AT missiles (such as MANPADs); and additionally, a second micro DIRCM device may be installed on the same aircraft (or in the same protected platform) in order to specifically dam or counter AT missiles and ATGMs.

In some embodiments, each such micro DIRCM device may have a small form-factor and may be lightweight (e.g., total weight of the micro DIRCM device may be under 4 kilograms), and each such micro DIRCM device may be implemented as a fully conformal device to enable such installation onboard various airborne platforms or other protected platforms.

In some embodiments, the micro DIRCM device is configured to be particularly useful against AT missiles and ATGMS. For example, a SWIR-based missile tracking unit is used; optionally without the optical filter that is placed for optimization of MANPADs acquisition and tracking. The SWIR-based missile tracking unit is configured to track both (or at least one of) the AT missile and/or the laser guidance beam that such AT missile may be following or may "ride on". The micro DIRCM device may estimate or detect the angular location of the laser emitter (e.g., typically located in a control station or a launcher station) that emits the laser guidance beam; thereby enabling an internal laser emitter of the micro DIRCM device and/or an external HPL emitter that is operably associated with the micro DIRCM device to emit jamming laser beams to jam or confuse or disrupt the emitter of the laser guidance beam. Such data extraction may allow optimized or improved laser-based jamming of AT missiles that are laser-beam-riding, and/or the laser emitters or laser sources that guide such AT missiles in flight; and may further allow to utilize, for such jamming purposes, a laser source or an HPL source having a narrow divergence, to thereby increase the power density of the laser beam on the target. In some embodiments, to efficiently and/or rapidly jam or disrupt an AT missile that is laser beam riding, the system of some embodiments may utilize large power density or large radiant intensity (e.g., radiant intensity of at least 10 W/sr or Watts per steradian); and the narrowed divergence of the laser source may allow utilization of a less-powerful laser emitter, thereby enabling implementations that may be lightweight, may have small form factor, and may be airborne.

In some embodiments, the SWIR-based optical detector of the SWIR-based missile tracking unit of the micro DIRCM device may be capable of measuring laser pulses properties during its operation; and such capability may assist in optimizing or modifying the waveform of the laser-based jamming beam in real time operation, while fully re-using the structure of the micro DIRCM device.

Reference is made to FIG. 1, which is a schematic illustration of a system 100, in accordance with some demonstrative embodiments. System 100 comprises an aircraft 102 that is protected by a micro DIRCM device 101, or a "μDIRCM" device or a miniature DIRCM device or a mini-DIRCM device, which is particularly configured and suitable for jamming or countering or disrupting a MANPAD.

The micro DIRCM device 101 may be mounted on, or mounted under, or connected to aircraft 102 via mechanical connectors and/or mechanical mounting units, as well as signal connectors or signal interface units (e.g., discrete or discretes Input/Output interface), and power connectors or power interface units. In some embodiments, optionally, micro DIRCM device 101, or other micro DIRCM devices that are described and/or shown herein, and/or a set or a plurality of several such micro DIRCM devices, may be implemented as a single Line Replacement Unit (LRU), which may be readily and efficiently attached to an aircraft and detached from an aircraft, and/or which may be readily and efficiently replaced and/or connected and/or disconnected relative to an aircraft.

The micro DIRCM device 101 may be operably connected to one or more systems and/or sensors and/or units of aircraft 102; for example, one or more Missile Warning Sensor (MWS) units or Missile Warning System (MWS) units or Missile Approaching Warning (MAW) systems or units; one or more Multi-Function Display (MFD) units; power generators or power sources or power supply units; Weight on Wheels (WoW) switch units or detectors (e.g., indicating whether the aircraft is airborne or is on the ground non-airborne), and/or other units. More than one micro DIRCM device 101 may be installed or mounted on a single aircraft 102, in order to provide more effective countermeasure effectiveness, and/or in order to provide increased coverage or increased protection towards threats that may be incoming from different sides of the aircraft 102.

The micro DIRCM device 101 includes electronics cards 103 (e.g., including, or implemented by using, a processor, a controller, a logic unit, a Central Processing Unit (CPU), a Graphics Processing Unit (GPU), a Digital Signal Processor (DSP); operably associated with a memory unit and a storage unit), that may perform processing operations and electronic control functions, and/or that may control other units of the micro DIRCM device 101; for example, controlling and/or commanding and/or modifying the operational properties of a gimbal 104 or gimbaling unit or gimbaling mechanism; controlling and/or modifying the operational properties of a SWIR detector 105 and its data reception and its image processing functionality; controlling and/or modifying the operational properties of one or more laser emitter(s) 106 and/or laser driver(s) 107; controlling and/or modifying the operational properties of a close loop IR receiver 108 and its data reception and its processing functionality; and/or other processing operations and control operations.

A miniature or reduced-size dual axes (or dual axis) gimbal 104 (or gimbaling unit, or gimbaling mechanism) may be an integral or integrated part of the micro DIRCM device 101, and may comprise an azimuth motor and an elevation motor, as well as one or more suitable encoders (e.g., motion control encoders), in order to allow two-dimensional movement or three-dimensional movement of one or more (or all) of the components of the micro DIRCM device 101, or of the entirety of the micro DIRCM device, or of (at least) a beam steering optics 110 of the micro DIRCM device; for example, the gimbal 104 enabling such movement with an accuracy level that is at least 100 micro-radians, or enables movement in discrete steps of not more than 100 micro-radians per movement step. Such movement accuracy may be achieved, for example, by using direct drive motors, high resolution digital motion encoders, and/or high sampling rate control algorithms that are implemented as part of electronics cards 103. In some embodiments, gimbal 104 need not move, and does not move, the entirety of the micro DIRCM device 101, as some components of the micro DIRCM device 101 may (in some embodiments) remain non-moving and/or non-rotating relative to the aircraft; thereby allowing the gimbal 104 to be agile and to operate efficiently, and allowing the gimbal 104 to rotate or spin or move or to spatially re-orient only particular components (e.g., elevation axis compartment, mirrors, and/or other components required for efficient angular coverage) of the micro DIRCM device 101 which are required to be moved in order to achieve effective jamming or disrupting or countering of a missile or a threat (e.g., spatially moving the beam steering optics 110) and/or required for efficient angular coverage by the micro DIRCM device 101; and without moving other elements or units of the micro DIRCM device 101 which need not be moved (e.g., electronics cards 103; power source; connectors; or the like).

The SWIR detector 105 (which may also be referred to herein as SWIR sensor, or SWIR tracking unit, or SWIR tracker, or SWIR-based threat tracker or tracking unit, or SWIR-based missile tracker or tracking unit) may include a high-resolution camera or imager, with a filter to exclusively pass in Short-Wave Infrared (SWIR) signals, and to filter-out or discard or block other (non-SWIR) signals or optical signals. In some embodiments, the SWIR detector 105 and its filter-in mechanism receive and filter-in and analyze only optical signals having wavelength(s) in the range 1,400 to 3,000 nanometers.

In some embodiments, the SWIR detector 105 and its filter-in mechanism receive and filter-in and analyze only IR signals that are non-NIR and non-MWIR and non-LWIR, thereby excluding Near IR (NIR) signals and excluding Midwave IR (MWIR) signals and excluding Longwave IR (LWIR) signals from being received and/or processed. The Applicants have realized that a SWIR-based detector or imager or threat tracker or missile tracker, may be the most suitable and efficient sensor or detector or tracking unit, for purpose of tracking a missile or a threat; rather than other types (e.g., non-SWIR types) of tracking sensors or tracking units. The SWIR detector 105 is cooled by one or more cooling methods or cooling units, for example, by TEC unit(s) mounted on (or near, or at) a baseplate or a base unit of the SWIT detector 105.

The SWIR detector 105, as well as the laser emitters 106, are constantly or continuously calibrated relatively to each other, or are dynamically calibrated every T milliseconds, e.g., every 500 or 1,000 or 3,000 milliseconds; wherein T is a pre-defined value, or wherein T is a dynamically-configurable value that may be dynamically configured or modified based on an ad hoc situation. The dynamic calibration is performed in order to compensate for optical movement or angular error that may appear or occur due to environmental changes and/or thermal changes and/or pressure changes and/or mechanical changes and/or due to aging of components.

Laser emitters 106 may include multiple laser sources that are based on QCL and/or solid-state diode technologies and/or laser diode technologies, and may generate and emit laser beam(s) at one or more particular or pre-defined wavelengths in order to provide an effective countermeasure or jamming or disruption against MANPADs and/or other missiles. In some embodiments, some or all of laser emitters 106 may be replaced by (or, may be augmented with) other laser sources that are based on QCL and/or solid-state technologies and/or laser diode technology, in order to provide an effective countermeasure or jamming or disruption against ATGMs. In other embodiments, one or more of laser emitters 106 may be replaced by (or, may be augmented by) a fiber optic entrance or entry node or fiber optic connector or socket or interface, as well as a suitable optical design or optical structure or optical arrangement, in order to connect an external laser source or external directed high-power laser emitter (that is external to the micro DIRCM device 101, yet is located in proximity to the micro DIRCM device 101) in order to provide an effective countermeasure or jamming or disruption against additional types of ATGMs or other missiles or other threats; such additional or external laser source may be an integral part of the aircraft, or may be part of another unit of the aircraft or may be part of another protection system of the aircraft, and may be able to generate laser beams having a higher laser power relative to the laser power that the micro DIRCM device 101 may be able to generate internally within the micro DIRCM device; since the micro DIRCM device is structure to be light-weight and to have a small form-factor, thereby slightly limiting the power of the laser beams that it may generate internally; whereas, a laser emitter that is external to the micro DIRCM device, may not be subject to such constraints, or may have more relaxed constraints of weight or form-factor relative to those of the micro DIRCM device. Some embodiments may utilize an external high-power laser emitter or laser transmitter, which may be located or mounted externally to the micro DIRCM device, but may be operably associated with the micro DIRCM device, in order to provide efficient jamming and counter-measuring against Anti-Tank (AT) missiles. Such optional external high-power laser emitter may be operably connected to the micro DIRCM device via its optical paths; and the system may utilize the SWIR-based imager and optical tracker to enable the micro DIRCM device's internal laser emitters to operate together with the external high-power laser emitter in order to effectively jam or disrupt AT missiles.

In some embodiments, laser emitters 106 may include at least: a first laser emitter that is configured to generate and emit laser beams at a first pre-defined wavelength that is particularly effective against MANPAD threats; and also, a second, different, separate, laser emitter that is configured to generate and emit laser beams at a second, different, pre-defined wavelength that is particularly effective against ATGM threats. In some embodiments, a Laser Wavelength Selector unit may operate to select or set or modify or dynamically configure the wavelength of the laser beam(s) that is (are) emitted towards a threat, while taking into account an indication whether the threat is MANPAD or ATGM. For example, if the system determines that the threat is a MANPAD, then the system may select or command its laser emitter(s) to emit towards such threat, laser beam(s) having Ultra Violet (UV) wavelength and/or SWIR wavelength and/or MWIR wavelength. In contrast, if the system determines that the threat is an ATGM, then the system may select or command its laser emitter(s) to emit towards such threat, laser beam(s) having Visible wavelength and/or NIR wavelength and/or SWIR wavelength and/or MWIR wavelength and/or LWIR wavelength.

In some embodiments, electronics card 103 or a processing unit or processor may selectively activate only one of those laser emitters, based on a detection or based on a classification by the micro DIRCM device of a particular threat as either a MANPAD or an ATGM. In some embodiments, both types of laser emitters may be activated in parallel to each other, concurrently and/or simultaneously, if the micro DIRCM device cannot or did not yet classify the particular threat as either a MANPAD or an ATGM.

An optical unit 109 of the micro DIRCM device 101 may comprise, for example: the SWIR detector 105; laser emitters 106; laser drivers 107; closed loop IR receiver 108; and additional optical elements such as (but not limited to) filters, prisms, mirrors, planar mirrors, curved mirrors, concave mirrors, convex mirrors, focusing lenses, other types of lenses, beam splitters, and/or beam combiners. The optical elements of optical unit 109 may operate to collimate, unify, combine, divide, focus, filter, amplify and/or magnify the incoming and/or outgoing optical signals, passing through the beam steering optics 110 and the miniature dome 111.

The closed loop IR receiver 108 may operate to receive and analyze IR signals of the threat, in order to estimate in a closed loop process whether jamming or countering operations are effective and are succeeding in countering the threat (e.g., the threat is observed, or is detected by its IR signature, to be turning away from the direction of the protected aircraft) or is non-effective (and thus, triggering a modification to one or more operational properties of one or more components of the micro DIRCM device). The closed loop IR receiver 108 operates to receive the backscattered laser pulses or backscattered laser signals, that are backscattered from a threat (e.g., a missile in flight) in response to the micro DIRCM device's laser beam(s) and/or laser pulses that were emitted and transmitted by the micro DIRCM device towards such threat. Upon receiving the backscattered laser pulses or signals, the closed loop IR receiver 108 samples them and provides their samples to a processor or processing unit (e.g., electronic card) of the micro DIRCM device for processing purposes, in order to extract from them threat parameters, such as threat range, threat velocity, and/or threat's internal frequency or frequencies.

The miniature dome 111 of the micro DIRCM device 101 covers and protects and encapsulates at least (or conversely: exactly) the gimbal 104 and the beam steering optics 110; while also providing a sealing and aerodynamic compliance to the other components of the micro DIRCM device 101. For demonstrative purposes, the miniature dome 111 is depicted as being located above the beam steering optics 110, in order to not over-crowd the drawing; however, the miniature dome may also cover and protect and encapsulate the gimbal 104, and optionally also other components of the micro DIRCM device 101.

The miniature dome 111 may be formed or constructed from one or more materials that are transparent to UV wavelengths, and/or to visible wavelengths, and/or to IR wavelengths, and/or transparent to other types of optical signals; for example, formed of Sapphire and/or Magnesium Fluoride. The miniature dome 111 protects the mechanical and optical elements of the micro DIRCM device 101, and may be constructed from one or more optical windows of different types and shapes; and may be dome shaped or semi-sphere shape or hemispheric shape, or may have a geometrical outline or contour which may not necessarily be a hemispherical dome.

In some embodiments, optionally, a first portion of the miniature dome 111 may be formed of a first material that provides a first optical window that is transparent to optical signals in a first band of wavelengths but is non-transparent to optical signals in a second band of wavelengths; whereas, a second, co-located, portion of the miniature dome 111 may be formed of a second, different, material that provides a second optical window that is non-transparent to optical signals in the first band of wavelengths but is transparent to optical signals in the second band of wavelengths; thereby providing a single miniature dome 111 that is able to efficiently serve different optical components, for example, by selectively providing to a first optical component a first particular characteristic of transparency and optical non-transparency, and by selectively providing to a second optical component a second particular characteristic of transparency and optical non-transparency.

Figure 2:
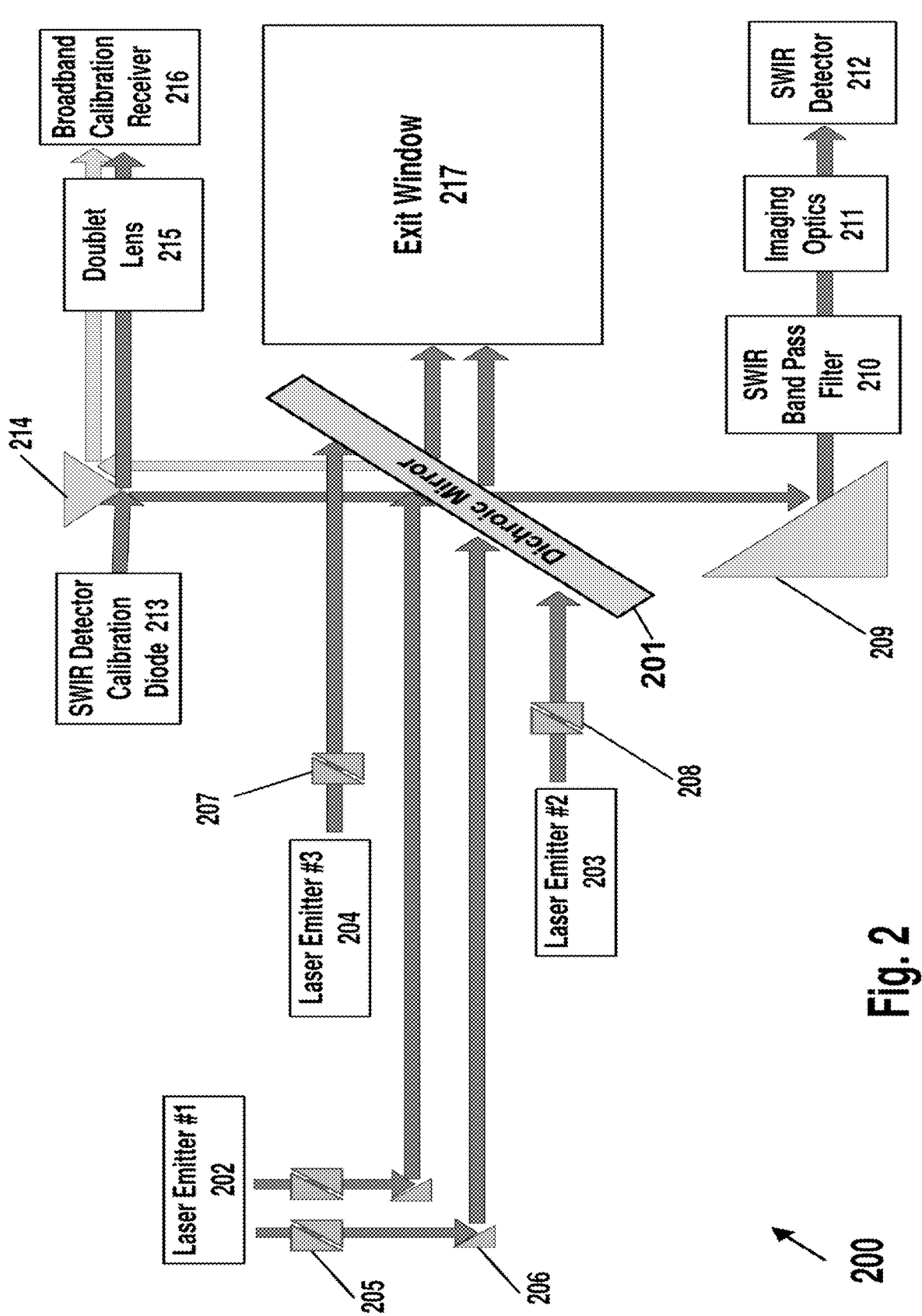
FIG. 2 is a schematic illustration of a self-calibrating optical system, in accordance with some demonstrative embodiments.

Reference is made to FIG. 2, which is a schematic illustration of a self-calibrating optical system 200, in accordance with some demonstrative embodiments. Optical system 200 may be part of the micro DIRCM device 101; for example, as a specific implementation of optical unit 109, or as an additional component of micro DIRCM device 101, or as an implementation of some of the components of micro DIRCM device 101.

The self-calibration is constantly or continuously or dynamically applied or performed, during the operation of the micro DIRCM device, in order to compensate for possible or momentary or ad hoc angular errors or optical errors (or angular difference or optical difference, or angular mis-alignment or optical mis-alignment) between the laser emitters and the SWIR detector; or between (i) the spatial direction or spatial orientation of the laser emitters (or one of them, or all of them, or some of them), and (ii) the spatial direction or spatial orientation of the SWIR detector. Such angular errors or angular differences or mis-alignments may be ad hoc errors or differences, or may be momentary errors or differences, or may be momentarily-changing angular errors or angular differences, which may be introduced or caused due to a variety of conditions, including environmental conditions, thermal conditions, pressure conditions, aging of components, and/or other causes which may result in some deviation of optical performance or some deviation from perfect or near-perfect optical alignment relative to the factory-based calibration and/or alignment of the micro DIRCM device and its internal components.

A dichroic mirror 201 (or a dichroic filter; or other optical element that allows optical signals of a first wavelength to pass through it, and reflects optical signals of a second, different, wavelength) is used for splitting and combing various signals from laser emitter #1 (202), from laser emitter #2 (203), from laser emitter #3 (204), from SWIR detector 212, from SWIR detector calibration diode 213, and from broadband calibration receiver 216. The number of laser emitters in FIG. 2 is for demonstrative purposes only, and can be different from three where integration of more (or conversely, less) laser emitters and/or receivers within the described structure is implemented using various suitable techniques.

Optical signals from laser emitters 202, 203 and 204 are transmitted through or by various optical elements (such as prisms 206, 214; calibration wedges 205, 207 and 208) to the dichroic mirror 201; which splits these optical signals between, for example: a major portion of the optical signals that is emitted to the exit window 217, and a minor portion of the optical signals that are emitted through the doublet lens 215 to the broadband calibration receiver 216 (or broadband calibration unit).

For example, the broadband calibration receiver 216 receives portions of signals that are originated by the micro DIRCM device's laser emitters. The broadband calibration receiver 216 also receives signal(s) from the SWIR calibration diode 213 (or SWIR calibration LED). The broadband calibration receiver 216 continuously or constantly measures these received signals and their angular positions, and compares them to the values that were measured in laboratory conditions or factory conditions (e.g., as part of the assembly or manufacturing process of the micro DIRCM device). After comparing these values, a suitable compensation is determined and performed in order to calibrate the optical tracker and laser emitters altogether.

The doublet lens 215 includes two optical lenses that are glued or cemented together, with no gap or no air-gap between them; to eliminate reflection losses of air-glass surface interfaces, prevent total reflection of some rays due to critical angle, and/or to obtain other advantages.

In addition, the SWIR detector calibration diode 213 emits an optical signal through prism 214, dichroic mirror 201, SWIR band pass filter 210, and imaging optics 211 to the SWIR detector 212. Part of optical signal emitted by SWIR detector calibration diode 213 is reflected from prism 214 through the doublet lens 215, and is received by broadband calibration receiver 216 together with the optical signal from laser emitters 202, 203 and 204.

This calibration is performed firstly for the micro DIRCM device during its assembly and factory testing and setting process, where default initial calibration values are measured and are set or configured inside the micro DIRCM device configuration. Then, during the micro DIRCM device operational use onboard the aircraft, a dynamic calibration is constantly or continuously performed (or, is performed at pre-defined time intervals, such as every T seconds, wherein T is a pre-defined value) to minimize or reduce the angular errors between the laser emitters 202, 203, 204 and the SWIR detector 212 that may be introduced due to various conditions or causes (environmental, thermal, physical, vibrations, shocks, pressure, aging of components, or the like).

The calibration values that are measured during such operational use of the micro DIRCM device are taken into account relative to the factory calibration values; for example, an independent SWIR detector 213 calibration may be performed, an independent laser emitters 202, 203 and 204 calibration may be performed, and the relationship between the SWIR detector 213 calibration and laser emitters 202, 203 and 204 calibration is achieved through the SWIR calibration diode 213 calibration as performed via the broadband calibration receiver 216.

Reference is made to FIG. 3, which is a flow-chart of a method of optimizing an exposure time of a SWIR-based optical imager or missile tracking unit, in accordance with some demonstrative embodiments. The method may be applied to the SWIR detector (or SWIR tracker, or SWIR missile tracking unit) that is part of the micro DIRCM device, in accordance with some embodiments. The method is applied during the SWIR detector operation, in order to overcome or reduce or eliminate or discard background saturation(s) and/or artifacts that may be present in the SWIR detector's field-of-view (FOV) and which may negatively affect its performance.

The Applicants have realized that the exposure time or the integration time of the SWIR detector, may need to be dynamically calibrated or modified or fine-tuned or optimized; in order to ensure that the SWIR detector operates accurately and efficiently, and/or in order to reduce or eliminate false-positive detection errors (e.g., detecting a background cloud as a missile), and/or in order to reduce or eliminate false-negative detection error (e.g., failing to detect a missile that is actually depicted in an acquired image or frame). The Applicants have also realized that such optimization or calibration may be performed, for example, by searching for saturated or overly-saturated objects within an image or a frame, such as, one or more object(s) that have a contrast level that is greater than a pre-defined value and/or a color level that is greater than a pre-defined value and/or a brightness level that is greater than a pre-defined value. The Applicants have realized that the exposure time of the SWIR detector may be gradually modified (e.g., decreased, or conversely, increased), while counting the number of such saturated or over-saturated objects, in a manner that causes the number of such saturated or over-saturated objects to decrease and even reach zero; thereby calibrating or optimizing the exposure time of the SWIR detector. The Applicants have also realized that such calibration or optimization process should be done dynamically and in real time (e.g., while the aircraft is airborne and while a missile is approaching); since, for example, a factory-based calibration or optimization does not take into account the ever-changing conditions or visual appearance of the surrounding of the aircraft, or the possibly-incorrect detection or classification of a background item (e.g., cloud, mountain peak) as a missile or a threat.

For example, the gimbal of the micro DIRCM device is steered or rotated or spatially re-oriented (block 301) towards the target, in the azimuth direction and the elevation direction. In some embodiments, such rotation or movement or spatial re-orientation is performed while the SWIR detector is turned off or is de-activated or is non-operational; in order to prevent the SWIR detector from capturing—and starting to analyze or process—frames or images or background frames or background images that are already known to not yet include the missile (or the threat); and thus, to prevent the processing circuits (e.g., electronic cards, processor, or other processing unit of the SWIR detector and/or of the micro DIRCM device) to start treating such frames as frames that possibly include the missile therein when it is known that they do not. The azimuth and elevation directions are provided to the gimbal based on the threat's current angular data as obtained from an external MWS or MAW unit (which are external to the micro DIRCM device), wherein such data is constantly or continuously or dynamically updated by such external MWS or MAW unit.

After (and only after) the azimuth and elevation movements were performed, the SWIR detector is activated (block 302), when the relevant background (and typically also the tracked missile or the tracked threat) is already within the SWIR detector's field-of-view (FOV). As part of SWIR detector activation, one or two or several (e.g., five) frames are captured by the SWIR detector, in order to initiate the method for removal of saturated objects from the background that is within the SWIR detector's field-of-view (FOV), thereby initiating the method of calculating and dynamically determining and dynamically fine-tuning and optimizing the exposure time of the SWIR detector.

The method continues by checking or determining whether one or more saturated objects are detected within the captured frame(s) of the SWIR detector frame (block 303). If the check result is positive, then the SWIR detector's exposure time is decreased (block 304); for example, by a pre-defined time-interval (e.g., decreased by 0.01 seconds) or by a pre-defined percentage (e.g., decreased by 1.5 percent). As indicated by blocks 303-305, these steps are repeated until the value of the exposure time value reaches a pre-defined minimum exposure time value (block 305) and thus it is not possible to further reduce the exposure time without having a negative impact on its capability to detect threats. In other words, the reduction of the exposure time of the SWIR detector may be performed, gradually and repeatedly, as long as there are still one or more saturated object(s) in a freshly-captured frame, and as long as the pre-defined minimum permissible value of exposure time has not been reached.

Accordingly, after each step of reduction of the SWIR detector's exposure time, one or more additional background frames are captured and analyzed using the SWIR detector, in order to check whether there are any saturated objects within the field-of-view; and the check for saturated targets presence within the SWIR detector's field-of-view (block 303) is performed or repeated until there are no more saturated objects in a freshly-captured frame, or until the pre-defined minimum permissible exposure time value has been reached, according to the earlier of the two conditions.

If, or when, the check of block 303 has a negative result (namely, there are no saturated objects in a freshly-captured frame), then the method proceeds with the operations of block 306 and onward. Similarly, if the pre-defined minimum permissible exposure time value has been reached (block 305), then the method proceeds with the operations of block 306 and onward.

As indicated in block 306, the SWIR detector is now activated or operated to track the relevant target that the micro DIRCM device is intended to track and jam or disrupt. Tracking data from the SWIR detector, with regard to the current location and/or velocity of the missile, is dynamically transferred to one or more other units of the micro DIRCM device and/or the aircraft, and/or to the gimbal in order to modify the spatial orientation of the laser beam(s) that are directed towards the missile in order to jam or disrupt it. The dynamic output from the SWIR detector thus supports support the lasing functionality (e.g., the laser-based jamming and disrupting functionality) of the micro DIRCM device, for effective and successful countermeasure of the missile. Such laser-based jamming and disruption of the missile, based on dynamically updated data from the SWIR detector, may be performed until a command to stop target tracking is received or until a command to stop target jamming is received (block 307); and upon such command, the target tracking and/or its laser-based jamming are stopped.

During the ongoing target tracking by the SWIR detector (block 306), additional checks are made in a periodic manner in order to re-optimize or re-calibrate the exposure time of the SWIR detector. The Applicants have realized that in order to further improve the accuracy of the SWIR detector and/or the efficiency of the countering operations against the threat, it may be beneficial not only to optimize the exposure time of the SWIR detector initially at the commencement of the target tracking, but rather, it may be beneficial to re-optimize the exposure time during the actual target tracking itself. For example, a periodic check is made, every T milliseconds (e.g., every 500 or 1,000 or 2,000 milliseconds; wherein T is a pre-defined value), for saturated objects presence in a freshly-captured frame (block 308). If one or more saturated objects are found within a frame, then the method proceeds (block 309) to decrease the exposure time of the SWIR detector (unless the minimum permissible value of exposure time has been reached). The steps of blocks 306, 308 and 309 may be repeated, with the check of block 303, as long as the SWIR detector is still tracking the target, and as long as there are one or more saturated objects in a freshly-captured frame, and as long as the minimum permissible value of exposure time was not yet reached.

In some embodiments, optionally, one or more other conditions and/or additional conditions may be used in order to cause reduction of the exposure time of the SWIR detector. For example, one or more exposure time reduction rules may be enforced, to cause an additional reduction of the exposure time of the SWIR detector if the size of the tracked target is greater than a pre-defined value, or if the size of the tracked target is smaller than a pre-defined value, or if the color intensity or color contrast or color brightness or color level of the tracked target is greater than a pre-defined value, or if the color intensity or color contrast or color brightness or color level of the tracked target is smaller than a pre-defined value, or if the shape of the tracked target conforms to a particular pre-defined shape or to a particular pre-defined ratio of length-to-width, and/or based on other rules or conditions.

For demonstrative purposes, the method of optimizing or adjusting the exposure time of the SWIR detector is demonstrated by implementing reduction or decrease of the exposure time in pre-defined reduction intervals; however, some embodiments may perform such optimization or adjustment by performing an increase of the exposure time at pre-defined increase intervals (e.g., starting from a fresh frame in which no saturated or over-saturated objects are detected, and increasing the exposure time until the appearance of at least one over-saturated object, and then using that exposure time value or the time value that was immediately prior to the last increase of the exposure time); or, in some embodiments, the optimization process of the exposure time may utilize both time reduction and time increase operations. In some embodiments, the optimization process may further take into account one or more Exposure Time modification rules that take into account (or that are based on), at least, a particular configuration of the micro DIRCM device, a size of the tracked missile or threat or target, a type of the tracked missile or target or threat, a color intensity (or contrast, or brightness, or color saturation) of the tracked missile or threat or target, and/or other parameters. For example, as a demonstrative optimization rule, if the color saturation of a detected missile is greater than a pre-defined value that indicates a significant over-saturation, then the reduction of the Exposure Time may be performed at twice or three-times of the regular reduction interval. In another demonstrative example of an optimization rule, if a freshly captured frame shows at least N over-saturated discrete (separate) objects, wherein N is a predefined number (e.g., N being 3 in an example), then the reduction of the Exposure Time may be performed at twice or three-times of the regular reduction interval. Other suitable optimization rules or conditions may be used.

Figure 4:
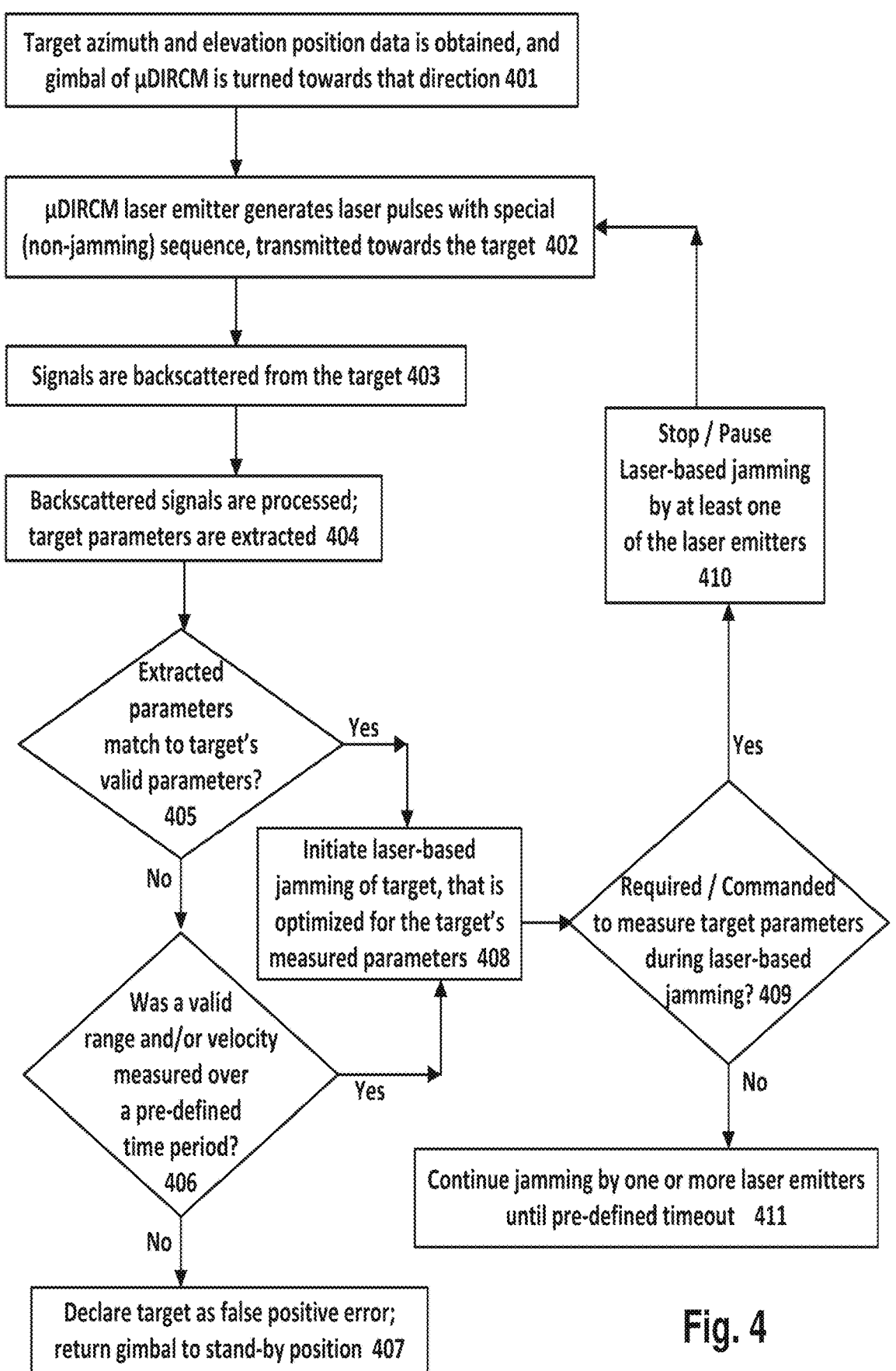
FIG. 4 is a flow-chart of a closed-loop method of extracting missile range and missile velocity, in accordance with some demonstrative embodiments.

Reference is made to FIG. 4, which is a flow-chart of a closed-loop method of extracting missile range and missile velocity, which may be used by the micro DIRCM device, in accordance with some demonstrative embodiments. This method may be applied during the SWIR detector's operation and while at least one laser emitter is actually operational and lasing (emitting a laser beam towards the missile), in order to measure or estimate or determine the missile range and/or one or more self-frequency properties of the missile, such as (but not limited to) the missile's self-rotation frequency or self-roll rate or roll rate and/or the threat seeker operational frequency (e.g., allowing the micro DIRCM device to dynamically modify, in real time or in real time, the rotation frequency or the movement frequency of a gimbaling mechanism of the micro DIRCM device, in order to increase the efficiency of jamming or disrupting a particular type of missile or a particular type of MANPAD); as well as missile velocity or threat velocity which may further be extracted based on the estimated missile range or threat range. For example, the micro DIRCM device may determine or estimate the self-rotating frequency or the self-roll frequency of the missile or threat, and this information may be used by the micro DIRCM device to dynamically modify or adjust or configure or otherwise optimize the jamming technique, in real time or in near-real-time. In a demonstrative example, a pre-defined lookup table may be used, or one or more pre-defined selection rules or modification rules may be used; for example, pre-defining that if the self-rotating frequency of the missile is estimated to be in the range of F1 to F2 rotations per time-unit, then a first set of laser beam(s) should be emitted and used towards such missile (e.g., having a particular range R1 of laser wavelengths); and in contrast, pre-defining that if the self-rotating frequency of the missile is estimated to be in the range of F3 to F4 rotations per time-unit, then a second, different, set of laser beam(s) should be emitted and used towards such missile (e.g., having a different particular range R2 of laser wavelengths). Other modifications or optimizations of the missile-jamming operations or the missile-disrupting operations may be performed, based on the estimation of the self-rotation frequency of the missile; for example, modification or setting of the number of laser beams that are emitted, modification or setting of the frequency or wavelength of laser beam(s) that are emitted, modification or setting of the pattern of laser pulses that are emitted, modification or setting of the time-length of laser emission towards the missile, modification or setting of the number of laser emitters that participate in the laser emission, and/or other suitable operations.

The gimbal of the micro DIRCM device is steered or rotated or spatially re-oriented (block 401) towards the missile or target, in azimuth direction and elevation direction. The azimuth and elevation movement(s) are performed by the gimbal based on the missile's angular data, as obtained from the external MWS or MAW unit of the aircraft; and such data is constantly or continuously or dynamically updated towards the micro DIRCM device.

At least one laser emitter of the micro DIRCM device is activated (block 402), and begins to generate and to emit towards the missile a special pre-defined sequence of laser pulses; which is different from a regular sequence of laser-based emissions that are intended for jamming or disrupting the missile. Some of these laser pulses hit the missile and are backscattered from the missile (block 403); for example, as some missiles are constructed from metallic components which partially reflect electro-optic pulses or laser pulses that are generated by a remote laser emitter and that hit such missile.

For example, in some embodiments, a first type of sequence of laser pulses is used for jamming or disrupting a missile or a threat; and such "jamming sequence" of laser pulses may have, for example, Pulse Width (PW) value that is changed from pulse to pulse, and/or may have Pulse Repetition Interval (PRI) value that is changed from pulse to pulse, and/or may have pulse amplitude that is changed from pulse to pulse. In contrast, the special pre-defined sequence of laser pulses that is emitted by the micro DIRCM device for purposes of backscatter signal reception and analysis, and/or for extracting or estimating missile parameters (e.g., missile range, missile velocity, missile self-rotation frequency or roll-rate), has a constant Pulse Width value that is non-changing from pulse to pulse, and has a fixed Pulse Repetition Interval (PRI) value that is non-changing from pulse to pulse, and has a fixed pulse amplitude that is non-changing from pulse to pulse.

The backscattered signals are received (block 403) using a closed-loop IR receiver that is part of the micro DIRCM device; and one or more signal processing algorithms or operations are applied (block 404) to extract the missile's parameters or properties or characteristics, based on analysis of the backscattered signals that are received. The signal processing algorithms or operations (block 404) may include one or more methods of radar signals processing and/or optical signals processing, such as (but not limited to) matched filtering, decimation, time to frequency domain transitions and vice versa, coherent and non-coherent integration, detection and tracking functions, and/or other suitable algorithms or transformations. The algorithms are applied or configured to integrate or take into account, for example, the number of optically received backscatter pulses, in order to increase the received Signal to Noise Ratio (SNR) towards a minimum threshold value that is required for received signals detection within a minimum acceptable rate (or ratio) of false positive errors. For example, in some embodiments, at least 10 backscattered signals should be received, to enable integration for receiving a gain of 10 dB. In some embodiments, the processing may include extraction or estimation of the missile range and missile velocity; for example, the missile range may be extracted from measurements of the time difference between the transmission of laser pulses and the reception of the backscattered signals; and the missile velocity may be extracted by calculating the change in missile range over time (or, per time-unit).

After the threat parameters extraction (block 404), such as after the extraction or estimation of missile range and/or missile velocity and/or missile self-rotating frequency and/or missile's internal frequency, a comparison or a matching process is performed relative to valid parameters boundaries per target type or per missile type, in order to enable threat classification or missile classification (block 405) in order to verify that the tracked threat is a MANPAD or ATGM type. If there is a match to a particular missile type or threat type (based on pre-defined boundary values for known threat parameters of known types of threats), then one or more laser emitters of the micro DIRCM device switch to performing (or are freshly activated to perform) generation and emission of laser-based jamming sequence or missile disruption sequence (block 408); and such sequence is further optimized or configured or dynamically modified according to the extracted parameters of the threat. Such optimization may include (but not limited to) jamming techniques amplitude and/or frequency optimizations and/or modifications; a decision not to activate all laser emitters that are part of the miniature DIRCM (but to activate only some of them); or other suitable decisions. For example, based on extracted threat parameters and/or other sensed data, and/or based on classification of threats via the closed loop mechanism, the micro DIRCM device may determine or may estimate that the missile in flight is a Third Generation MANPAD and/or a MANPAD having Electronic Warfare capability; and in order to bypass such EW capability of such MANPAD, one or some of the laser emitters of the micro DIRCM device should be turned-off or switched-off or paused or de-activated, at particular time-intervals and/or between the transmitted laser pulses that are emitted from the micro DIRCM device; or, the amplitude of at least one, or some, of the laser beams that are emitted by the micro DIRCM device, is modified between such time-intervals or between the emitted laser pulses.

If the missile range and/or missile velocity, as extracted in block 405, do not match to valid threat parameters of any missile or threat based on pre-defined boundary values, then an attempt is performed and continues to be performed to measure missile range and/or missile velocity within a pre-defined time-period (block 406) until the measured parameters match a particular missile type or threat type, and in such case (of a match) the method continues with the operations of block 408 and onward. Conversely, if the pre-defined time period elapses and the threat range and/or threat velocity parameters still do not conform or match to a valid set of boundaries of known threat(s) or known missile(s), then the methods generates a declaration or a determination or a decision or a signal indicating that the threat is actually a false alarm or a false positive error (block 407); and the gimbal of the micro DIRCM device is returned or steered or oriented back to its stand-by position (block 407).

Some embodiments may be configured to require measuring or re-measuring of target parameters or missile parameters or threat parameters during the actual laser-based jamming or disruption process by the laser emitter(s) of the micro DIRCM device. Such requirement may be pre-configured in some micro DIRCM devices; or, such requirement may be dynamically generated by a processing unit of the micro DIRCM device if one or more conditions hold true, for example, if the missile range is below a pre-defined threshold value, and/or if the missile range is greater than a pre-defined threshold value, and/or if the missile type matches a particular type of missile, and/or if one or more properties of the aircraft are within a particular range-of-values.

Accordingly, the method performs a check (block 409) whether such requirement is configured or was generated. If there is no such requirement to measure or re-measure target parameters during the actual laser-based jamming process, then the laser-based jamming process continues to be performed, via one or more laser emitters, until a pre-defined timeout period elapses, or until one or more other conditions hold true (e.g., the micro DIRCM device detects that the missile was deflected or sufficiently jammed or sufficiently disrupted in its flight, or was destroyed or exploded or sufficiently damaged).

Conversely, if there is a requirement to measure or re-measure target parameters during the actual laser-based jamming process, then: a command or signal is generated, indicating to stop or to pause the laser-based jamming that was performed by at least one (or some, or all) of the laser emitters; and such command or signal is provided to the relevant laser emitter(s) of the micro DIRCM device (block 410); and then the methods proceeds by repeating the operations of block 402 and onwards, namely, activating at least one laser emitter with the pre-defined special sequence of laser pulses (that is different from any laser pulses sequence of laser-based jamming or disruption) and performing the operations that follow block 402 and onward.

In some embodiments, the extracted or estimated threat parameters or missile parameters, are utilized by the micro DIRCM device in order to estimate or detect or to classify or to categorize the type of missile; for example, to classify it as either MANPAD or ATGM. In a demonstrative embodiment, pre-defined values or ranges-of-values may be used for this classification task, or pre-defined classification rules; for example, a pre-defined classification rule that if the missile velocity is estimated to be at least V meters per second (m/s), then the missile is a MANPAD; whereas, if the missile velocity is estimated to be less than V meters per second, and particularly if the velocity is gradually decreasing during missile flight, then the missile is an ATGM. The missile classification is used, as described above and/or herein, for selecting or for optimizing or modifying the missile-jamming operations, which are dynamically tailored to the particular type of missile. The value of V may be pre-defined as a threshold value; for example, it may be 350 or 400 m/s in some demonstrative embodiments.

For example, the micro DIRCM device may be pre-configured with pre-defined threshold values or ranges-of-values, such that SWIR-based optical imaging, and then analysis of SWIR-based optical signals, may enable the micro DIRCM device to classify a missile (in flight) into a particular type or class of missiles, or even to a particular model and/or maker of missile; which in turn may allow the micro DIRCM device to selectively and dynamically trigger the activation of a particular type of laser-based jamming operations towards this particular missile or missile-type. Such pre-configured data or classification rules or classification threshold values may indicate, in some demonstrative embodiments: that a 9K34 Strela-3/SA-14 missile has an average and generally sustained (generally non-changing) flight velocity of 470 meters per second (m/s); that a 9K38 Igla/SA-18 missile has an average flight velocity of 600 m/s, and a peak flight velocity of 800 m/s; that a 9K310 Igla-1/SA-16 missile has an average and generally sustained (generally non-changing) flight velocity of 570 m/s; that a FIM-92C Stinger missile has an average flight velocity of 700 m/s, and a peak flight velocity of 750 m/s; that a Grom missile has an average flight velocity of 580 m/s, and a peak flight velocity of 650 m/s; that a Starstreak missile has an average flight velocity of 1,190 m/s, and a peak flight velocity of 1,360 m/s; that a Mistral missile has an average flight velocity of 800 m/s; that a FIM-43C Redeye missile has an average flight velocity of 480 m/s; that a 9K333 Verba missile 9K333 has an average flight velocity of 500 m/s; and/or other suitable rules or threshold values or threshold ranges-of-values, which may be utilized to classify the missile or to determine the missile-type and thus also select the most suitable laser-based missile-jamming technique, and/or to thereby configure or select or set the relevant operational parameters, e.g., laser frequency; laser wavelength or range-of-wavelength or spectral band; laser amplitude; laser pulse pattern; laser pulse repetition interval; laser pulse width; the number of laser beams and/or laser emitters that participate in the laser-based jamming of this particular missile, or that are selectively utilized, or that are triggered to operate in an alternate manner; or that are temporarily paused or turned-off for this particular missile; and/or other suitable operational parameters which may be configured or modified, optionally utilizing a lookup table or pre-defined rules that indicate which operational parameters for laser-based jamming are most suitable for each such type of missile.

The above-mentioned examples relate to MANPAD missiles; and similar rules, with different threshold values, may be utilized with regard to Anti-Tank (AT) missiles and/or ATGMs, in order to enable classification of a particular missile in flight as either MANPAD or AT/ATGM, and/or in order to further classify the missile in flight as a particular type of AT missile (or as a particular type of ATGM). For example, such rules may indicate: that a Nag ATGM has a maximum flight velocity of 230 m/s; that an HK-10 Anti-Tank missile has a maximum flight velocity of 230 m/s; that a PARS 3 LR Anti-Tank missile has a maximum flight velocity of 290 m/s; and/or other suitable missile types and corresponding values; which may be used for missile classification, and then for selection and/or configuration of the most suitable laser-based jamming operations for this particular missile or missile-type.

Figure 5A:
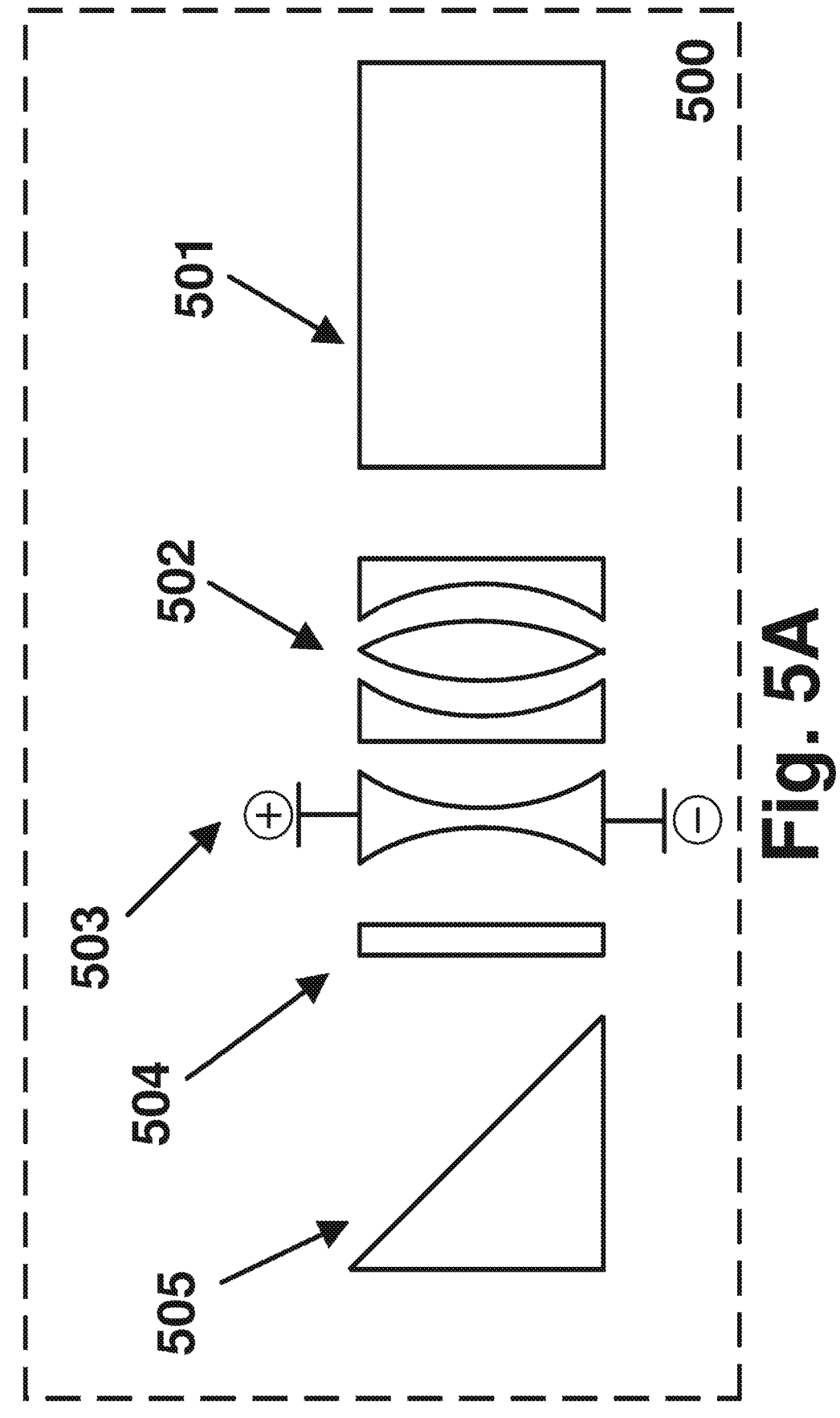
FIG. 5A is a schematic illustration of an optical arrangement, which may be used by the micro DIRCM device and particularly by its SWIR-based missile tracking unit, in accordance with some demonstrative embodiments.

Reference is made to FIG. 5A, which is a schematic illustration of an optical bench or optical rail or optical arrangement 500, which may be used by the micro DIRCM device and particularly by the SWIR detector or SWIR missile tracking unit, in accordance with some demonstrative embodiments. Optical arrangement 500 includes at least one tunable or dynamically-configurable piezoelectric lens, having an optical focus length (or optical focus distance) that can be dynamically increased or decreased or modified by applying a particular electrical voltage or electrical current to such piezoelectric lens, thereby enabling dynamic modification of the optical focus length (or distance) of an optical signal utilized by the SWIR detector or SWIR missile tracking unit. Optical arrangement 500 may be used to construct or to configure or to modify a suitable optical beam for utilization by the SWIR detector, while other components of the micro DIRCM device (such as, laser emitters and other optical detectors) are activated in parallel or are already active and operational in parallel. The tunable piezoelectric lens of optical arrangement 500 enables to dynamically modify the SWIR detector's incoming beam properties during the operation of the SWIR detector, and thus enhance or fine-tune or modify its performance and/or enable it to efficiently adapt to various operational scenarios or conditions. For example, in some situations, the missile's size in the FOV of the SWIR detector/optical tracker is greater than a pre-defined threshold value (e.g., 20 pixels); and therefore the system may modify or adjust the above-mentioned properties (e.g., the SWIR detector's incoming beam properties) and/or may reduce the focal length, to thereby reduce the missile size as observed in the FOV, and to thus enable a more precise determination of the missile's angular position. Similarly, in some situations, the missile's size in the FOV of the SWIR detector/optical tracker is smaller than a pre-defined threshold value; and therefore the system may modify or adjust the above-mentioned properties (e.g., the SWIR detector's incoming beam properties) and/or may increase the focal length, to thereby increase the missile size as observed in the FOV, and to thus enable a more precise determination of the missile's angular position.

The SWIR detector 501 itself is shown, as the last component of the optical arrangement 500 located at one end of the optical arrangement 500. Other components in the optical arrangement 500 are: a collimating lens 502, a tunable piezoelectric lens 503 whose focus length (or focus distance) is tunable or modifiable by applying electric current or electric voltage, a band pass optical filter 504, and a prism 505. Additional optical elements, or more than one optical element from the same kind, may be part of the optical arrangement 500.

During the operation of the SWIR detector, an electrical voltage or an electrical current is selectively applied to (or on) the piezoelectric lens 503, such as to its positive and negative terminals or electrodes or conductive sockets. The electric voltage (or current) application causes the piezo-electric lens to change its mechanical or physical dimensions, or to physically shrink, or to physically compress, or to physically expand, or to physically enlarge its dimensions, or to physically reduce its dimensions; thereby causing the optical focal length (or focus distance, or focal distance) of the piezoelectric lens to change; and thus causing a modification of one or more properties of the incoming optical signals that are actually received and analyzed by the SWIR detector; and particularly, in some embodiments, causing a particular modification of the incoming beam width in order to improve or enhance the efficiency or accuracy of the performance of the SWIR detector. Accordingly, the input that is received and processed by the SWIR detector, is not merely the raw short-wave IR signals that are emitted by the missile (or target, or threat); but rather, a modified version of such short-wave IR signals that underwent a particular Beam-Width Narrowing by the piezoelectric lens of the optical arrangement that precedes the SWIR detector and that is located between the missile and the optical entry window of the SWIR detector.

In some embodiments, some or all of the elements of optical arrangement 500 may optionally be unified into a single optical element (or, into a reduced-number of optical elements), that provides at least the same or equivalent properties as some or all of those elements; such the collimating lens 502, the piezoelectric lens 503, the band pass optical filter 504, and the prism 505; and/or additional optical elements that may be used.

Figure 5B:
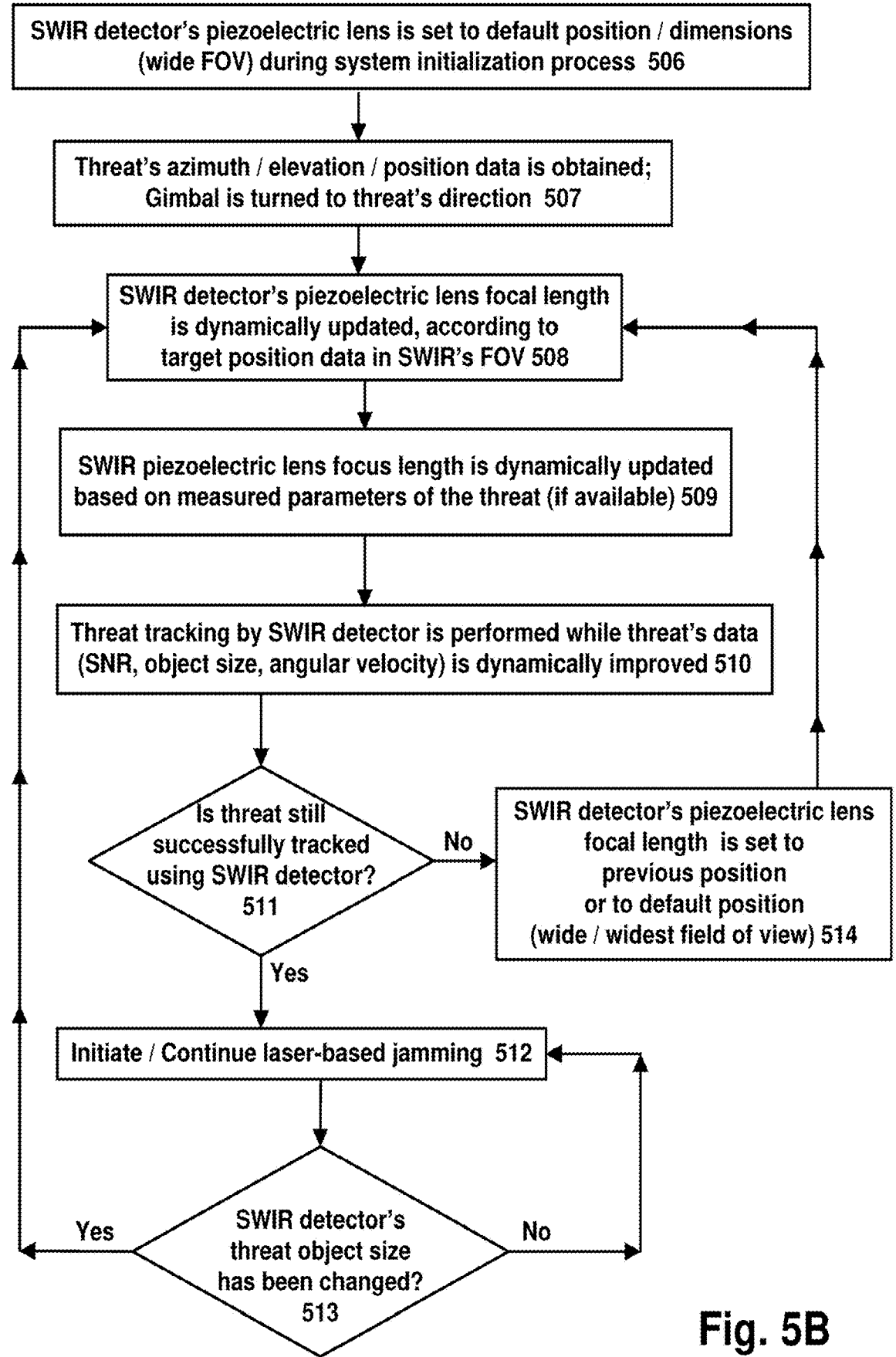
FIG. 5B is a flow-chart of a method of operating a tunable piezoelectric lens of a SWIR-based missile tracking unit, in accordance with some demonstrative embodiments.

Reference is made to FIG. 5B, which is a flow-chart of a method of operating a tunable piezoelectric lens of a SWIR detector (or a SWIR missile tracking unit) of a micro DIRCM device, in accordance with some demonstrative embodiments. The method may be applied during the actual operation of the SWIR detector, in order to improve or optimize its performance for the particular scenario and/or threat and/or environmental conditions and/or optical conditions and/or visibility conditions.

As part of an initialization process of the micro DIRCM device, the SWIR detector's piezoelectric lens is set to a default position or to default dimensions (block 506); namely, position or dimensions or other lens properties in which no electric voltage and no electric current are applied to the piezoelectric. For example, the initial position and dimensions of the piezoelectric lens are set or configured to provide to the SWIR detector a wide field-of-view (FOV), or the widest possible FOV, or the maximum-width FOV (block 506).

A threat or missile is detected by MWS or the MAW unit, and a threat (or missile) detection signal is provided to the micro DIRCM device, also providing the threat's azimuth data and/or elevation data and/or spatial position. The gimbal of the micro DIRCM device is steered or turned or spatially oriented or rotated towards the threat's direction (block 507), to thereby enable the SWIR detector to start tracking the threat.

Once the SWIR detector has started tracking the threat, the method proceeds to dynamically update or modify or adjust the focal length (of focal distance) of the piezoelectric lens that precedes the SWIR detector (block 508). This update or adjustment or modification are performed dynamically, based on current values of one or more relevant parameters; such as (but not limited to) threat position data in the SWIR detector's FOV, threat range and/or threat velocity data provided by the micro DIRCM device's closed-loop IR receiver and/or from the MWS or MAW unit, and/or based on other parameters. For example, if the micro DIRCM device determines or estimates that the range (the distance) of the missile is greater than 3,000 meters, then the focal length may be increased, in order to increase the missile size in the FOV of the SWIR detector/optical tracker, and to thus enable more accurate optical tracking of the missile.

The modification or adjustment or updating of the focal length of the piezoelectric lens may possibly lead to an increase in the threat size (the missile size) as it is observed by the SWIR detector, and/or to threat size or threat image focusing adaptation or modification as it is observed by the SWIR detector, and/or optimization or enhancement of other threat properties as they are observed by the SWIR detector of the micro DIRCM device.

During the operation of the SWIR detector which tracks the missile, the updating of the focal length of the piezo-electric lens may be repeated (block 509), as a dynamic updating process (e.g., performed at time intervals of T milliseconds; wherein T is a pre-defined value; such as every 500 or 750 or 1,000 milliseconds), in order to further optimize or improve the threat properties as they are measured or estimated by the SWIR detector. Such dynamic updates of the focal length of the piezoelectric lens that precedes the SWIR detector's optical entry window, may lead to improvements in the measured parameters of the threat or missile (block 510), such as an increase in the SNR, an increase in the object size of the threat as imaged by the SWIR detector, improvement in the measured angular accuracy of the threat, and/or changes or improvements in the measurement of other properties of the threat.

During the dynamic updating process of the focal length of the piezoelectric lens that precedes the optical entry window of the SWIR detector, the method also performs continuous and/or periodic checks to verify the threat tracking using the SWIR detector (block 511); to ensure that the threat remains tracked by the SWIR detector even after the focal length of the piezoelectric lens was modified. If the threat is indeed still tracked by the SWIR detector, even after the focal length of the piezoelectric lens was modified, then: laser-based jamming or disruption of the threat is initiated or is continued (block 512), by one or more of the laser emitters of the micro DIRCM device. If the threat is still tracked by the SWIR detector, but there is a change in threat's object size as imaged by the SWIR detector (block 513), then the method may proceed to further repeat the dynamic updating process of the focal length of the piezoelectric lens of the SWIR detector, by returning to the operations of block 508 and onward and repeating such operations. Conversely, if the latest update of the focal length of the piezoelectric lens of the SWIR detector did not cause a change in the threat's object size as imaged by the SWIR detector, then the method may continue with laser-based jamming or disruption of the threat (block 512, arrow "No").

If the tracking of the threat is lost by the SWIR detector, such that the threat is no longer tracked successfully by the SWIR detector following an update of the focal length of the piezoelectric lens of the SWIR detector (block 511, arrow "No"), then: in some embodiments, the focal length of the piezoelectric lens of the SWIR detector is set to the most-recent value that still enabled successful tracking of the threat by the SWIR detector, or (in other embodiments), the focal length of the piezoelectric lens of the SWIR detector is set to its initial or idle value or by tuning the piezoelectric lens to its default dimensions or position (e.g., by removing or stopping electric current or electric voltage from being applied to the of the SWIR detector) or by otherwise tuning the piezoelectric lens to have its widest FOV or its maximum-width FOV (block 514), in order to ensure that the SWIR detector would be able to immediately resume the tracking of the threat (which was temporarily lost); then, once tracking of the threat is achieved again by the SWIR detector, the method may repeat the operations of block 508 and onward, to again dynamically adjust or modify the focal length of the piezoelectric lens of the SWIR detector.

Figure 6:
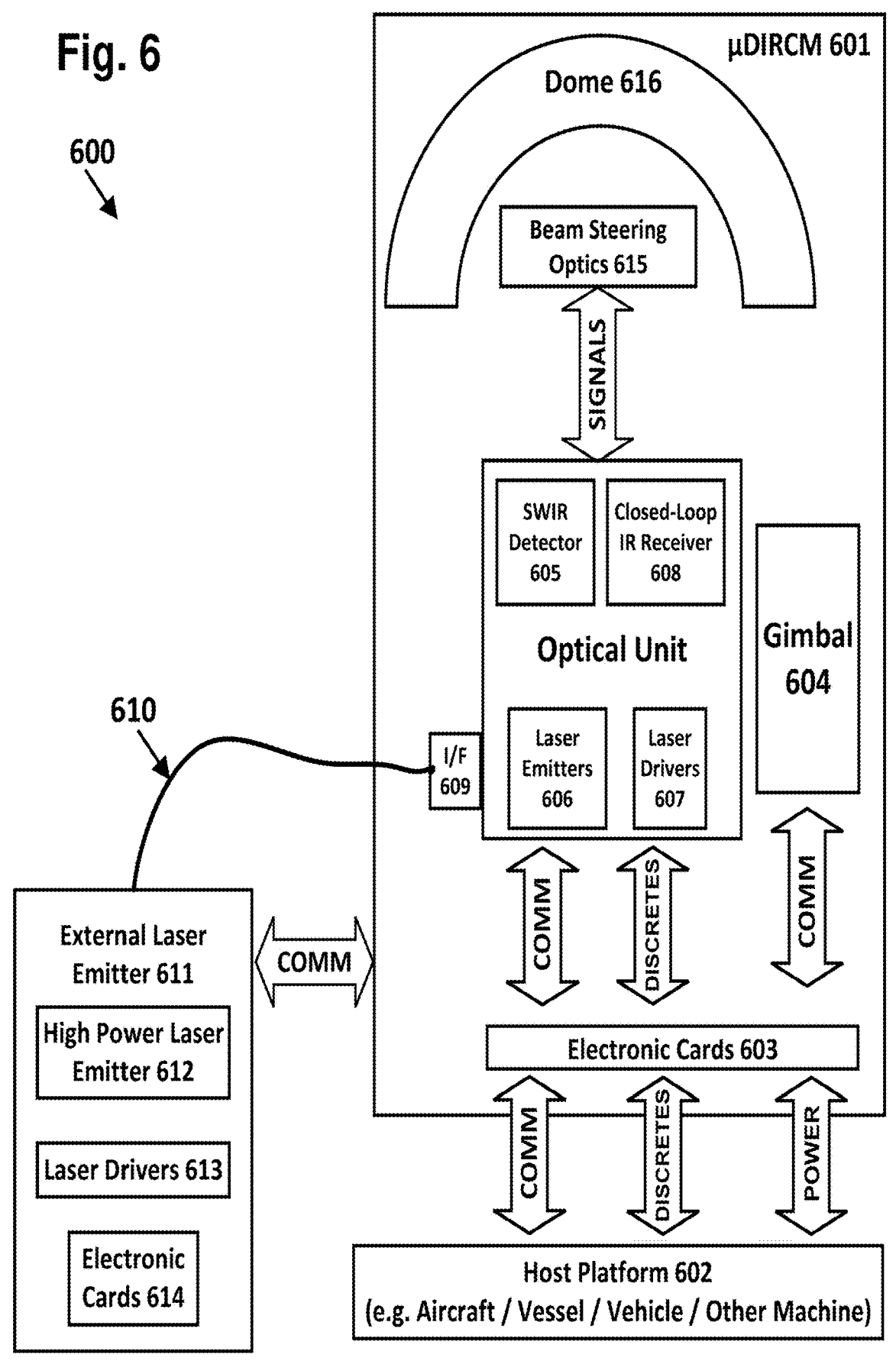
FIG. 6 is a schematic illustration of a system comprising a host platform and a micro DIRCM device that is particularly configured for jamming Anti-Tank missiles, in accordance with some demonstrative embodiments.

Reference is made to FIG. 6, which is a schematic illustration of a system 600 comprising a host platform 602 and a micro DIRCM device that is particularly configured and suitable for jamming or disrupting or confusing an Anti-Tank Guided Missile (ATGM), which may be referred to as "μDIRCM Anti-Tank device" or "μDIRCM AT device" or "micro DIRCM AT device" or "micro DIRCM Anti-Tank device" 601, in accordance with some demonstrative embodiments.

System 100 demonstrates, for example, a structural and functional system in which the same single SWIR detector/optical tracker is used for extracting the position (or the location) of the ATGM launching station or control station or guidance station, with high accuracy that enables the micro DIRCM device to precisely jam it using the internal laser emitters of the micro DIRCM device; and/or the utilization of both internal and external (relative to the micro DIRCM device) laser emitter(s) and/or high-power laser emitter(s), which are activated together and share at least a portion of the same optical path or optical segment, (I) for jamming or disrupting the ATGM launching station or control station or guidance station, and (II) for jamming or disrupting a MANPAD in flight. System 100 demonstrates also a single device (micro DIRCM device), in which a single or unified or shared optical path or optical segment, is utilized in a dynamic manner to perform one of several possible jamming or disrupting operations selected from the group consisting of: (i) jamming a MANPAD missile in its flight; (ii) directly jamming an AT missile in its flight; (iii) directly jamming an ATGM in its flight; (iv) directly jamming a guidance beam riding ATGM in its flight; (v) jamming or disrupting a launching station or control station or guidance station of an ATGM that is currently in flight towards the protected aircraft (or other protected platform) and thus causing indirect disruption or indirect jamming of the ATGM that is currently in flight; all these, via a single micro DIRCM device that is mounted or installed on a protected platform and that provides an optical path that is shared by the components or units that perform the above-mentioned different types of jamming or disrupting operations.

The micro DIRCM AT device 601 is based on the micro DIRCM device described above and/or shown in any of the other drawings, with updates and modifications as described herein. The micro DIRCM AT device 601 is connected via signal and power interfaces or connectors or sockets to a host platform 602 (e.g., of a protected aircraft or vessel or vehicle) that includes systems such as (but not limited to) Missile Warning Sensor (MWS) unit(s), Missile Approach Warning (MAW) unit(s), Multi-Function Display (MFD) unit(s), power generators or power supplies, Weight on Wheels (WoW) switch or indicator unit(s), and/or other units. The number of micro DIRCM AT devices 601 that are installed on, or mounted on, or connected to, a single host platform 602 may be more than one, in order to provide more effective countermeasure effectiveness and/or increased protection and/or increased coverage from multiple sides of the protected host platform. In some embodiments, the host platform 602 may be, for example, an airborne platform, an aircraft, a ground-based platform, a surface-based platform, a tank, an armored personnel carrier, a military vehicle, a naval platform, a marine platform, a boat, a ship, an infrastructure machine (e.g., a construction equipment or machine, an oil rig), or other machine that may be threatened by (or potentially attacked by) an ATGM.

The micro DIRCM AT device 601 includes electronics cards 603 (which may include one or more processors, processing unit, controllers, logic units, memory units, storage units) that perform various functions; such as, controlling a gimbal 604, controlling a SWIR detector 605 (or a SWIR missile tracking unit) and its data reception and its image processing functionality, controlling laser emitters 606 and laser drivers 607, controlling a closed-loop IR receiver 608 and its data reception and its processing functionality.

In order to provide an effective countermeasure against some specific types of ATGMs, the micro DIRCM AT device 601 may optionally include a fiber optic interface 609 or an optical fiber interface or input/output (I/O) interface, to enable utilization of an additional external high-power laser emitter 611 that is operably connected to the micro DIRCM AT device 601 via a fiber optic cable 610 or via an optical fiber.

The fiber optic interface 609 is structured or configured at the micro DIRCM AT device 601 such that, for example, it may operably replace one or more of the internal laser emitters 606 of the micro DIRCM AT device 601, while fully or almost fully using the optical path (of such omitted or replaced internal laser emitter of the micro DIRCM AT device 601) towards the beam steering optics 615 of the micro DIRCM AT device 601 and then to the dome 616. Accordingly, the depiction of the External Laser Emitter 611 in the drawing, as located on the side of the micro DIRCM AT device 601, is only for demonstrative purposes and in order to not over-crowd the drawing; whereas the actual spatial location or structural location of the External Laser Emitter 611 may be the location of one (or more) omitted or replaced or removed Internal laser emitter(s) 606 of the micro DIRCM AT device 601; or, at another suitable location in proximity to the micro DIRCM AT device 601 which still enables the External Laser Emitter 611 to use at least a portion of the dome 616 and the Beam Steering Optics 616. In some embodiments, the External Laser Emitter 611 (or the external laser transmitter) is external to the entirety of the micro DIRCM device; yet, it is also co-located in proximity to it or near it, or is mounted or installed on the same protected aircraft or the same protected platform; and its output is connected via a fiber optic cable (or other suitable wired connection) to the micro DIRCM device; the external laser emitter's output signal is transmitted towards the missile (the target, the threat) by using the micro DIRCM device's internal optical paths.

In accordance with some embodiments, the external laser emitter 611 is not an internal part of the micro DIRCM AT device 601, due to the significant physical dimensions or form-factor or size or weight of the external laser emitter 611, and/or due to heat dissipation considerations or thermal constraints or other functional or structural considerations. The external laser emitter 611 is configured to emit laser beams for missile-jamming purposes or missile disruption or missile confusion, in one or more pre-defined wavelengths, such as (but not limited to) Near Infra-Red (NIR) wavelength(s), Short-Wave Infra-Red (SWIR) wavelength(s), Mid-Wave Infra-Red (MWIR) wavelength(s), and/or Long Wave Infra-Red (LWIR) wavelength(s); and may have output power between several tens of Watts to several Kilowatts, or in the range of 30 or 40 or 50 Watts to 30 or 50 or 75 Kilowatts.

The external laser emitter 611 may include one or more high-power laser emitters 612, generating laser output signals that are combined using one or more suitable optical units or methods. The high-power laser emitters 612 are driven by laser drivers 613; which in turn are controlled by electronic cards 614 (e.g., having one or more processors, processing units, integrated circuits, controllers, logic units, memory units, storage units), which communicate with the electronic cards 603 of the micro DIRCM AT device 601.

The external laser emitter 611 may be installed or mounted or connected in proximity to the micro DIRCM AT device 601, but at some pre-defined distance between them in view of the particular shape and size constraints of the host platform 602, and/or in view of the properties of the fiber optic cable 610 (e.g., length, thickness, shape), and/or in view of the size and shape of the particular micro DIRCM AT device 601 as implemented, and/or by taking into account other factors that may affect the micro DIRCM AT device's operational performance and countermeasure effectiveness against various types of ATGMs. In some embodiments, two or more external laser emitters 611 may be connected to the same single micro DIRCM AT device 601 of the same single host platform 602, by using laser beam combining techniques and/or splitting elements that may be added to the fiber optic cable 610 and/or that may be added along other locations in the optical path of the generated laser beams.

The laser-based optical signals of the micro DIRCM AT device 601 are transmitted to, and received from, a beam steering optics 615 and the miniature dome 615, to or from (respectively) the external environment (e.g., the surrounding air) where the target of interest (e.g., missile, threat) is located. The miniature dome 615 encapsulates and protects the micro DIRCM AT device 601 and its mechanical and optical elements; and may be constructed to include one or more optical windows, formed of various types and shapes, and may have a geometrical outline other than hemispherical dome.

Figure 7:
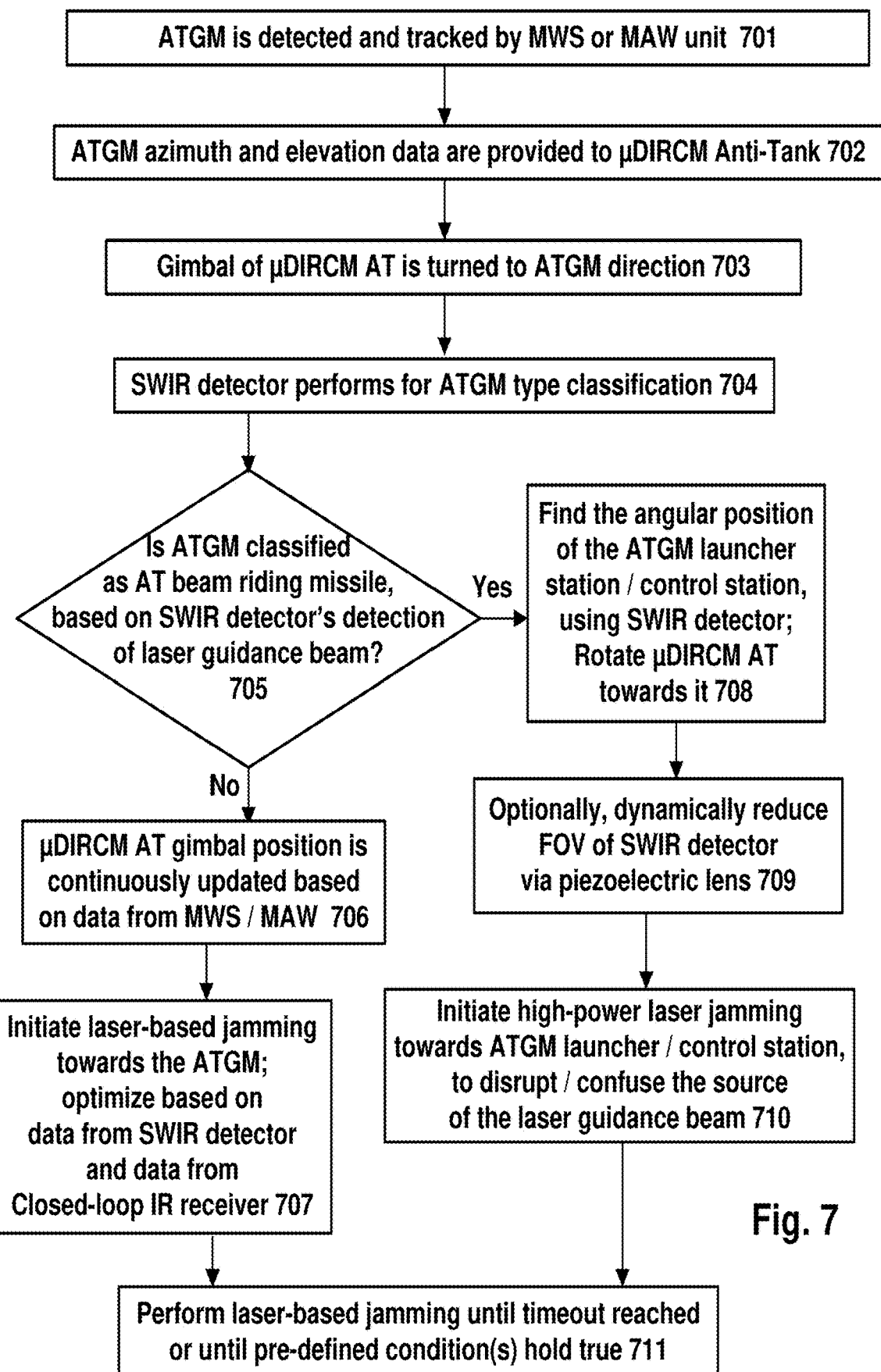
FIG. 7 is a flow-chart of a method of operation of a micro DIRCM device for jamming Anti-Tank missiles, in accordance with some demonstrative embodiments.

Reference is made to FIG. 7, which is a flow-chart of a method of operation of a micro DIRCM AT device for jamming and countering anti-tank guided missiles (ATGMs), in accordance with some demonstrative embodiments. The method may be used to effectively jam or disrupt or counter an ATGM during its flight towards an aircraft or towards a vessel or towards a vehicle or towards an infrastructure machine or a stationary item; and/or to jam or disrupt or confuse the control station that guides the ATGM during its flight (e.g., such guidance being performed by a guiding laser beam that the control station transmits and that the ATGM follows or "rides" during its flight).

For example, an ATGM is detected and tracked using the micro DIRCM device, and optionally by also using input from a Missile Warning System (MWS) or a Missile Approach Warning (MAW) system (block 701). Upon detection, dynamically updated azimuth and/or elevation position data of the ATGM are continuously provided to the micro DIRCM AT device (block 702); and the gimbal of the micro DIRCM AT device is turned or rotated or steered or oriented towards the ATGM's direction (block 703).

In accordance with some embodiments, only a MWS that is based on a radar, or that includes a radar, may be able to classify a missile in flight as an ATGM and not as a MANPAD, or vice versa; and a conventional MWS that is based on optical sensors or optical imagers, cannot perform such missile-type classification with high probability or high certainty of correct classification. In contrast, some embodiments utilize a MWS or MAW system which provides a general alarm to the micro DIRCM device about the threat, without further classifying it by missile-type; and the micro DIRCM device, with its unique structure and functionality as described above and herein performs the classification by missile-type and then performs the suitable (missile-type based) subsequent jamming or disrupting.

The SWIR detector or the SWIR missile tracking unit of the micro DIRCM AT device is activated and performs classification of this specific ATGM based on presence or non-presence of a laser guidance beam (block 704). For example, the SWIR detector may detect a guidance laser beam that the ATGM uses for following or "riding" on; and in such case, the beam parameters or properties or characteristics of such laser guidance beam (e.g., the pulse duration and repetition characteristics) are measured by the SWIR detector, by utilizing its sampling functionality that is sufficiently fast to perform such measurements.

The method then diverges (block 705) based on whether or not the detected ATGM is classified as a beam riding missile. If the detected ATGM is classified as a beam riding missile, then the SWIR detector proceeds to search for, and find and locate, the angular position of the ATGM's launcher station or control station (block 708); for example, based on the laser emission that is outgoing from the ATGM launcher station or control station which emits a laser beam that the beam-riding ATGM follows or "rides"; and in such case, the gimbal of the micro DIRCM AT device is rotated or steered or turned accordingly towards the ATGM launcher station or control station (rather than towards the ATGM itself), in order to enable one or more laser emitters of the micro DIRCM AT device (e.g., one or more internal laser emitters within the micro DIRCM AT device; and/or one or more external laser emitters that are external to the micro DIRCM AT device yet are operably associated with it) to perform laser-based jamming or disruption or confusion of the launcher station or control station. Optionally, the Field of View (FOV) of the SWIR detector may be dynamically reduced, by tuning the piezoelectric lens (block 709) (e.g., by selectively providing a particular electric voltage or electric current to the piezoelectric lens), in order to further improve the measurement of the angular position of the launcher station or control station of the ATGM; the tuning of the piezoelectric lens may be performed as described above.

Once the gimbal of the micro DIRCM AT device is spatially oriented towards the launcher station or control station that guides the ATGM, the method proceeds to initiate and perform directed high-power laser jamming or disruption of that launcher station or control station (block 710); for example, using a high-power external laser emitter having the structure as described above. The high-power laser jamming operates to dazzle or confuse or jam or disrupt the laser source (at the launcher station or control station)

that generates the laser guidance beam that the ATGM is following or is "riding" on; and to therefore indirectly cause the ATGM to miss its intended target (e.g., the protected aircraft, the protected vessel, the protected vehicle, the protected host platform) by such dazzling operations or jamming operations or disrupting operations. The tracking of the launcher station or control station is performed continuously, and includes continuously updating the angular position of the launcher station or control station of the ATGM, until a pre-defined time-out period is reached (block 711), or until one or more other conditions are met (e.g., the system determines that the ATGM has missed the protected host platform, or was deflected and is no longer a threat, or has exploded or was damaged). Such precise and continuous tracking of the angular position of the launcher station or control station is performed in order to maximize the amount of radiant intensity that is emitted by the micro DIRCM AT device towards the launcher station or control station, and to thus increase the probability of successful dazzling or jamming or disrupting operations.

Conversely, if the ATGM is not classified as a beam riding missile (block 705, arrow "No"), then: the direction to which the gimbal of the micro DIRCM AT device is oriented is updated dynamically and continuously using updated angular data of the ATGM, as obtained from the MWS or MAW unit (block 706); and this enables, and is followed by, activation of one or more internal laser emitters of the micro DIRCM AT device which generate ATGM-jamming or ATGM-disrupting laser beam(s) that are emitted towards the ATGM in its flight. The SWIR detector of the micro DIRCM AT device, and/or the closed-loop IR receiver of the micro DIRCM AT device, are also operable to optimize the extracted parameters of the ATGM, such as the ATGM's angular position, range and/or velocity, and to thus increase the probability of successful countermeasure and jamming of the ATGM; and this may be performed until a pre-defined time-out period is reached (block 711), or until one or more other conditions are met (e.g., the system determines that the ATGM has missed the protected host platform, or was deflected and is no longer a threat, or has exploded or was damaged).

In some embodiments, optionally, upon classification of a threat as an ATGM, without determining yet whether the ATGM is beam-riding or not-beam-riding, the micro DIRCM AT device may immediately perform laser-based jamming of the ATGM in flight; and may also perform, in parallel or concurrently, additional imaging and detection operations (e.g., utilizing the SWIR detector) in order to try to also find whether a laser-guidance beam is present and/or in order to also find whether an ATGM control station is currently controlling or guiding the ATGM's flight. Upon detection of a laser-guidance beam which guides the ATGM, in some embodiments the micro DIRCM AT device may stop jamming operations of the ATGM itself, and may instead perform laser-based jamming operations of the ATGM's control station which emits the laser-guidance beam. In other embodiments, upon detection of a laser-guidance beam which guides the ATGM, the micro DIRCM AT device may continue to perform jamming operations of the ATGM itself, and may also initiate and perform additional laser-based jamming operations towards the ATGM's control station which emits the laser-guidance beam, thereby trying to disrupt the flight of the ATGM both directly and indirectly. In other embodiments, upon detection of a laser-guidance beam which guides the ATGM, the micro DIRCM AT device may re-purpose one or more of its laser emitters, which has or have been performing laser-based jamming of the ATGM itself, to now perform laser-based jamming of the control station or launcher station of the ATGM; for example, prior to classification of the ATGM as a beam-riding ATGM, all three laser emitters of the micro DIRCM AT device may perform laser-based jamming directly towards the ATGM in its flight; and upon classification of the ATGM as a beam-riding ATGM, at least one laser emitter of the micro DIRCM AT device may continue to perform laser-based jamming of the ATGM itself whereas at least one other laser emitter of the micro DIRCM AT device may be dynamically re-purposed or re-configured to perform laser-based jamming of the control station or launcher station of the ATGM; and this may be achievable in certain situations, particularly if the current angular position of the ATGM is generally similar to the current angular position of the ATGM's control station or launcher station (e.g., thereby avoiding a need to steer or rotate or re-orient or turn the gimbal between two different angular positions, one belonging to the ATGM in flight and the other belonging to its control station or launch station). In still other embodiments, upon classification of the ATGM as a beam-riding missile, the micro DIRCM AT device continues to perform laser-based jamming of the ATGM itself by using one or more internal laser emitters that are internal to the micro DIRCM AT device, while also triggering or activating an external high-power laser emitter, which is external to the micro DIRCM AT device yet is in proximity thereto and is in communication therewith, to perform laser-based jamming of the launch station or control station via such external high-power laser emitter, concurrently or in parallel.

Some embodiments may comprise or utilize a particular cooling and heat-evacuation structure that is counter-intuitive and/or provides efficient operational results. For example, heat waste from the laser and detectors module, is not evacuated immediately or directly away from the aircraft, and/or is not evacuated immediately or directly away from the chassis of the DIRCM unit; but rather, it is initially evacuated inwardly towards the aircraft and/or towards the chassis of the DIRCM unit and/or inwardly towards the flat base of the protective radome (rather than towards the curved dome of the protective radome); and only then, by using additional mechanical fins in combination with internal fans and/or external fans, the heat waste is evacuated away from the protective radome and/or away from the aircraft and/or away from the chassis of the DIRCM unit and/or outwardly towards the external environment that externally surrounds the DIRCM unit or its protective radome. Additionally or alternatively, the unique inclusion of mechanical fins within the protective radome, and/or in their particular locations as demonstrated, and/or in combination with the fans within the protective radome, and/or in combination with the fans located externally to the protective radome, further provide a unique and counter-intuitive structure that provides efficient heat evacuation from the radome outwardly.

In some embodiments, a DIRCM unit may comprise, for example, (A) a dual frequency Radio Frequency (RF) module, comprising: (A1) a dual-band RF transmitter and a dual-band RF receiver, to transmit and receive high-band RF signals and low-band RF signals; and (A2) a threat confirmation and tracking module, to confirm and track a possible incoming threat based on processing of high-band RF signals and low-band RF signals received by the dual-band RF receiver. The DIRCM unit may further comprise, (B) a dual frequency band antenna, to transmit and receive the high-band RF signals and the low-band RF signals; and (C) a directed high-power laser transmitter, to activate a directed high-power optical countermeasure (e.g., high-power laser beam(s)) towards a precise angular position of a confirmed threat.

In some embodiments, DIRCM unit comprises a high-power laser module or other laser module, which comprises: (a) a laser transmitter that comprises one or more Quantum Cascade Laser (QCL) based laser emitters, which produce laser beam/s and/or optical output power that is combined within the laser transmitter or externally to it by using one or more optical elements for combining optical signals and/or laser beams; and (b) one or more laser transmitters that are based on laser-diode laser emitters, that emit laser beams and/or optical output in one or more Infra-Red (IR) wavelengths and/or visible and any other applicable wavelengths, and which produce laser beam/s and/or optical output power that is combined within the laser transmitter or externally to it by using one or more optical elements for combining optical signals and/or laser beams; and optionally also (c) an optical Focal Point Array (FPA) detector or sensor, that receives an incoming optical signal that is incoming from (or, is reflected from, or is emitted from) the target or threat, wherein the incoming optical signal is at infrared (IR) or visible or any other applicable wavelength, and wherein the optical FPA detector or sensor analyzes or processes the incoming optical signal to generate one or more insights regarding one or more characteristics of the target or threat.

In some embodiments, the DIRCM unit or the aircraft protection system comprises a controller or processor or other logic unit, that performs and optimizes the confirmation, tracking and countermeasure functions against a threat, based on real-time (or near-real-time) data that is analyzed and exchanged between (i) a dual frequency RF module, and a (ii) laser module having an optical FPA detector; wherein the exchanged data comprises one or more of: (a) threat distance or threat range, (b) threat velocity, (c) estimated physical size of the threat.

In some embodiments, the DIRCM unit or the aircraft protection system comprises a (i) a dual frequency RF module, and a (ii) laser module having an optical FPA detector; wherein both component (i) and component (ii) share the same (e.g., single, common, unified) mechanical aperture or optical aperture, the same electronics infrastructure or components, and/or joint algorithms or co-operating algorithms to identify the threat by using two (or more) different electro-magnetic and electro-optic spectral ranges and/or by utilizing two different methods of threat identification (e.g., electro-magnetic; electro-optic).

In some embodiments, the DIRCM unit (or the aircraft protection system) may comprise a Middle Wave Infra-Red (MWIR) QCL-based laser transmitter, that includes one or more Quantum Cascade Laser (QCL) based laser emitters, which produce one or more laser beams or optical beams that are modified (using one or more optical elements) from being natural Gaussian shaped to being (i) Top Hat shaped, or (ii) superposition of multiple natural Gaussian beams with an offset, or (iii) superposition of multiple natural Gaussian beams without an offset, thereby improving or enhancing the effectiveness of the countermeasure effectiveness of the DIRCM unit.

Additionally or alternatively, the DIRCM unit (or the aircraft protection system) may comprise (I) a Middle Wave Infra-Red (MWIR) laser-diode based laser transmitter, or (II) a Short-Wave Infra-Red (SWIR) laser-diode based laser transmitter, or (III) a visible laser-diode based laser transmitter; wherein each one of them may comprise one or more laser-diode based laser emitters; wherein such laser emitters produce one or more laser beams or optical beams that are modified (using one or more optical elements) from being natural Gaussian shaped to being (i) Top Hat shaped, or (ii) superposition of multiple natural Gaussian beams with an offset, or (iii) superposition of multiple natural Gaussian beams without an offset, thereby improving or enhancing the effectiveness of the countermeasure effectiveness of the DIRCM unit.

In some embodiments, the DIRCM unit or the aircraft protection system comprises one or more QCL-based laser transmitters and/or laser-diode laser transmitters, that are installed in the laser module; wherein each such laser transmitter may comprise one or more laser emitters. The laser beams and/or optical beams that are produced by such laser transmitters, are combined inside the laser module using one or more optical elements (e.g., optical combiner; optical adder; prism), order to reduce the number of optical paths of (or within) the laser module, and/or to decrease the number of optical elements that are required, and/or to improve the countermeasure effectiveness of the DIRCM unit or the aircraft protection system.

In some embodiments, one or more thermoelectric coolers (TEC) units are attached to the QCL-based laser transmitter(s) and/or to the laser-diode based laser transmitter(s) and/or to the passive/optical FPA detector. Optionally, the TEC units are installed together in a cascade mode or in a cascade structure, or in another structure or pattern that improves or optimizes the overall efficiency of the TEC units and/or that improves their heat dissipation capabilities and/or that reduces the required space or form-factor.

In some embodiments, the DIRCM unit may feature a unique thermal evacuation architecture or structure which efficiently removes the heat that is produced by (or absorbed by) the TEC units of the laser module; for example, by including one or more heat sinks, fans, fins, ribs, protruding elements, material isolators, thermal isolation units, and/or other passive and/or active heat evacuation components; to thereby improve the countermeasure effectiveness of the DIRCM unit.

In some embodiments, the DIRCM unit itself may integrally comprise within it an optical Focal Point Array (FPA) detector or sensor, which is integrated or installed integrally within the laser module of the DIRCM unit, in order to further improve the DIRCM unit countermeasure effectiveness, by increasing the DIRCM unit's tracking accuracy and/or by reducing the optical error between the laser module's components (e.g., between active and passive components), while also remaining within the same physical properties and/or form-factor and/or foot-print of the DIRCM unit.

In some embodiments, the DIRCM unit comprises (i) one or more QCL-based laser transmitters, and/or (ii) one or more laser-diode based transmitters, and further comprises (iii) a passive optical FPA detector or sensor; wherein the laser transmitters and the passive optical FPA detector produce or utilize (respectively) optical signals that are divided and/or combined using one or more optical elements, and use the same (e.g., single, unified, common) optical exit path; in order to reduce the overall optical errors of the components of the DIRCM unit, and/or to reduce the physical properties and/or footprint and/or form factor of the laser module and/or the DIRCM unit, and/or to improve the countermeasure effectiveness of the DIRCM unit.

In some embodiments, the DIRCM unit may comprise: (a1) one or more QCL-based laser transmitters, and/or (a2) one or more laser-diode based laser transmitters; and also (b) a passive optical FPA detector; wherein these components are installed or integrated together inside or within a single high-power laser transmitter unit. In some embodiments, (i) the laser beams or optical signals outputted by the laser transmitters, and (ii) the optical signals incoming to the passive optical FPA detector, are separated from each other, for example, in frequency domain (e.g., different wavelength of signals) and/or in time domain (e.g., different time-slots) and/or using physical separation of signals (e.g., using one or more optical elements that are placed along the relevant optical path(s) and that move or route or divert or block or otherwise selectively modify some or all of the optical signals and/or laser beams).

In some embodiments, each QCL-based laser transmitter and/or each laser-diode laser transmitter is controlled and/or activated independently and/or separately from other laser emitter(s), to enable the DIRCM unit to transmit or to utilize multiple, different, countermeasure techniques at the same time and/or at least partially concurrently, thereby improving the overall countermeasure effectiveness of the DIRCM unit.

In some embodiments, lenses are installed as an integral part of the enclosure(s) of the laser emitter(s), to reduce the overall optical errors, and/or to reduce the laser module's physical properties and/or footprint and/or form-factor, and/or to improve the countermeasure effectiveness of the DIRCM unit.

In some embodiments, at least part of the laser module or the high-power laser module, or more than 50% of the overall size of laser module or the high-power laser module, or an entirety of the laser module or the high-power laser module, is installed or is integrated inside or within the dual frequency RF module and dual frequency band antenna; in order to improve the capabilities of the high power laser emitter, in order to reduce footprint or form-factor, and/or to reduce the physical properties of the DIRCM unit.

In some embodiments, one or more of the laser transmitters and/or the passive optical FPA detector, that are installed within the same high-power laser module, are further utilized for real-time and/or offline calibration purposes, to improve the countermeasure effectiveness of the DIRCM unit; for example, by lasing on (or towards) a known or pre-defined object (e.g., whose location is known), using QCL-based laser transmitter(s) and/or laser-diode based laser transmitter(s), and measuring the lasing reflected signal using the passive optical FPA detector. In some embodiments, such calibration may be performed by using one or more optical wavelengths, using one or more narrow-width laser beam transmitters and a passive optical FPA detector that may operate in different optical wavelengths. Furthermore, in some embodiments, usage of more than one optical wavelength for calibration, may further increase the calibration accuracy or efficiency.

In some embodiments, the system or the DIRCM unit may further comprise a gimbaling mechanism to gimbal the directed high-power laser transmitter towards said threat. Optionally, in some embodiments, the directed high-power laser transmitter commences to emit laser beams prior to being directed towards said threat; for example, in order to save a warming-up time-period that may be required for said directed high-power laser transmitter between its receipt of a command to emit laser beams and its actual emission of laser beams and/or increase the countermeasure effectiveness while the gimbal in movement is in its final stages of moving or rotating or spinning or elevating or otherwise changing the position or orientation or direction of the DIRCM or IRCM unit.

In some embodiments, the system or the DIRCM unit is encapsulated in or is housed in (or is implemented as) a stand-alone Line-Replaceable Unit (LRU) housing or encapsulation (or, a lower line replaceable unit (LLRU), or a line-replaceable component (LRC), or a line-replaceable item (LRI), or other modularly replaceable component) to enable rapid and modular mounting and dismounting and/or replacement of the system relative to said aircraft. For example, the DIRCM or IRCM unit, in some embodiments, may be comprised in a LRU-housing, or may be implemented within a LRU-housing or LRU-encapsulation; and the various components of module of the DIRCM or IRCM unit may be integrally implemented within such LRU-compatible housing or encapsulation, and may be wired or hard-wired therein in a manner that enables rapid mechanical and/or electronic mounting and dismounting of the DIRCM or IRCM unit relative to the aircraft that it is intended to protect. This particular structure may enable utilization of the DIRCM or IRCM unit of the present invention in military or combat scenarios, in which rapid deployment or replacement may be required.

Some embodiments may operate in conjunction with, or may utilize or may comprise, one or more devices and/or units and/or methods and/or operations and/or elements and/or data-items and/or analysis results, described in U.S. Pat. No. 9,109,862, titled "System, Device, and Method of Protecting Aircrafts Against Incoming Threats", which is hereby incorporated by reference in its entirety.

Figure 8:
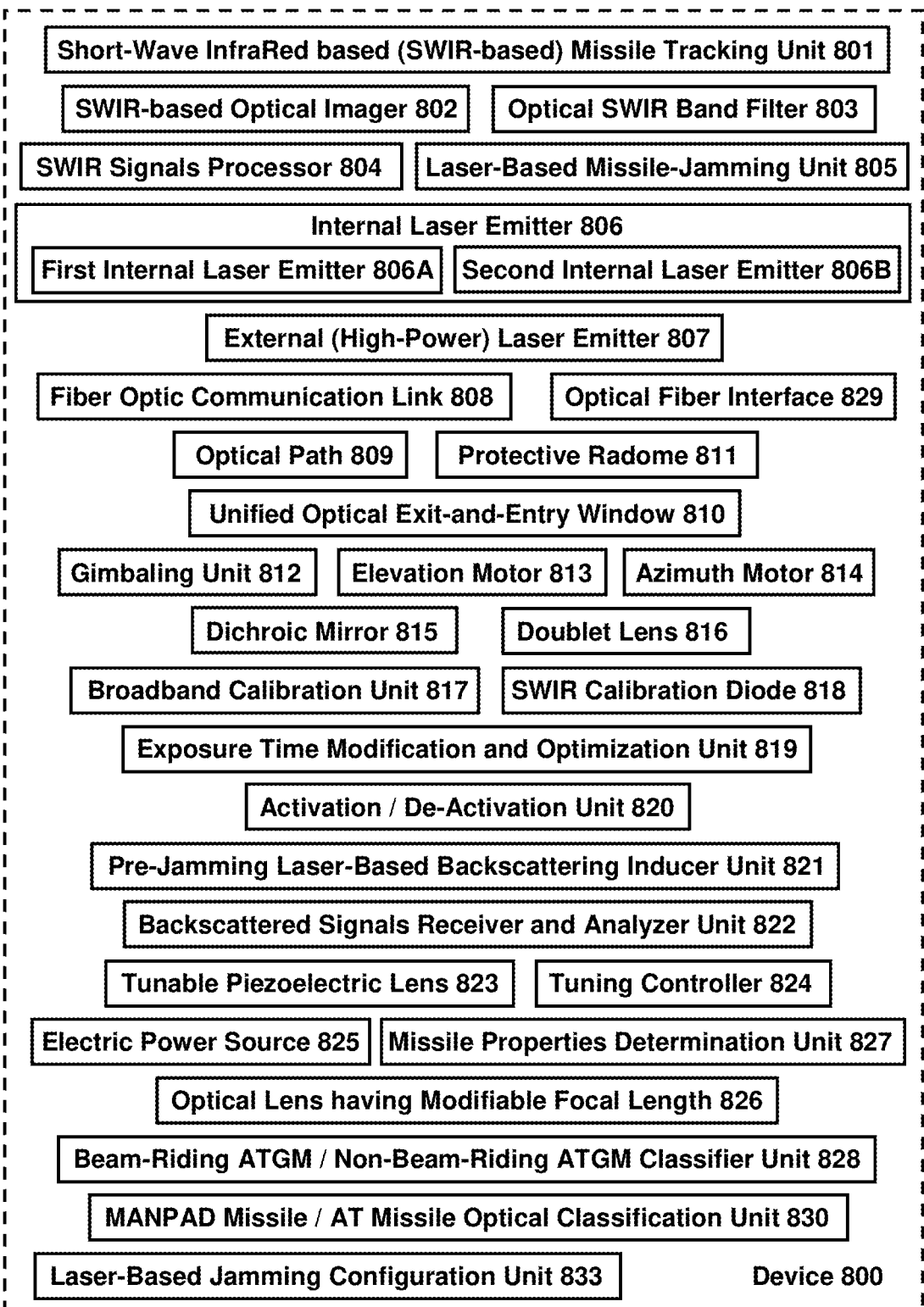
FIG. 8 is a schematic block-diagram illustration of a device for protecting an aircraft against incoming missiles, in accordance with some demonstrative embodiments.

Reference is made to FIG. 8, which is a schematic block-diagram illustration of a device 800, in accordance with some demonstrative embodiments. Some embodiments provide a device 800 for protecting an aircraft against missiles. The device may comprise: (a) a Short-Wave Infra-Red based (SWIR-based) Missile Tracking Unit 801, which comprises: a SWIR-based optical imager 802, associated with an optical SWIR band filter 803, wherein the optical SWIR band filter is configured to filter-in only optical signals having wavelengths in a range of 1,400 to 3,000 nanometers; wherein the SWIR-based optical imager is configured to capture only SWIR optical signals from an area surrounding the aircraft; (b) a SWIR signals processor 804, configured: to perform an analysis of the SWIR optical signals captured by the SWIR-based optical imager, and to perform, based on said analysis, (b1) a SWIR-based missile acquisition process, which is also based on raw angular position data of a missile as received from a Missile Approach Warning System (MAWS) of the aircraft, wherein the SWIR-based missile acquisition process generates an initial missile tracking data that is based on said raw angular position data of the missile; and then, (b2) a SWIR-based missile tracking process, which continuously and dynamically determines a precise angular position of the missile based on the SWIR optical signals captured by the SWIR-based optical imager; (c) a laser-based missile-jamming unit 805, which comprises at least one of: (c1) an internal laser emitter 806 that is located integrally within said device and is co-located with SWIR-based Missile Tracking Unit, and/or (c2) an external laser emitter 807 (or an external high-power laser emitter) that is located externally to said device yet in proximity to said device and is operably communicating with said device over a fiber optic communication link 808. The laser-based missile-jamming unit is configured to emit a missile-jamming laser beam, towards said missile, based on a signal received from the SWIR signals processor, wherein said signal indicates the precise angular position of said missile.

In some embodiments, at least a portion of an optical path 809 utilized by the SWIR-based optical imager for reception of SWIR optical signals, is also concurrently utilized by the laser-based missile-jamming unit for transmission of the missile-jamming laser beam.

In some embodiments, the laser-based missile-jamming unit comprises: (I) said internal laser emitter, which is a first internal laser emitter and is configured to emit a first missile-jamming laser beam at a first wavelength; and also (II) a second internal laser emitter, configured to emit a second missile-jamming laser beam at a second, different, wavelength; and also (III) said external laser emitter, configured to emit a third missile-jamming laser beam which is high-power laser beam having a third, different, wavelength; wherein the third missile-jamming laser beam has radiant intensity of at least 2 Watts per Steradian.

In some embodiments, the device further comprises: a unified optical exit-and-entry window 810, through which said first laser beam having the first wavelength exits said device, and through which said second laser beam having the second wavelength exits said device, and through which said SWIR optical signals enter the device to reach the SWIR-based optical imager.

In some embodiments, the device further comprises: a protective radome 811, to encapsulate one or more units of said device; a gimbaling unit 812, located internally within said protective radome, wherein the gimbaling unit comprises at least an elevation motor 813 and an azimuth motor 814, wherein the gimbaling unit is configured to dynamically cause real-time or near-real-time rotation, of the laser-based missile-jamming unit which is located within the protective radome, towards the precise angular position of said missile.

In some embodiments, the laser-based missile-jamming unit comprises at least: (I) said internal laser emitter, which is a first internal laser emitter 806A and is configured to emit a first missile-jamming laser beam at a first wavelength; and also (II) a second internal laser emitter 806B, configured to emit a second missile-jamming laser beam at a second, different, wavelength. In some embodiments, the device further comprises: a dichroic mirror 815, located internally within said device and within a protective dome of said device; wherein the dichroic mirror is configured: (i) to concurrently receive the first missile-jamming laser beam and the second missile-jamming laser beam; (ii) to split a combination of the first missile-jamming laser beam and the second missile-jamming laser beam, into a major portion and a minor portion; wherein the major portion is directed by the dichroic mirror towards the unified optical exit-and-entry window and then towards said missile; wherein the minor portion is directed by the dichroic mirror towards a doublet lens 816 which is located internally within said device and within the protective radome of said device, wherein the doublet lens passes said minor portion towards a broadband calibration unit (and/or receiver) 817 which performs real-time calibration of at least one of the first internal laser emitter and the second internal laser emitter based on said minor portion.

In some embodiments, the device comprises: a SWIR calibration diode 818, configured to emit an internal SWIR optical calibration signal that travels only internally within said device and does not exit said device; wherein the internal SWIR optical calibration signal is utilized to calibrate the SWIR-based Missile Tracking Unit and/or the SWIR-based optical imager. In some embodiments, the SWIR optical calibration signal is split within said device into: (i) a first SWIR signal-portion which passes through said doublet lens towards said broadband calibration receiver, and (ii) a second SWIR signal-portion which passes through said dichroic mirror and then passes through said optical SWIR band filter and then reaches said SWIR-based optical imager.

In some embodiments, the device comprises: an Exposure Time modification and optimization unit 819, configured: (i) to operate the SWIR-based Missile Tracking Unit to capture a fresh frame having a current field-of-view of the SWIR-based Missile Tracking Unit; (ii) to perform a check whether an over-saturated object is depicted in said fresh frame; wherein an over-saturated object is pre-defined as an object having a color intensity value that is greater than a pre-defined threshold value of color intensity; (iii) if a result of said check is positive, and if a time exposure parameter of the SWIR-based Missile Tracking Unit is currently greater than a pre-defined minimum permissible value that still allows missile detection, then: to reduce a value of the time exposure parameter of the SWIR-based Missile Tracking Unit, by a pre-defined reduction interval, and to repeat steps (i) and (ii) and (iii) during active tracking of said missile by the SWIR-based Missile Tracking Unit. The activation and de-activation operations may be performed by an Activation/De-Activation Unit 820.

In some embodiments, the SWIR-based optical imager is deactivated and non-operational during a time period, (I) that begins at time of reception of a MAW signal from said MAW unit, and (II) continues through a time-period in which said gimbaling unit spatially rotates one or more components of said device towards the angular position of the missile, and (III) that ends at a time-point in which the SWIR-based optical imager is oriented towards said missile; wherein, upon an elapse of said time period, the SWIR-based optical imager is activated, and the Exposure Time modification and optimization unit begins to perform said steps (i) and (ii) and (iii).

In some embodiments, said Exposure Time modification and optimization unit is configured: (a) to perform said steps (i) and (ii) and (iii) as an initial dynamic optimization process of the Exposure Time of the SWIR-based optical imager upon a first activation of the SWIR-based optical imager when it is spatially oriented towards said missile; and also, (b) to perform said steps (i) and (ii) and (iii) as an ongoing dynamic optimization process of the Exposure Time of the SWIR-based optical imager during a time-period in which said laser-based missile jamming unit performs laser-based jamming of said missile and concurrently with the laser-based jamming of said missile.

In some embodiments, the device comprises: (A) a Pre-Jamming Laser-Based Backscattering Inducer Unit 821, configured to generate, prior to commencement of emission of said missile-jamming laser beam by the laser-based missile-jamming unit towards the missile, a pre-jamming laser-based emission of one or more pre-jamming laser beams that are emitted towards the missile to induce the missile to reflect laser-based backscattered signals; (B) a Backscattered Signals Receiver and Analyzer unit 822, configured to receive the laser-based backscattered signals that were reflected from said missile, and configured to perform an analysis of said laser-based backscattered signals; wherein said analysis generates an analysis result that indicates at least one of: (i) a current range (distance) of said missile, (ii) a current velocity (speed) of said missile, (iii) a current roll-rate or self-rotation frequency of said missile; (C) wherein, based on said analysis result, the laser-based missile-jamming unit dynamically modifies one or more operational parameters of the missile-jamming laser beam during a laser-based missile jamming process being performed by the laser-based missile-jamming unit.

In some embodiments, the device comprises: a tunable piezoelectric lens 823, positioned between (i) the unified optical exit-and-entry window of said device, and (ii) an optical entry of the SWIR-based optical imager; a tuning controller 824, operably associated with an electric power source 825, to provide a particular electric voltage or electric current to the tunable piezoelectric lens, to cause a modification of an optical focal length of said tunable piezoelectric lens, and to cause a narrowing of a beam-width of SWIR optical signals that are received at said SWIR-based optical from said missile; wherein the SWIR signals processor of the SWIR-based Missile Tracking Unit is configured to process SWIR signals having a beam-width that was narrowed-down by said tunable piezoelectric lens, instead of processing raw SWIR signals having unmodified beam-width.

In some embodiments, the SWIR-based optical imager is preceded by an optical lens 826 having modifiable focal length; wherein the SWIR-based signals processor is configured to determine (e.g., using a Computerized Vision Unit, and/or based on analysis of color levels and/or contrast levels and/or brightness levels) a size in pixels of said missile, as detected visually within a field-of-view of the SWIR-based optical imager; and is further configured to reduce the focal length of the optical lens that precedes the SWIR-based optical imager if the size in pixels of said missile is greater than a first threshold value (S1), and is further configured to increase the focal length of the optical lens that precedes the SWIR-based optical imager if the size in pixels of said missile is greater than a second threshold value (S2).

In some embodiments, the SWIR-based optical imager is preceded by an optical lens having modifiable focal length; wherein the device comprises a missile properties determination unit 827, to determine at least a current distance of said missile from said device, based on optical analysis of SWIR-based optical signals that are received by the SWIR-based optical imager, and based on optical analysis of laser-based backscattered signals that are backscattered from said missile in response to laser emissions from said device towards said missile; wherein, if the current distance of said missile from said device is greater than a first pre-defined threshold value (D1), then the SWIR-based signals processor is configured to increase the focal length of the optical lens that precedes the SWIR-based optical imager; wherein, if the current distance of said missile from said device is smaller than or equal to a second pre-defined threshold value (D2), then the SWIR-based signals processor is configured to decrease the focal length of the optical lens that precedes the SWIR-based optical imager.

In some embodiments, the device comprises: a Beam-Riding ATGM/Non-Beam-Riding ATGM classifier unit 828, configured to perform analysis of SWIR optical signals that are received at the SWIR-based Missile Tracking Unit, and based on said analysis, to generate a classification signal indicating whether said missile is either a Laser-Beam Riding ATGM or a non-laser-beam-riding ATGM; wherein, based on said classification signal, the laser-based missile-jamming unit determines whether to perform laser-based jamming of the missile or laser-based jamming of a control station that controls said missile via a laser guidance beam.

In some embodiments, the device comprises: said Beam-Riding ATGM/Non-Beam-Riding ATGM classifier unit is configured to generate a determination that said missile is a Laser-Beam Riding ATGM based on said analysis of SWIR optical signals; and wherein based on said determination, an optical fiber interface 829 of said device transports an indication of the precise angular position of the missile, to an external high-power laser emitter (e.g., external laser emitter 807) that is external to said device yet is co-located in proximity to said device, which in turn is configured to emit a high-power laser beam towards said missile which was determined to be a Laser-Beam Riding ATGM.

In some embodiments, said device is implemented as two separate devices (or units), comprising a first protection device (or unit) and a second protection device (or unit); wherein the first protection device is particularly configured to perform laser-based jamming of a missile that is determined to be a MANPAD during missile flight; wherein the first protection device is particularly configured to perform laser-based jamming of a missile that is determined to be an ATGM during missile flight; wherein the first protection device and the second protected device are mountable on or under a same aircraft and provide to said aircraft protection against MANPADs and protection against ATGMs.

In some embodiments, the device comprises: a MANPAD Missile/AT Missile Optical Classification Unit 830, to perform a classification of said missile as either an Anti-Tank (AT) missile or as a MANPAD missile, based on optical signals captured by the SWIR-based optical imager and processed by the SWIR signals processor; wherein the MANPAD Missile/AT Missile Optical Classification Unit excludes any Radar mechanism, and is configured to perform said classification of said missile exclusively based on SWIR-based optical signals and not based on radar signals.

In some embodiments, the device comprises: a MANPAD Missile/AT Missile Optical Classification Unit, to perform a classification of said missile as either an Anti-Tank (AT) missile or as a MANPAD missile, based on optical signals captured by the SWIR-based optical imager and processed by the SWIR signals processor; wherein the MANPAD Missile/AT Missile Optical Classification Unit excludes any Radar mechanism, and is configured to perform said classification of said missile exclusively based on SWIR-based optical signals and not based on radar signals, by extracting a flight velocity of said missile via optical analysis of the optical signals captured by the SWIR-based optical imager; and if said flight velocity of the missile is greater than a threshold value (V1), then classifying said missile as a MANPAD missile, and triggering a first set of laser-based jamming operations towards the MANPAD missile; and conversely, if said flight velocity of the missile is equal to or smaller than said threshold value (V1), then classifying said missile as an Anti-Tank (AT), and triggering a second, different, set of laser-based jamming operations towards the Anti-Tank missile.

In some embodiments, the device comprises: a MANPAD Missile/AT Missile Optical Classification Unit, to perform a classification of said missile as either an Anti-Tank (AT) missile or as a MANPAD missile, based on optical signals captured by the SWIR-based optical imager and processed by the SWIR signals processor; wherein the MANPAD Missile/AT Missile Optical Classification Unit excludes any Radar mechanism, and is configured to perform said classification of said missile exclusively based on SWIR-based optical signals and not based on radar signals, based on, cumulatively, (i) extraction of a flight velocity of said missile via optical analysis of the optical signals captured by the SWIR-based optical imager, and also (ii) optical analysis of backscattered optical signals that are backscattered from said missile in response to laser emissions from said device towards said missile; and if said flight velocity of the missile is greater than a threshold value (V1), then classifying said missile as a MANPAD missile, and triggering a first set of laser-based jamming operations towards the MANPAD missile; and conversely, if said flight velocity of the missile is equal to or smaller than said threshold value (V1), then classifying said missile as an Anti-Tank (AT), and triggering a second, different, set of laser-based jamming operations towards the Anti-Tank missile.

In some embodiments, the device comprises: a MANPAD Missile/AT Missile Optical Classification Unit, to perform a classification of said missile as either an Anti-Tank (AT) missile or as a MANPAD missile, based on optical signals captured by the SWIR-based optical imager and processed by the SWIR signals processor; wherein the MANPAD Missile/AT Missile Optical Classification Unit excludes any Radar mechanism, and is configured to perform said classification of said missile exclusively based on SWIR-based optical signals and not based on radar signals, based on, cumulatively, (i) extraction of a flight velocity of said missile via optical analysis of the optical signals captured by the SWIR-based optical imager, and also (ii) optical analysis of backscattered optical signals that are backscattered from said missile in response to laser emissions from said device towards said missile, and also (iii) extraction of a self-rotation frequency of said missile based on optical analysis of SWIR-based signals received by the SWIR-based optical imager; and if said flight velocity of the missile is greater than a threshold value (V1), then classifying said missile as a MANPAD missile, and triggering a first set of laser-based jamming operations towards the MANPAD missile; and conversely, if said flight velocity of the missile is equal to or smaller than said threshold value (V1), then classifying said missile as an Anti-Tank (AT), and triggering a second, different, set of laser-based jamming operations towards the Anti-Tank missile.

In some embodiments, the device comprises: a MANPAD Missile/AT Missile Optical Classification Unit, to perform a classification of said missile as either an Anti-Tank (AT) missile or as a MANPAD missile, based on optical signals captured by the SWIR-based optical imager and processed by the SWIR signals processor; wherein the MANPAD Missile/AT Missile Optical Classification Unit excludes any Radar mechanism, and is configured to perform said classification of said missile exclusively based on SWIR-based optical signals and not based on radar signals; based on, cumulatively, (i) extraction of a flight velocity of said missile via optical analysis of the optical signals captured by the SWIR-based optical imager, and also (ii) optical analysis of backscattered optical signals that are backscattered from said missile in response to laser emissions from said device towards said missile, and also (iii) extraction of a self-rotation frequency of said missile based on optical analysis of SWIR-based signals received by the SWIR-based optical imager; wherein the MANPAD Missile/AT Missile Optical Classification Unit is configured to classify said missile, specifically, as either (I) an Anti-Tank Guided Missile (ATGM) that is beam riding, or as (II) an Anti-Tank missile that is non beam riding; and if the MANPAD Missile/AT Missile Optical Classification Unit has classified said missile as an Anti-Tank Guided Missile (ATGM) that is beam riding, then: locating a guidance station that guides said missile in flight via a guiding laser beam, and triggering a first set of laser-based jamming operations towards said guiding station to indirectly disrupt said missile; and conversely, if the MANPAD Missile/AT Missile Optical Classification Unit has classified said missile as an Anti-Tank missile that is non beam riding, then: triggering a second, different, set of laser-based jamming operations that are emitted directly towards said missile to directly disrupt said missile.

In some embodiments, the device comprises: a MANPAD Missile/AT Missile Optical Classification Unit, to perform a classification of said missile as either an Anti-Tank (AT) missile or as a MANPAD missile, based on optical signals captured by the SWIR-based optical imager and processed by the SWIR signals processor; wherein the MANPAD Missile/AT Missile Optical Classification Unit excludes any Radar mechanism, and is configured to perform said classification of said missile exclusively based on SWIR-based optical signals and not based on radar signals; based on, cumulatively, (i) extraction of a flight velocity of said missile via optical analysis of the optical signals captured by the SWIR-based optical imager, and also (ii) optical analysis of backscattered optical signals that are backscattered from said missile in response to laser emissions from said device towards said missile, and also (iii) extraction of a self-rotation frequency of said missile based on optical analysis of SWIR-based signals received by the SWIR-based optical imager; wherein the MANPAD Missile/AT Missile Optical Classification Unit is configured to classify said missile, specifically, as either (i) a MANPAD missile of a first type, or (ii) a MANPAD missile of a second type, or (iii) an Anti-Tank missile of a first type, or (iv) an Anti-Tank missile of a second type; wherein, if the MANPAD Missile/AT Missile Optical Classification Unit has classified said missile as a MANPAD missile of the first type, then the MANPAD Missile/AT Missile Optical Classification Unit triggers utilization of a first set of laser-based jamming operations towards said missile; if the MANPAD Missile/AT Missile Optical Classification Unit has classified said missile as a MANPAD missile of the second type, then the MANPAD Missile/AT Missile Optical Classification Unit triggers utilization of a second, different, set of laser-based jamming operations towards said missile; if the MANPAD Missile/AT Missile Optical Classification Unit has classified said missile as an Anti-Tank (AT) missile of the first type, then the MANPAD Missile/AT Missile Optical Classification Unit triggers utilization of a third, different, set of laser-based jamming operations towards said missile; if the MANPAD Missile/AT Missile Optical Classification Unit has classified said missile as an Anti-Tank (AT) missile of the second type, then the MANPAD Missile/AT Missile Optical Classification Unit triggers utilization of a fourth, different, set of laser-based jamming operations towards said missile.

In some embodiments, the device comprises: a MANPAD Missile/AT Missile Optical Classification Unit, to perform a classification of said missile as either an Anti-Tank (AT) missile or as a MANPAD missile, based on optical signals captured by the SWIR-based optical imager and processed by the SWIR signals processor; wherein the MANPAD Missile/AT Missile Optical Classification Unit excludes any Radar mechanism, and is configured to perform said classification of said missile exclusively based on SWIR-based optical signals and not based on radar signals; based on, cumulatively, (i) extraction of a flight velocity of said missile via optical analysis of the optical signals captured by the SWIR-based optical imager, and also (ii) optical analysis of backscattered optical signals that are backscattered from said missile in response to laser emissions from said device towards said missile, and also (iii) extraction of a self-rotation frequency of said missile based on optical analysis of SWIR-based signals received by the SWIR-based optical imager; wherein the MANPAD Missile/AT Missile Optical Classification Unit is configured to classify said missile, specifically, as either (i) a missile having Electronic Warfare capability, or (ii) a missile lacking Electronic Warfare capability; if the missile was classified as having Electronic Warfare capability, then the laser-based missile-jamming unit performs a first set of laser-based missile-jamming operations towards said missile; if the missile was classified as lacking Electronic Warfare capability, then the laser-based missile-jamming unit performs a second, different, set of laser-based missile-jamming operations towards said missile.

In some embodiments, the device comprises: a MANPAD Missile/AT Missile Optical Classification Unit, to perform a classification of said missile as either an Anti-Tank (AT) missile or as a MANPAD missile, based on optical signals captured by the SWIR-based optical imager and processed by the SWIR signals processor; wherein the MANPAD Missile/AT Missile Optical Classification Unit excludes any Radar mechanism, and is configured to perform said classification of said missile exclusively based on SWIR-based optical signals and not based on radar signals; based on, cumulatively, (i) extraction of a flight velocity of said missile via optical analysis of the optical signals captured by the SWIR-based optical imager, and also (ii) optical analysis of backscattered optical signals that are backscattered from said missile in response to laser emissions from said device towards said missile, and also (iii) extraction of a self-rotation frequency of said missile based on optical analysis of SWIR-based signals received by the SWIR-based optical imager; wherein the MANPAD Missile/AT Missile Optical Classification Unit is configured to classify said missile, specifically, as either (i) a MANPAD missile of a first type, or (ii) a MANPAD missile of a second type, or (iii) an Anti-Tank missile of a first type, or (iv) an Anti-Tank missile of a second type, by performing: if the missile has a flight velocity in a first velocity range-of-values, and the missile has a self-rotating frequency in a first self-rotating frequency range-of-values, then, the missile is classified as a MANPAD missile of a first type; if the missile has a flight velocity in a second velocity range-of-values, and the missile has a self-rotating frequency in a second self-rotating frequency range-of-values, then, the missile is classified as a MANPAD missile of a second type; if the missile has a flight velocity in a third velocity range-of-values, and the missile has a self-rotating frequency in a third self-rotating frequency range-of-values, then, the missile is classified as an Anti-Tank missile of a first type; if the missile has a flight velocity in a fourth velocity range-of-values, and the missile has a self-rotating frequency in a fourth self-rotating frequency range-of-values, then, the missile is classified as an Anti-Tank missile of a first type; wherein classification of said missile into the first type or the second type or the third type or the fourth type, triggers respectively an activation of either a first type of laser-based jamming pattern, a second type of laser-based jamming pattern, a third type of laser-based jamming pattern, or a fourth type of laser-based jamming pattern.

In some embodiments, the device comprises: a Laser-Based Jamming Configuration Unit 833 (or, a configuration unit for configuring the laser-based missile-jamming unit), operable to selectively and dynamically configure the laser-based missile-jamming unit; wherein, if the MANPAD Missile/AT Missile Optical Classification Unit determines that said missile is a MANPAD, then the Laser-Based Jamming Configuration Unit configures the laser-based missile-jamming unit to emit laser beams that include at least one of: a laser beam having an Ultra Violet wavelength, a laser beam having a SWIR wavelength, a laser beam having a MWIR wavelength; wherein, if the MANPAD Missile/AT Missile Optical Classification Unit determines that said missile is an Anti-Tank missile, then the Laser-Based Jamming Configuration Unit configures the laser-based missile-jamming unit to emit laser beams that include at least one of: a laser beam having a Visible wavelength, a laser beam having a SWIR wavelength, a laser beam having a MWIR wavelength, a laser beam having a NWIR wavelength, a laser beam having a LWIR wavelength.

In some embodiments, the device comprises: a Laser-Based Jamming Configuration Unit, operable to selectively and dynamically configure the laser-based missile-jamming unit; wherein, if the MANPAD Missile/AT Missile Optical Classification Unit determines that said missile is a MAN-PAD, then the Laser-Based Jamming Configuration Unit configures the laser-based missile-jamming unit to emit laser beams that include at least: a laser beam having an Ultra Violet wavelength; wherein, if the MANPAD Missile/AT Missile Optical Classification Unit determines that said missile is an Anti-Tank missile, then the Laser-Based Jamming Configuration Unit configures the laser-based missile-jamming unit to emit laser beams that include at least one of: a laser beam having a Visible wavelength, a laser beam having a NWIR wavelength, a laser beam having a LWIR wavelength.

In some embodiments, the device comprises: a closed-loop infra-red (IR) receiver, configured to perform an analysis of laser-based backscattered signals that are backscattered from said missile in response to laser beams emitted from said device towards said missile; wherein said analysis by the closed-loop infra-red (IR) receiver generates an analysis result that indicates at least one of: (i) a current range (distance) of said missile, (ii) a current velocity (speed) of said missile, (iii) a current self-spinning frequency of said missile.

In some embodiments, the device comprises: (A) a Pre-Jamming Laser-Based Backscattering Inducer Unit, configured to generate, prior to commencement of emission of said missile-jamming laser beam by the laser-based missile-jamming unit towards the missile, a pre-jamming laser-based emission of one or more pre-jamming laser beams that are emitted towards the missile to induce the missile to reflect laser-based backscattered signals; (B) a Backscattered Signals Receiver and Analyzer unit, configured to receive the laser-based backscattered signals that were reflected from said missile, and configured to perform an optical analysis of said laser-based backscattered signals, wherein said optical analysis generates an optical analysis result that indicates at least one of: (i) a current range (distance) of said missile, (ii) a current velocity (speed) of said missile, (iii) a current roll-rate (or self-rotation frequency) of said missile; (C) wherein the laser-based missile-jamming unit is configured to emit a laser-based jamming sequence of laser pulses, having at least one of: a Pulse Width (PW) value that is changed from pulse to pulse, (ii) a Pulse Repetition Interval (PRI) value that is changed from pulse to pulse, (iii) a pulse amplitude value that is changed from pulse to pulse; (D) wherein the pre-jamming laser-based emission comprises a sequence of laser pulses, having a fixed Pulse Width (PW) value that is unchanged from pulse to pulse, and having a fixed Pulse Repetition Interval (PRI) value that is unchanged from pulse to pulse, and having a fixed pulse amplitude value that is unchanged from pulse to pulse.

In some embodiments, the device comprises: (A) a Pre-Jamming Laser-Based Backscattering Inducer Unit, configured to generate, prior to commencement of emission of said missile-jamming laser beam by the laser-based missile-jamming unit towards the missile, a pre-jamming laser-based emission of one or more pre-jamming laser beams that are emitted towards the missile to induce the missile to reflect laser-based backscattered signals; (B) a Backscattered Signals Receiver and Analyzer unit, configured to receive the laser-based backscattered signals that were reflected from said missile, and configured to perform an optical analysis of said laser-based backscattered signals, wherein said optical analysis generates an optical analysis result that indicates at least one of: (i) a current range (distance) of said missile, (ii) a current velocity (speed) of said missile, (iii) a current roll-rate (or self-rotation frequency) of said missile; (C) wherein the laser-based missile-jamming unit is configured to emit a laser-based jamming sequence of laser pulses, having at least one of: a Pulse Width (PW) value that is changed from pulse to pulse, (ii) a Pulse Repetition Interval (PRI) value that is changed from pulse to pulse; (D) wherein the pre-jamming laser-based emission comprising a sequence of laser pulses, having a fixed Pulse Width (PW) value that is unchanged from pulse to pulse, and having a fixed Pulse Repetition Interval (PRI) value that is unchanged from pulse to pulse.

In some embodiments, the device comprises: (A) a Pre-Jamming Laser-Based Backscattering Inducer Unit, configured to generate, prior to commencement of emission of said missile-jamming laser beam by the laser-based missile-jamming unit towards the missile, a pre-jamming laser-based emission of one or more pre-jamming laser beams that are emitted towards the missile to induce the missile to reflect laser-based backscattered signals; (B) a Backscattered Signals Receiver and Analyzer unit, configured to receive the laser-based backscattered signals that were reflected from said missile, and configured to perform an optical analysis of said laser-based backscattered signals, wherein said optical analysis generates an optical analysis result that indicates at least one of: (i) a current range (distance) of said missile, (ii) a current velocity (speed) of said missile, (iii) a current roll-rate (or self-rotation frequency) of said missile; (C) wherein the laser-based missile-jamming unit is configured to emit a laser-based jamming sequence of laser pulses, having a Pulse Width (PW) value that is changed from pulse to pulse; (D) wherein the pre-jamming laser-based emission comprising a sequence of laser pulses, having a fixed Pulse Width (PW) value that is unchanged from pulse to pulse.

In some embodiments, the device comprises: (A) a Pre-Jamming Laser-Based Backscattering Inducer Unit, configured to generate, prior to commencement of emission of said missile-jamming laser beam by the laser-based missile-jamming unit towards the missile, a pre-jamming laser-based emission of one or more pre-jamming laser beams that are emitted towards the missile to induce the missile to reflect laser-based backscattered signals; (B) a Backscattered Signals Receiver and Analyzer unit, configured to receive the laser-based backscattered signals that were reflected from said missile, and configured to perform an optical analysis of said laser-based backscattered signals; wherein said optical analysis generates an optical analysis result that indicates at least one of: (i) a current range (distance) of said missile, (ii) a current velocity (speed) of said missile, (iii) a current roll-rate of said missile; (C) wherein the laser-based missile-jamming unit is configured to emit a laser-based jamming sequence of laser pulses, having a Pulse Repetition Interval (PRI) value that is changed from pulse to pulse; (D) wherein the pre-jamming laser-based emission comprising a sequence of laser pulses, having a fixed Pulse Repetition Interval (PRI) value that is unchanged from pulse to pulse.

In some embodiments, the device comprises: a missile properties determination unit, to determine at least one of: (i) a current distance of said missile, (ii) a current flight speed of said missile, (iii) a current roll-rate (or self-rotation frequency) of said missile, based on optical analysis of SWIR-based optical signals that are received by the SWIR-based optical imager, and based on optical analysis of laser-based backscattered signals that are backscattered from said missile in response to laser emissions from said device towards said missile.

In some embodiments, said single, same, SWIR-based optical imager is operable to perform both (i) extracting missile distance and missile speed of said missile in flight, and (ii) extracting a location of a guidance station that remotely guides said missile via a guiding laser-beam.

In some embodiments, said single, same, laser-based missile-jamming unit is dynamically modifiable, in real time or in near-real-time, to selectively perform either (i) laser-based jamming of a MANPAD missile by emitting towards said missile a first type of laser emissions that are effective to disrupt a MANPAD missile, or (ii) laser-based jamming of an Anti-Tank (AT) missile by emitting towards said missile a second type of laser emissions that are effective to disrupt an Anti-Tank (AT) missile, or (iii) laser-based jamming of a guiding station, which remotely guides a beam-riding missile via a guiding laser-beam, by emitting towards said guiding station a third type of laser emissions that are effective to directly disrupt said guiding station and to indirectly disrupt said beam-riding missile.

In some embodiments, the device is implemented as a Line Replaceable Unit (LRU) and has mechanical connectors and electronic connectors that enable rapid mounting of the device onto an aircraft and rapid dismounting of the device from an aircraft.

Some embodiments provide an aircraft, having mounted thereon the device.

In some embodiments, instead of being mounted on an aircraft and protecting an aircraft, the device may be mounted on (and may protect) another type of protected platform, for example, vessel, vehicle, or other types of protected platforms as mentioned above.

In some embodiments, units or components that are described, and which may not necessarily be shown in the drawings in order to avoid over-crowding, may be implemented by using one or more other units or components that are described and/or shown; for example, using electronic card(s), processors, memory units, processing units, control units, controllers, comparators, or the like.

Some embodiments may operate in conjunction with, or may utilize or may comprise, one or more devices and/or units and/or methods and/or operations and/or elements and/or data-items and/or analysis results, described in U.S. Pat. No. 8,672,223, titled "System, Device, and Method of Protecting Aircrafts Against Incoming Missiles and Threats", which is hereby incorporated by reference in its entirety.

Some embodiments may operate in conjunction with, or may utilize or may comprise, one or more devices and/or units and/or methods and/or operations and/or elements and/or data-items and/or analysis results, described in U.S. Pat. No. 8,258,998, titled "Device, System, and Method of Protecting Aircrafts Against Incoming Threats", which is hereby incorporated by reference in its entirety.

Some embodiments may operate in conjunction with, or may utilize or may comprise, one or more devices and/or units and/or methods and/or operations and/or elements and/or data-items and/or analysis results, described in United States patent application publication number US 2020/0072582 A1, titled "Device, system, and method of aircraft protection and countermeasures against threats", which is hereby incorporated by reference in its entirety.

Any reference above or herein to a parameter, typically indicated by a letter such as N or V or T or S (or the like), or typically indicated by a letter followed by a digit such as D1 or D2 or V1 or V2 (or the like), may relate to a pre-defined or pre-configured parameter or constant or value or threshold value; or, in some embodiments, to a user-configurable or administrator-configurable value or threshold value; or, in some embodiments, to a dynamically-configurable and/or automatically-modified value or threshold value, which may be modified or adjusted by the system automatically and/or autonomously if one or more pre-defined conditions hold true and/or based on one or more pre-defined threshold modification rules which are enforced by a Parameters/Threshold Values Modification Unit or other suitable component.

Some embodiments may perform steps or operations such as, for example, "determining", "identifying", "comparing", "checking", "querying", "searching", "matching", and/or "analyzing", by utilizing, for example: a pre-defined threshold value to which one or more parameter values may be compared; a comparison between (i) sensed or measured or calculated value(s), and (ii) pre-defined or dynamically-generated threshold value(s) and/or range values and/or upper limit value and/or lower limit value and/or maximum value and/or minimum value; a comparison or matching between sensed or measured or calculated data, and one or more values as stored in a look-up table or a legend table or a legend list or a database of possible values or ranges; a comparison or matching or searching process which searches for matches and/or identical results and/or similar results among multiple values or limits that are stored in a database or look-up table; utilization of one or more equations, formula, weighted formula, and/or other calculation in order to determine similarity or a match between or among parameters or values; utilization of comparator units, lookup tables, threshold values, conditions, conditioning logic, Boolean operator(s) and/or other suitable components and/or or operations.

Some embodiments may be implemented by utilizing any suitable combination of hardware components and/or software modules; as well as other suitable units or sub-units, processors, controllers, DSPs, FPGAs, CPUs, Integrated Circuits, output units, input units, memory units, long-term or short-term storage units, buffers, power source(s), wired links, wireless communication links, transceivers, Operating System(s), software applications, drivers, or the like.

Any of the above-mentioned devices, units and/or systems, may be implemented by using suitable hardware components and/or software components; for example, a processor, a processing core, a Central Processing Unit (CPU), a Digital Signal Processor (DSP), an Integrated Circuit (IC), and Application-Specific Integrated Circuit (ASIC), a memory unit (e.g., Random Access Memory (RAM), Flash memory), a storage unit (e.g., hard disk drive (HDD), solid state drive (SDD), Flash memory), an input unit (keyboard, keypad, mouse, joystick, touch-pad, touch-screen, microphone), an output unit (screen, touch-screen, monitor, audio speakers), a power source (battery, rechargeable battery, power cell, connection to electric outlet), a wireless transceiver, a cellular transceiver, a wired or wireless modem, a network interface card or element, an accelerometer, a gyroscope, a compass unit, a Global Positioning System (GPS) unit, an Operating System (OS), drivers, applications, and/or other suitable components.

In some implementations, calculations, operations and/or determinations may be performed locally within a single device, or may be performed by or across multiple devices, or may be performed partially locally and partially remotely (e.g., at a remote component or a co-located component) by optionally utilizing a communication channel to exchange raw data and/or processed data and/or processing results.

Although portions of the discussion herein relate, for demonstrative purposes, to wired links and/or wired communications, some implementations are not limited in this regard, but rather, may utilize wired communication and/or wireless communication; may include one or more wired and/or wireless links; may utilize one or more components of wired communication and/or wireless communication; and/or may utilize one or more methods or protocols or standards of wireless communication.

Some implementations may utilize a special-purpose machine or a specific-purpose device that is not a generic computer, or may use a non-generic computer or a non-general computer or machine. Such system or device may utilize or may comprise one or more components or units or modules that are not part of a "generic computer" and that are not part of a "general purpose computer", for example, cellular transceiver, cellular transmitter, cellular receiver, GPS unit, location-determining unit, accelerometer(s), gyroscope(s), device-orientation detectors or sensors, device-positioning detectors or sensors, or the like.

Some implementations may utilize an automated method or automated process, or a machine-implemented method or process, or as a semi-automated or partially-automated method or process, or as a set of steps or operations which may be executed or performed by a computer or machine or system or other device.

Some implementations may utilize code or program code or machine-readable instructions or machine-readable code, which may be stored on a non-transitory storage medium or non-transitory storage article (e.g., a CD-ROM, a DVD-ROM, a physical memory unit, a physical storage unit), such that the program or code or instructions, when executed by a processor or a machine or a computer, cause such processor or machine or computer to perform a method or process as described herein. Such code or instructions may be or may comprise, for example, one or more of: software, a software module, an application, a program, a subroutine, instructions, an instruction set, computing code, words, values, symbols, strings, variables, source code, compiled code, interpreted code, executable code, static code, dynamic code; including (but not limited to) code or instructions in high-level programming language, low-level programming language, object-oriented programming language, visual programming language, compiled programming language, interpreted programming language, C, C++, C#, Java, JavaScript, SQL, Ruby on Rails, Go, Cobol, Fortran, ActionScript, AJAX, XML, JSON, Lisp, Eiffel, Verilog, Hardware Description Language (HDL), Register-Transfer Level (RTL), BASIC, Visual BASIC, Matlab, Pascal, HTML, HTML5, CSS, Perl, Python, PHP, machine language, machine code, assembly language, or the like.

Discussions herein utilizing terms such as, for example, "processing", "computing", "calculating", "determining", "establishing", "analyzing", "checking", "detecting", "measuring", or the like, may refer to operation(s) and/or process(es) of a processor, a computer, a computing platform, a computing system, or other electronic device or computing device, that may automatically and/or autonomously manipulate and/or transform data represented as physical (e.g., electronic) quantities within registers and/or accumulators and/or memory units and/or storage units into other data or that may perform other suitable operations.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments", "some embodiments", and/or similar terms, may indicate that the embodiment(s) so described may optionally include a particular feature, structure, or characteristic, but not every embodiment necessarily includes the particular feature, structure, or characteristic. Furthermore, repeated use of the phrase "in one embodiment" does not necessarily refer to the same embodiment, although it may. Similarly, repeated use of the phrase "in some embodiments" does not necessarily refer to the same set or group of embodiments, although it may.

As used herein, and unless otherwise specified, the utilization of ordinal adjectives such as "first", "second", "third", "fourth", and so forth, to describe an item or an object, merely indicates that different instances of such like items or objects are being referred to; and does not intend to imply as if the items or objects so described must be in a particular given sequence, either temporally, spatially, in ranking, or in any other ordering manner.

Functions, operations, components and/or features described herein with reference to one or more implementations, may be combined with, or may be utilized in combination with, one or more other functions, operations, components and/or features described herein with reference to one or more other implementations. Some embodiments may comprise any possible or suitable combinations, re-arrangements, assembly, re-assembly, or other utilization of some or all of the modules or functions or components or units that are described herein, even if they are discussed in different locations or different chapters of the above discussion, or even if they are shown across different drawings or multiple drawings.

While certain features of some demonstrative embodiments have been illustrated and described herein, various modifications, substitutions, changes, and equivalents may occur to those skilled in the art. Accordingly, the claims are intended to cover all such modifications, substitutions, changes, and equivalents.

What is claimed is:

1. A device for protecting an aircraft against missiles, the device comprising:

(a) a Short-Wave InfraRed based (SWIR-based) Missile Tracking Unit which comprises:

a SWIR-based optical imager associated with an optical SWIR band filter wherein the optical SWIR band filter is configured to filter-in only optical signals having wavelengths in a range of 1,400 to 3,000 nanometers; wherein the SWIR-based optical imager is configured to capture only SWIR optical signals from an area surrounding the aircraft;

(b) a SWIR signals processor configured: to perform an analysis of the SWIR optical signals captured by the SWIR-based optical imager and to perform, based on said analysis, (b1) a SWIR-based missile acquisition process, which is also based on raw angular position data of a missile as received from a Missile Approach Warning System (MAWS) of the aircraft, wherein the SWIR-based missile acquisition process generates an initial missile tracking data that is based on said raw angular position data of the missile; and then, (b2) a SWIR-based missile tracking process, which continuously and dynamically determines a precise angular position of the missile based on the SWIR optical signals captured by the SWIR-based optical imager;

(c) a laser-based missile-jamming unit which comprises at least one of:

(c1) an internal laser emitter that is located integrally within said device and is co-located with said SWIR-based Missile Tracking Unit and/or (c2) an external laser emitter that is located externally to said device yet in proximity to said device and is operably communicating with said device over a fiber optic communication link;

wherein the laser-based missile-jamming unit is configured to emit a missile-jamming laser beam, towards said missile, based on a signal received from the SWIR signals processor, wherein said signal indicates the precise angular position of said missile;

wherein at least a portion of an optical path in the device utilized by the SWIR-based optical imager for reception of SWIR optical signals, is also concurrently utilized by the laser-based missile-jamming unit for transmission of the missile-jamming laser beam.

2. The device (800) according to claim 1, wherein the laser-based missile-jamming unit (805) comprises:

(I) said internal laser emitter (806), which is a first internal laser emitter (806A) and is configured to emit a first missile-jamming laser beam at a first wavelength; and also (II) a second internal laser emitter (806B), configured to emit a second missile-jamming laser beam at a second, different, wavelength; and also (III) said external laser emitter (807), configured to emit a third missile-jamming laser beam which is high-power laser beam having a third, different, wavelength; wherein the third missile-jamming laser beam has radiant intensity of at least 2 Watts per Steradian;

wherein the device (800) comprises:

a unified optical exit-and-entry window (810), through which said first laser beam having the first wavelength exits said device, and through which said second laser beam having the second wavelength exits said device, and through which said SWIR optical signals enter the device to reach the SWIR-based optical imager (802).

3. The device (800) according to claim 1, further comprising:

a protective radome (811), to encapsulate one or more units of said device (800);

a gimbaling unit (812), located internally within said protective radome (811), wherein the gimbaling unit (812) comprises at least an elevation motor (813) and an azimuth motor (814), wherein the gimbaling unit (812) is configured to dynamically cause real-time or near-real-time rotation, of the laser-based missile-jamming unit (805) which is located within the protective radome (811), towards the precise angular position of said missile.

4. The device (800) according to claim 1, wherein the laser-based missile-jamming unit (805) comprises at least:

(I) said internal laser emitter (806), which is a first internal laser emitter (806A) and is configured to emit a first missile-jamming laser beam at a first wavelength; and also (II) a second internal laser emitter (806B), configured to emit a second missile-jamming laser beam at a second, different, wavelength;

wherein the device (800) further comprises:

a dichroic mirror (815), located internally within said device (800) and within a protective dome of said device (800), wherein the dichroic mirror (815) is configured:

(i) to concurrently receive the first missile-jamming laser beam and the second missile-jamming laser beam;

(ii) to split a combination of the first missile-jamming laser beam and the second missile-jamming laser beam, into a major portion and a minor portion;

wherein the major portion is directed by the dichroic mirror (815) towards the unified optical exit-and-entry window (810) and then towards said missile;

wherein the minor portion is directed by the dichroic mirror (815) towards a doublet lens (816) which is located internally within said device (800) and within the protective radome (811) of said device (800), wherein the doublet lens (816) passes said minor portion towards a broadband calibration unit (817) which performs real-time calibration of at least one of the first internal laser emitter (806A) and the second internal laser emitter (806B) based on said minor portion.

5. The device (800) according to claim 1, a SWIR calibration diode (818), configured to emit an internal SWIR optical calibration signal that travels only internally within said device (800) and does not exit said device (800), wherein the internal SWIR optical calibration signal is utilized to calibrate the SWIR-based Missile Tracking Unit (801) and/or the SWIR-based optical imager (802);

wherein the SWIR optical calibration signal is split within said device (800) into:

(i) a first SWIR signal-portion which passes through said doublet lens (816) towards said broadband calibration unit (817), and (ii) a second SWIR signal-portion which passes through said dichroic (815) mirror and then passes through said optical SWIR band filter (803) and then reaches said SWIR-based optical imager (802).

6. The device (800) according to claim 1, further comprising:

an Exposure Time modification and optimization unit (819), configured:

(i) to operate the SWIR-based Missile Tracking Unit (801) to capture a fresh frame having a current field-of-view of the SWIR-based Missile Tracking Unit (801);

(ii) to perform a check whether an over-saturated object is depicted in said fresh frame, wherein an over-saturated object is pre-defined as an object having a color intensity value that is greater than a pre-defined threshold value of color intensity;

(iii) if a result of said check is positive, and if a time exposure parameter of the SWIR-based Missile Tracking Unit (801) is currently greater than a pre-defined minimum permissible value that still allows missile detection, then: to reduce a value of the time exposure parameter of the SWIR-based Missile Tracking Unit (801), by a pre-defined reduction interval, and to repeat steps (i) and (ii) and (iii) during active tracking of said missile by the SWIR-based Missile Tracking Unit (801).

7. The device (800) according to claim 6, wherein the SWIR-based optical imager (802) is deactivated and non-operational during a time period, (I) that begins at time of reception of a MAW signal from said MAW unit, and (II) continues through a time-period in which said gimbaling unit (812) spatially rotates one or more components of said device (800) towards the angular position of the missile, and (III) that ends at a time-point in which the SWIR-based optical imager (802) is oriented towards said missile;

wherein, upon an elapse of said time period, the SWIR-based optical imager (802) is activated, and the Exposure Time modification and optimization unit (819) begins to perform said steps (i) and (ii) and (iii).

8. The device (800) according to claim 6, wherein said Exposure Time modification and optimization unit (819) is configured:

(a) to perform said steps (i) and (ii) and (iii) as an initial dynamic optimization process of the Exposure Time of the SWIR-based optical imager (802) upon a first activation of the SWIR-based optical imager (802) when it is spatially oriented towards said missile;

and also, (b) to perform said steps (i) and (ii) and (iii) as an ongoing dynamic optimization process of the Exposure Time of the SWIR-based optical imager (802) during a time-period in which said laser-based missile-jamming unit (805) performs laser-based jamming of said missile and concurrently with the laser-based jamming of said missile.

9. The device (800) according to claim 1, comprising:

(A) a Pre-Jamming Laser-Based Backscattering Inducer Unit (821), configured to generate, prior to commencement of emission of said missile-jamming laser beam by the laser-based missile-jamming unit (805) towards the missile, a pre-jamming laser-based emission of one or more pre-jamming laser beams that are emitted towards the missile to induce the missile to reflect laser-based backscattered signals;

(B) a Backscattered Signals Receiver and Analyzer unit (822), configured to receive the laser-based backscattered signals that were reflected from said missile, and configured to perform an analysis of said laser-based backscattered signals, wherein said analysis generates an analysis result that indicates:

(i) a current range of said missile, and (ii) a current velocity of said missile, and (iii) a current roll-rate of said missile, (C) wherein, based on said analysis result, the laser-based missile-jamming unit (805) dynamically modifies one or more operational parameters of the missile-jamming laser beam during a laser-based missile jamming process being performed by the laser-based missile-jamming unit (805).

10. The device (800) according claim 1, further comprising:

a tunable piezoelectric lens (823), positioned between (i) the unified optical exit-and-entry window (810) of said device (800), and (ii) an optical entry of the SWIR-based optical imager (802);

a tuning controller (824), operably associated with an electric power source (825), to provide a particular electric voltage or electric current to the tunable piezoelectric lens (823), to cause a modification of an optical focal length of said tunable piezoelectric lens (823), and to cause a narrowing of a beam-width of SWIR optical signals that are received at said SWIR-based optical from said missile;

wherein the SWIR signals processor (804) of the SWIR-based Missile Tracking Unit (801) is configured to process SWIR signals having a beam-width that was narrowed-down by said tunable piezoelectric lens (823), instead of processing raw SWIR signals having unmodified beam-width.

11. The device (800) according to claim 1, wherein the SWIR-based optical imager (802) is preceded by an optical lens (826) having modifiable focal length;

wherein the SWIR-based signals processor (804) is configured to determine a size in pixels of said missile, as detected visually within a field-of-view of the SWIR-based optical imager (802);

and is further configured to reduce the focal length of the optical lens (826) that precedes the SWIR-based optical imager (802) if the size in pixels of said missile is greater than a first threshold value (S1), and is further configured to increase the focal length of the optical lens (826) that precedes the SWIR-based optical imager (802) if the size in pixels of said missile is greater than a second threshold value (S2).

12. The device (800) according to claim 1, wherein the SWIR-based optical imager (802) is preceded by an optical lens (826) having modifiable focal length;

wherein the device (800) comprises a missile properties determination unit (827), to determine at least a current distance of said missile from said device (800), based on optical analysis of SWIR-based optical signals that are received by the SWIR-based optical imager (802), and based on optical analysis of laser-based backscattered signals that are backscattered from said missile in response to laser emissions from said device (800) towards said missile;

wherein, if the current distance of said missile from said device (800) is greater than a first pre-defined threshold value (D1), then the SWIR-based signals processor (804) is configured to increase the focal length (826) of the optical lens that precedes the SWIR-based optical imager (802);

wherein, if the current distance of said missile from said device (800) is smaller than or equal to a second pre-defined threshold value (D2), then the SWIR-based signals processor (804) is configured to decrease the focal length of the optical lens (826) that precedes the SWIR-based optical imager (802).

13. The device (800) according to claim 1, further comprising:

a Beam-Riding ATGM/Non-Beam-Riding ATGM classifier unit (828), configured to perform analysis of SWIR optical signals that are received at the SWIR-based Missile Tracking Unit (801), and based on said analysis, to generate a classification signal indicating whether said missile is either a Laser-Beam Riding ATGM or a non-laser-beam-riding ATGM;

wherein, based on said classification signal, the laser-based missile-jamming unit (805) determines whether to perform laser-based jamming of the missile or laser-based jamming of a control station that controls said missile via a laser guidance beam.

14. The device (800) according to claim 13, wherein said Beam-Riding ATGM/Non-Beam-Riding ATGM classifier unit (828) is configured to generate a determination that said missile is a Laser-Beam Riding ATGM based on said analysis of SWIR optical signals;

and wherein based on said determination, an optical fiber interface (829) of said device (800) transports an indication of the precise angular position of the missile, to an external high-power laser emitter (807) that is external to said device (800) yet is co-located in proximity to said device (800), which in turn is configured to emit a high-power laser beam towards said missile which was determined to be a Laser-Beam Riding ATGM.

15. The device (800) according to claim 1, wherein said device (800) is implemented as two separate devices comprising a first protection device and a second protection device;

wherein the first protection device is particularly configured to perform laser-based jamming of a missile that is determined to be a MANPAD during missile flight;

wherein the second protection device is particularly configured to perform laser-based jamming of a missile that is determined to be an ATGM during missile flight;

wherein the first protection device and the second protected device are mountable on or under a same aircraft and provide to said aircraft protection against MAN-PADs and protection against ATGMs.

16. The device (800) according to claim 1, comprising:

a MANPAD Missile/AT Missile Optical Classification Unit (830), to perform a classification of said missile as either an Anti-Tank (AT) missile or as a MANPAD missile, based on optical signals captured by the SWIR-based optical imager (802) and processed by the SWIR signals processor (804), wherein the MANPAD Missile/AT Missile Optical Classification Unit (830) excludes any Radar mechanism, and is configured to perform said classification of said missile exclusively based on SWIR-based optical signals and not based on radar signals, based on, cumulatively, (i) extraction of a flight velocity of said missile via optical analysis of the optical signals captured by the SWIR-based optical imager (802), and also (ii) optical analysis of backscattered optical signals that are backscattered from said missile in response to laser emissions from said device (800) towards said missile, and also (iii) extraction of a self-rotation frequency of said missile based on optical analysis of SWIR-based signals received by the SWIR-based optical imager (802);

and if said flight velocity of the missile is greater than a threshold value (V1), then classifying said missile as a MANPAD missile, and triggering a first set of laser-based jamming operations towards the MANPAD missile, and conversely, if said flight velocity of the missile is equal to or smaller than said threshold value (V1), then classifying said missile as an Anti-Tank (AT), and triggering a second, different, set of laser-based jamming operations towards the Anti-Tank missile.

17. The device (800) according to claim 1, comprising:

a MANPAD Missile/AT Missile Optical Classification Unit (830), to perform a classification of said missile as either an Anti-Tank (AT) missile or as a MANPAD missile, based on optical signals captured by the SWIR-based optical imager (802) and processed by the SWIR signals processor (804), wherein the MANPAD Missile/AT Missile Optical Classification Unit (830) excludes any Radar mechanism, and is configured to perform said classification of said missile exclusively based on SWIR-based optical signals and not based on radar signals, based on, cumulatively, (i) extraction of a flight velocity of said missile via optical analysis of the optical signals captured by the SWIR-based optical imager (802), and also (ii) optical analysis of backscattered optical signals that are backscattered from said missile in response to laser emissions from said device (800) towards said missile, and also (iii) extraction of a self-rotation frequency of said missile based on optical analysis of SWIR-based signals received by the SWIR-based optical imager (802);

wherein the MANPAD Missile/AT Missile Optical Classification Unit (830) is further configured to classify said missile, specifically, as either (I) an Anti-Tank Guided Missile (ATGM) that is beam riding, or as (II) an Anti-Tank missile that is non beam riding;

and if the MANPAD Missile/AT Missile Optical Classification Unit (830) has classified said missile as an Anti-Tank Guided Missile (ATGM) that is beam riding, then: locating a guidance station that guides said missile in flight via a guiding laser beam, and triggering a first set of laser-based jamming operations towards said guiding station to indirectly disrupt said missile, and conversely, if the MANPAD Missile/AT Missile Optical Classification Unit (830) has classified said missile as an Anti-Tank missile that is non beam riding, then: triggering a second, different, set of laser-based jamming operations that are emitted directly towards said missile to directly disrupt said missile.

18. The device (800) according to claim 1, wherein the MANPAD Missile/AT Missile Optical Classification Unit (830) is further configured to classify said missile, specifically, as either (i) a missile having Electronic Warfare capability, or (ii) a missile lacking Electronic Warfare capability;

if the missile was classified as having Electronic Warfare capability, then the laser-based missile-jamming unit (805) performs a first set of laser-based missile-jamming operations towards said missile;

if the missile was classified as lacking Electronic Warfare capability, then the laser-based missile-jamming unit (805) performs a second, different, set of laser-based missile-jamming operations towards said missile.

19. The device (800) according to claim 1, comprising:

a Laser-Based Jamming Configuration Unit (833), operable to selectively and dynamically configure the laser-based missile-jamming unit (805);

wherein, if the MANPAD Missile/AT Missile Optical Classification Unit (830) determines that said missile is a MANPAD, then the Laser-Based Jamming Configuration Unit (833) configures the laser-based missile-jamming unit (805) to emit laser beams that include at least one of: a laser beam having an Ultra Violet wavelength, a laser beam having a SWIR wavelength, a laser beam having a MWIR wavelength;

wherein, if the MANPAD Missile/AT Missile Optical Classification Unit (830) determines that said missile is an Anti-Tank missile, then the Laser-Based Jamming Configuration Unit (833) configures the laser-based missile-jamming unit (805) to emit laser beams that include at least one of: a laser beam having a Visible wavelength, a laser beam having a SWIR wavelength, a laser beam having a MWIR wavelength, a laser beam having a NWIR wavelength, a laser beam having a LWIR wavelength.

20. The device (800) according to claim 1, comprising:

(A) a Pre-Jamming Laser-Based Backscattering Inducer Unit (821), configured to generate, prior to commencement of emission of said missile-jamming laser beam by the laser-based missile-jamming unit (805) towards the missile, a pre-jamming laser-based emission of one or more pre-jamming laser beams that are emitted towards the missile to induce the missile to reflect laser-based backscattered signals;

(B) a Backscattered Signals Receiver and Analyzer unit (822), configured to receive the laser-based backscattered signals that were reflected from said missile, and configured to perform an optical analysis of said laser-based backscattered signals, wherein said optical analysis generates an optical analysis result that indicates:

(i) a current range of said missile, and (ii) a current velocity of said missile, and (iii) a current roll-rate of said missile;

(C) wherein the laser-based missile-jamming unit (805) is configured to emit a laser-based jamming sequence of laser pulses, having at least one of: a Pulse Width (PW) value that is changed from pulse to pulse, (ii) a Pulse Repetition Interval (PRI) value that is changed from pulse to pulse, (iii) a pulse amplitude value that is changed from pulse to pulse;

(D) wherein the pre-jamming laser-based emission comprises a sequence of laser pulses, having a fixed Pulse Width (PW) value that is unchanged from pulse to pulse, and having a fixed Pulse Repetition Interval (PRI) value that is unchanged from pulse to pulse, and having a fixed pulse amplitude value that is unchanged from pulse to pulse.

21. The device (800) according to claim 1, comprising:

a missile properties determination unit (827), configured to determine:

(i) a current distance of said missile, and (ii) a current flight speed of said missile, and (iii) a current roll-rate of said missile, based on optical analysis of SWIR-based optical signals that are received by the SWIR-based optical imager (802), and based on optical analysis of laser-based backscattered signals that are backscattered from said missile in response to laser emissions from said device (800) towards said missile;

wherein said single, same, SWIR-based optical imager (802) is operable to perform both (i) extracting missile distance and missile speed of said missile in flight, and (ii) extracting a location of a guidance station that remotely guides said missile via a guiding laser-beam;

wherein said single, same, laser-based missile-jamming unit (805) is dynamically modifiable, in real time or in near-real-time, to selectively perform either (i) laser-based jamming of a MANPAD missile by emitting towards said missile a first type of laser emissions that are effective to disrupt a MANPAD missile, or (ii) laser-based jamming of an Anti-Tank (AT) missile by emitting towards said missile a second type of laser emissions that are effective to disrupt an Anti-Tank (AT) missile, or (iii) laser-based jamming of a guiding station, which remotely guides a beam-riding missile via a guiding laser-beam, by emitting towards said guiding station a third type of laser emissions that are effective to directly disrupt said guiding station and to indirectly disrupt said beam-riding missile.

22. The device according to claim 1, wherein the device is implemented as a Line Replaceable Unit (LRU) and has mechanical connectors and electronic connectors that enable rapid mounting of the device onto said aircraft and rapid dismounting of the device from said aircraft.

23. An aircraft, having mounted thereon the device according to claim 1.

\* \* \* \* \*